(12) United States Patent
Kim

(10) Patent No.: US 11,722,929 B2
(45) Date of Patent: *Aug. 8, 2023

(54) METHOD AND APPARATUS FOR PROCESSING PDCP CONTROL DATA IN SYSTEM SUPPORTING HIGH-RELIABILITY LOW-LATENCY SERVICE

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/486,054

(22) Filed: Sep. 27, 2021

(65) Prior Publication Data

US 2022/0014967 A1 Jan. 13, 2022

Related U.S. Application Data

(63) Continuation of application No. 16/831,319, filed on Mar. 26, 2020, now Pat. No. 11,134,415.

(30) Foreign Application Priority Data

Mar. 27, 2019 (KR) .................. 10-2019-0035018
Apr. 9, 2019 (KR) .................. 10-2019-0041526
Jul. 19, 2019 (KR) .................. 10-2019-0087751

(51) Int. Cl.
*H04W 28/06* (2009.01)
*H04L 69/22* (2022.01)
(Continued)

(52) U.S. Cl.
CPC ............. *H04W 28/06* (2013.01); *H04L 69/04* (2013.01); *H04L 69/22* (2013.01); *H04W 80/02* (2013.01)

(58) Field of Classification Search
None
See application file for complete search history.

(56) References Cited

U.S. PATENT DOCUMENTS 11,134,415 B2 * 9/2021 Kim .................. H04L 69/04
2014/0369365 A1 12/2014 Denio et al.
(Continued)

FOREIGN PATENT DOCUMENTS

KR 10-2019-0097996 A 8/2019
WO 2018/144233 A1 8/2018

OTHER PUBLICATIONS

Extended European Search Report dated Feb. 7, 2022, issued in a counterpart European Application No. 20778847.2.
(Continued)

*Primary Examiner* — Diane L Lo
(74) *Attorney, Agent, or Firm* — Jefferson IP Law, LLP

(57) ABSTRACT

The disclosure relates to A communication method and system for converging a $5^{th}$-Generation (5G) communication system for supporting higher data rates beyond a $4^{th}$-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A method for efficiently processing PDCP control data of a PDCP layer device if a system supporting a high-reliability low-latency service employs a packet duplication transmission technology is provided.

15 Claims, 39 Drawing Sheets

(51) Int. Cl.
*H04L 69/04* (2022.01)
*H04W 80/02* (2009.01)

(56) References Cited

U.S. PATENT DOCUMENTS

| | | |
|---|---|---|
| 2015/0063373 A1 | 3/2015 | Savaglio et al. |
| 2018/0234876 A1 | 8/2018 | Jheng et al. |
| 2019/0253926 A1 | 8/2019 | Kim et al. |
| 2020/0107221 A1 | 4/2020 | Prakash et al. |
| 2020/0267241 A1 | 8/2020 | Johansson et al. |

OTHER PUBLICATIONS

Qualcomm Incorporated: RoHC based Header Compression for TSN, 3GPP Draft; R2-1817913_ROHC Based Header Compression for Ethernet, 3rd Generation Partnership Project (3GPP), vol. RAN WG2, No. XP051557425; Nov. 12, 2018, Spokane, Washington.
3rd Generation Partnership Project; Technical Specification Group Radio Access Network; Study on NR Industrial Internet of Things (IoT); (Release 16), 3GPP Draft; 38825-100, 3rd Generation Partnership Project (3GPP), vol. TSG RAN, XP051690033, Mar. 11, 2019.
Samsung, Ciphering for UDC header, R2-1901743, 3GPP TSG RAN WG2 Meeting #105, Athens, Greece, Feb. 15, 2019.
3GPP; TSG RAN; NR; Radio Resource Control (RRC) protocol specification (Release 15), 3GPP TS 38.331 V15.4.0, Jan. 14, 2019.
Huawei et al., Consideration on ciphering of UDC header and compatibility for UDC, R2-1900994, 3GPP TSG RAN WG2 Meeting #105, Athens, Greece, Feb. 15, 2019.
Oppo, Discussion on Ethernet Header Compression, R2-1900182, 3GPP TSG RAN WG2 Meeting #105, Athens, Greece, Feb. 15, 2019.
International Search Report dated Jul. 6, 2020, issued in International Application No. PCT/KR2020/004143.
Indian Office Action dated Feb. 7, 2023, issued in Indian Patent Application No. 202137038842.
Extended European Search Report dated May 30, 2023, issued in European Patent Application No. 23156542.5.

* cited by examiner

METHOD AND APPARATUS FOR PROCESSING PDCP CONTROL DATA IN SYSTEM SUPPORTING HIGH-RELIABILITY LOW-LATENCY SERVICE

CROSS-REFERENCE TO RELATED APPLICATION(S)

This application is a continuation application of prior application Ser. No. 16/831,319, filed on Mar. 26, 2020, which issued as U.S. Pat. No. 11,134,415, on Sep. 28, 2021, and which is based on and claims priority under 35 U.S.C. § 119(a) of a Korean patent application number 10-2019-0035018, filed on Mar. 27, 2019, in the Korean Intellectual Property Office, and of a Korean patent application number 10-2019-0041526, filed on Apr. 9, 2019, in the Korean Intellectual Property Office, and of a Korean patent application number 10-2019-0087751, filed on Jul. 19, 2019, in the Korean Intellectual Property Office, the disclosure of each of which is incorporated by reference herein in its entirety.

BACKGROUND

1. Field

The disclosure relates to a method and an apparatus for efficiently processing packet data convergence protocol (PDCP) control data of a PDCP layer device if a system supporting a high-reliability low-latency service employs a packet duplication transmission technology.

More particularly, the disclosure relates to a method and an apparatus for supporting Ethernet header compression and decompression in a next generation mobile communication system.

2. Description of Related Art

To meet the demand for wireless data traffic having increased since deployment of $4^{th}$-Generation (4G) communication systems, efforts have been made to develop an improved $5^{th}$-Generation (5G) or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

With the development of the next generation mobile communication system, transmission resources need to be efficiently used in order to support a service requiring low latency and high reliability (for example, an ultra-reliable low latency communication (URLLC) or an industrial IoT (IIoT) service).

The above information is presented as background information only to assist with an understanding of the disclosure. No determination has been made, and no assertion is made, as to whether any of the above might be applicable as prior art with regard to the disclosure.

SUMMARY

In the next generation mobile communication system, in order to enhance the reliability and lower the latency, the same data may be transmitted through different independent paths in a carrier aggregation technology or a dual connectivity technology. In the carrier aggregation technology or the dual access technology, each radio link control (RLC) device supporting a packet duplication transmission technology may operate in an RLC acknowledgment mode (AM) or an RLC unacknowledged mode (UM), and may be activated or deactivated by MAC control information. However, in a case of applying a packet duplication transmission method, there is a need to consider a method for processing control data of a PDCP layer in order to consider ease of implementation and not to cause a problem in a reception PDCP layer device.

In addition, in the next generation mobile communication system, in order to support a service requiring low latency and high reliability (for example, an ultra-reliable low latency communication (URLLC) or an industrial IoT (IIoT) service), there is a need to efficiently use transmission resources. Further, ciphering and deciphering procedures, which incur the largest processing burden among data processing procedures of a terminal, need to be efficiently performed.

Aspects of the disclosure are to address at least the above-mentioned problems and/or disadvantages and to provide at least the advantages described below. Accordingly, an aspect of the disclosure is to provide a PDCP layer control data processing method considering ease of implementation, in order to enable efficient use of the packet duplication transmission technology that can be applied in a next generation mobile communication system, and not causing a problem in a reception PDCP layer device, thus enabling efficient use of the packet duplication transmission technology.

Another aspect of the disclosure is to provide a method for compression and decompression of an Ethernet header in a next generation mobile communication system using an Ethernet protocol, so as to enable efficient use of transmission resources. Therefore, a greater amount of data may be transmitted via a small amount of transmission resources and more reliable modulation methods may be used, so as to ensure high reliability and low latency. In addition, the disclosure proposes an efficient ciphering and deciphering method for data to which the Ethernet header decompression procedure is applied, so as to reduce the implementation complexity of a terminal and the processing burden thereof.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes determining whether a service data adaptation protocol (SDAP) header is configured and whether an Ethernet header compression (EHC) is configured, receiving data from a higher layer, and performing Ethernet header compression for the received data in a packet data convergence protocol (PDCP) layer, in case that the SDAP header and the EHC are configured, wherein the performing of the Ethernet header compression is not applied to the SDAP header and an SDAP control PDU.

In an embodiment, an EHC header is located after the SDAP header.

In an embodiment, an EHC header, which is generated in the PDCP layer, is ciphered, and a PDCP header is not ciphered.

In an embodiment, an EHC header is not generated for the SDAP control PDU.

In an embodiment, in case that both the EHC and a robust header compression (ROHC) are configured, a ROHC header is located after an EHC header.

In accordance with another aspect of the disclosure, a method performed by a base station in a wireless communication system is provided. The method includes determining whether a service data adaptation protocol (SDAP) header is configured and whether an Ethernet header compression (EHC) is configured, receiving data from a higher layer, and performing Ethernet header compression for the received data in a packet data convergence protocol (PDCP) layer, in case that the SDAP header and the EHC are configured, wherein the performing of the Ethernet header compression is not applied to the SDAP header and an SDAP control PDU.

In accordance with another aspect of the disclosure, a terminal is provided. The terminal includes a transceiver capable of transmitting or receiving at least one signal and a controller coupled to the transceiver, wherein the controller is configured to determine whether a service data adaptation protocol (SDAP) header is configured and whether an Ethernet header compression (EHC) is configured, receive data from a higher layer, and perform Ethernet header compression for the received data in a packet data convergence protocol (PDCP) layer, in case that the SDAP header and the EHC are configured, wherein the Ethernet header compression is not applied to the SDAP header and an SDAP control PDU.

In accordance with another aspect of the disclosure, a base station is provided. The base station includes a transceiver capable of transmitting or receiving at least one signal and a controller coupled to the transceiver, wherein the controller is configured to determine whether a service data adaptation protocol (SDAP) header is configured and whether an Ethernet header compression (EHC) is configured, receive data from a higher layer, and perform Ethernet header compression for the received data in a packet data convergence protocol (PDCP) layer, in case that the SDAP header and the EHC are configured, wherein the Ethernet header compression is not applied to the SDAP header and an SDAP control PDU.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1H is extended to a plurality of RLC layer devices according to an embodiment of the disclosure;

FIG. 2O illustrates a (2-4)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards. In the disclosure, the term "eNB" may be used interchangeably with the term "gNB". That is, a base station described as "eNB" may refer to "gNB".

Figure 1A:
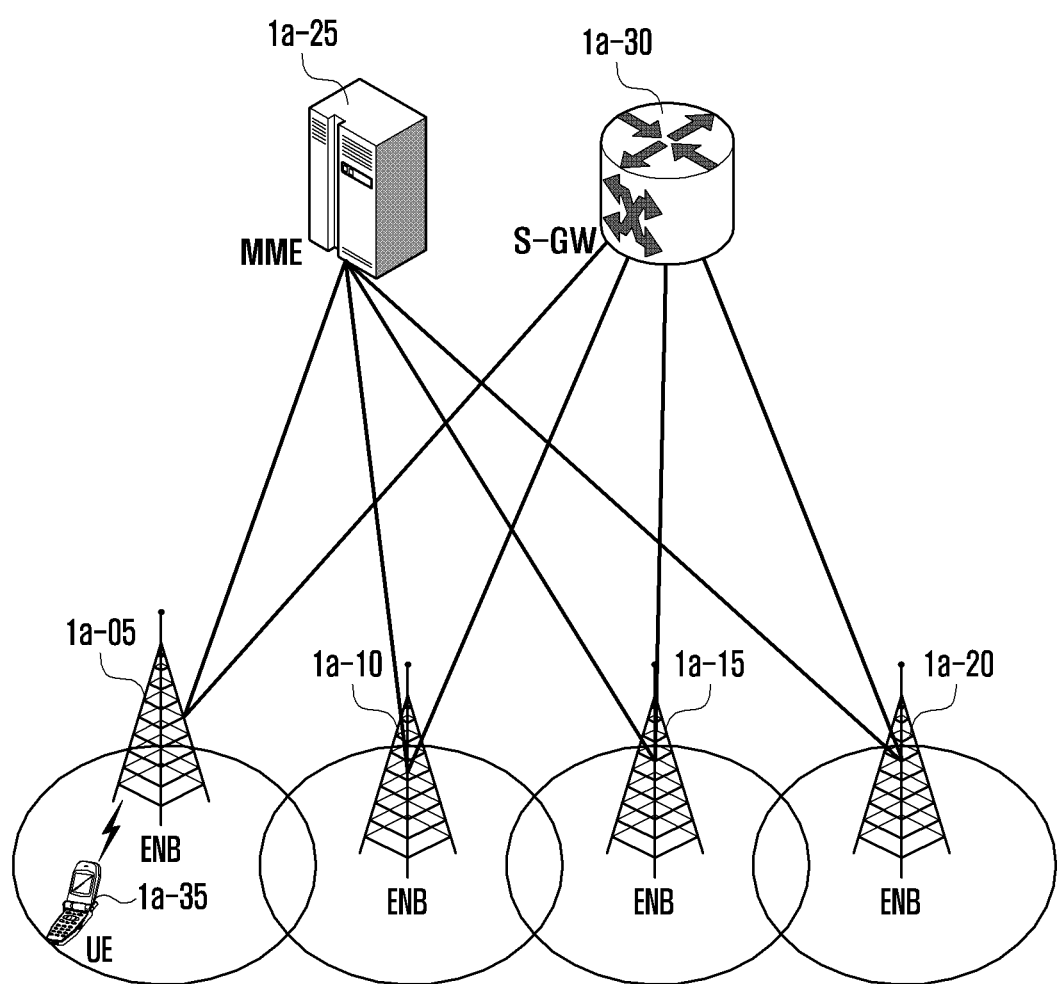
FIG. 1A illustrates the structure of an LTE system according to an embodiment of the disclosure.

FIG. 1A illustrates the structure of an LTE system according to an embodiment of the disclosure.

Referring to FIG. 1A, a radio access network of an LTE system includes a next-generation base station (evolved Node B, hereinafter referred to as an eNB, a Node B, or a base station) 1a-05, 1a-10, 1a-15, and 1a-20, a mobility management entity (MME) 1a-25, and a serving-gateway (S-GW) 1a-30. A user equipment (hereinafter referred to as a UE or a terminal) 1a-35 is connected to an external network through the eNBs 1a-05, 1a-10, 1a-15, and 1a-20, and the S-GW 1a-30.

In FIG. 1A, the eNBs 1a-05, 1a-10, 1a-15, and 1a-20 correspond to a legacy Node B of a UMTS system. The eNB is connected to the UE 1a-35 through a radio channel and plays a more complicated role than the legacy Node B. In an LTE system, since all user traffic, including real-time services such as voice over IP (VoIP) over the Internet protocol, is serviced through a shared channel, there is a need for a device that performs scheduling by collecting state information, such as buffer states, available transmit power states, and channel states of UEs. The eNBs 1a-05 to 1a-20 may function as the device for performing scheduling. One eNB generally controls a plurality of cells. For example, in order to realize a transmission rate of 100 Mbps, the LTE system uses orthogonal frequency division multiplexing (hereinafter, referred to as OFDM) scheme in a 20 MHz bandwidth, as a radio access technology. In addition, an adaptive modulation & coding (hereinafter referred to as AMC) scheme that determines a modulation scheme and a channel coding rate according to the channel state of a UE is employed. The S-GW 1a-30 is a device for providing a data bearer, and generates or removes a data bearer under the control of the MME 1a-25. The MME is a device that is in charge of various control functions as well as a mobility management function for the UE and is connected to a plurality of base stations.

Figure 1B:
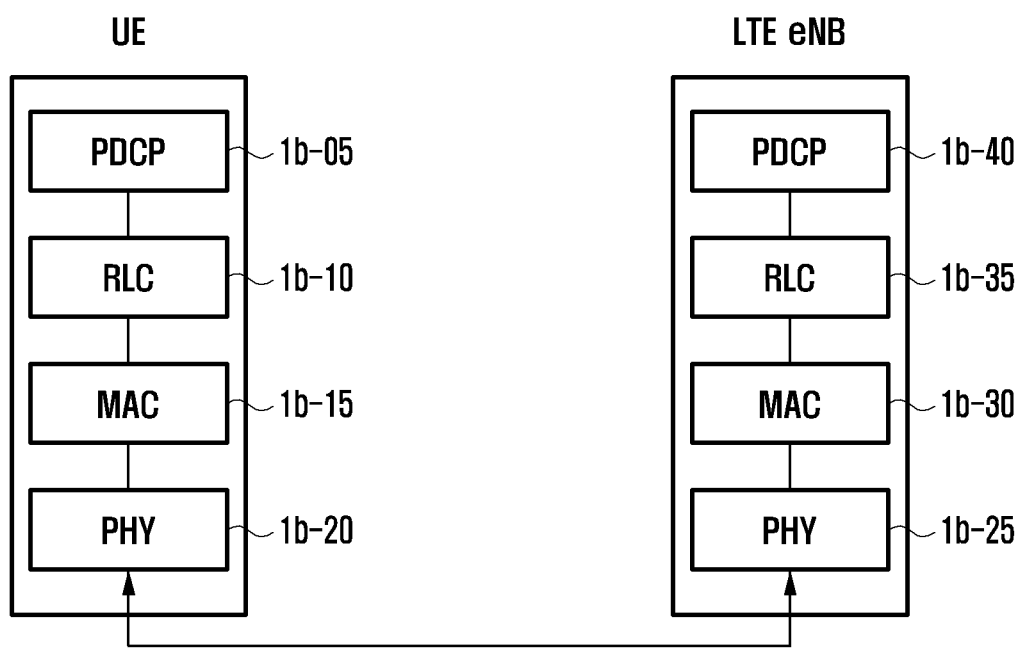
FIG. 1B illustrates a radio protocol structure in an LTE system according to an embodiment of the disclosure.

FIG. 1B illustrates a radio protocol structure in an LTE system according to an embodiment of the disclosure.

Referring to FIG. 1B, a radio protocol of an LTE system includes, for each of a UE and an eNB, packet data convergence protocols (PDCPs) 1b-05 and 1b-40, radio link controls (RLCs) 1b-10 and 1b-35, and medium access controls (MACs) 1b-15 and 1b-30. PDCPs 1b-05 and 1b-40 are in charge of an operation such as IP header compression/reconstruction. The main functions of PDCP are summarized as follows.

- Header compression and decompression: ROHC only
- Transfer of user data
- In-sequence delivery of higher layer PDUs at PDCP re-establishment procedure for RLC AM
- For split bearers in DC (only support for RLC AM): PDCP PDU routing for transmission and PDCP PDU reordering for reception
- Duplicate detection of lower layer SDUs at PDCP re-establishment procedure for RLC AM
- Retransmission of PDCP SDUs at handover and, for split bearers in DC, of PDCP PDUs at PDCP data-recovery procedure, for RLC AM
- Ciphering and deciphering
- Timer-based SDU discard in uplink The radio link controls (hereinafter referred to as RLCs) 1b-10 and 1b-35 reconfigure a PDCP packet data unit (PDU) to an appropriate size to perform an ARQ operation. The main functions of RLCs are summarized as follows.

- Transfer of higher layer PDUs
- Error Correction through ARQ (only for AM data transfer)
- Concatenation, segmentation and reassembly of RLC SDUs (only for UM and AM data transfer)
- Re-segmentation of RLC data PDUs (only for AM data transfer)
- Reordering of RLC data PDUs (only for UM and AM data transfer)
- Duplicate detection (only for UM and AM data transfer)
- Protocol error detection (only for AM data transfer)
- RLC SDU discard (only for UM and AM data transfer)
- RLC re-establishment The MACs 1b-15 and 1b-30 are connected to multiple RLC layer devices configured in one terminal, and may perform an operation of multiplexing RLC PDUs with a MAC PDU and demultiplexing the RLC PDUs from the MAC PDU. The main functions of the MAC are summarized as follows.

- Mapping between logical channels and transport channels
- Multiplexing/demultiplexing of MAC SDUs belonging to one or different logical channels into/from transport blocks (TB) delivered to/from the physical layer on transport channels
- Scheduling information reporting Error correction through HARQ
Priority handling between logical channels of one UE
Priority handling between UEs by means of dynamic scheduling
MBMS service identification
Transport format selection
Padding Physical layers 1b-20 and 1b-25 may perform an operation of channel coding and modulating higher layer data, generating the higher layer data into an OFDM symbol, transmitting the OFDM symbol through a radio channel, or demodulating an OFDM symbol received through a radio channel, channel-decoding the OFDM symbol, and transmitting the OFDM symbol to a higher layer.

Figure 1C:
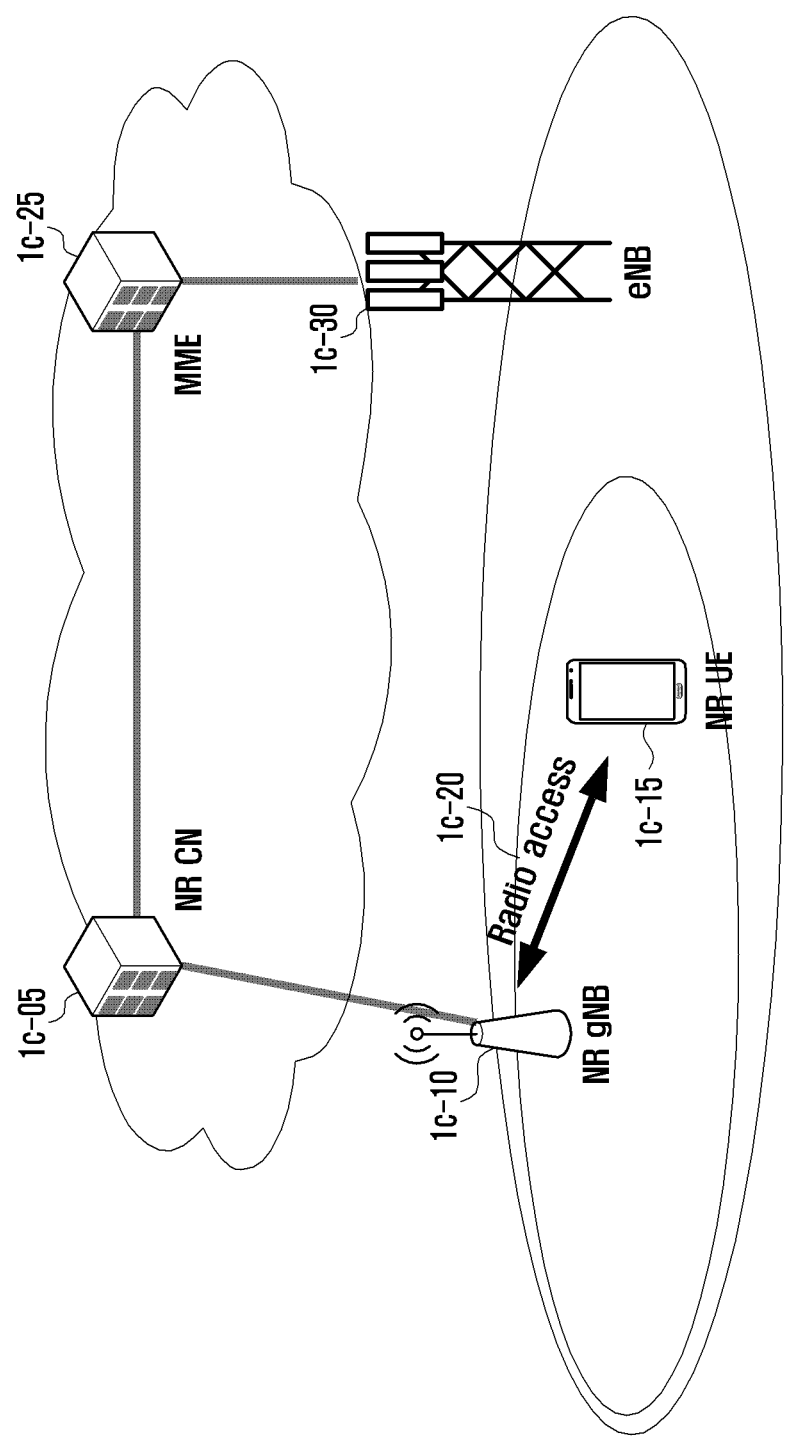
FIG. 1C illustrates a structure of a next generation mobile communication system according to an embodiment of the disclosure.

FIG. 1C illustrates the structure of a next generation mobile communication system according to an embodiment of the disclosure.

Referring to FIG. 1C, a radio access network of a next generation mobile communication system includes a next generation base station (new radio node B, (hereinafter referred to as an NR gNB or an NR base station) 1c-10 and a new radio core network (NR CN) 1c-05. A user equipment (a new radio user equipment, hereinafter referred to as an NR UE or a terminal) 1c-15 accesses an external network via an NR gNB 1c-10 and an NR CN 1c-05.

In FIG. 1C, the NR gNB 1c-10 corresponds to an evolved node B (eNB) of the legacy LTE system. The NR gNB is connected to the NR UE 1c-15 via a radio channel and may provide a more excellent service as compared to the legacy node B. In the next generation mobile communication system, since all types of user traffics are serviced through a shared channel, there is a need for a device for performing scheduling by collecting state information, such as buffer states, available transmission power states, and channel states of UEs. Further, the NR gNB 1C-10 is in charge of such a function of the device. One NR gNB generally controls a plurality of cells. In order to implement ultra-high speed data transmission as compared to the legacy LTE, the NR gNB may have the legacy maximum bandwidth or more, and may additionally employ beamforming technology using an orthogonal frequency division multiplexing (hereinafter, referred to as OFDM) as a radio access technology. In addition, the NR gNB adopts an adaptive modulation & coding (hereinafter referred to as AMC) scheme that determines a modulation scheme and a channel coding rate based on the channel state of a UE. The NR CN 1c-05 performs functions, such as mobility support, bearer setup, and QoS configuration. The NR CN is a device that is in charge of various control functions as well as a mobility management function for a UE, and is connected to a plurality of base stations. In addition, the next generation mobile communication system may further operate in conjunction with the legacy LTE system, and the NR CN is connected to an MME 1c-25 via a network interface. The MME is connected to an eNB 1c-30, that is, the legacy base station.

Figure 1D:
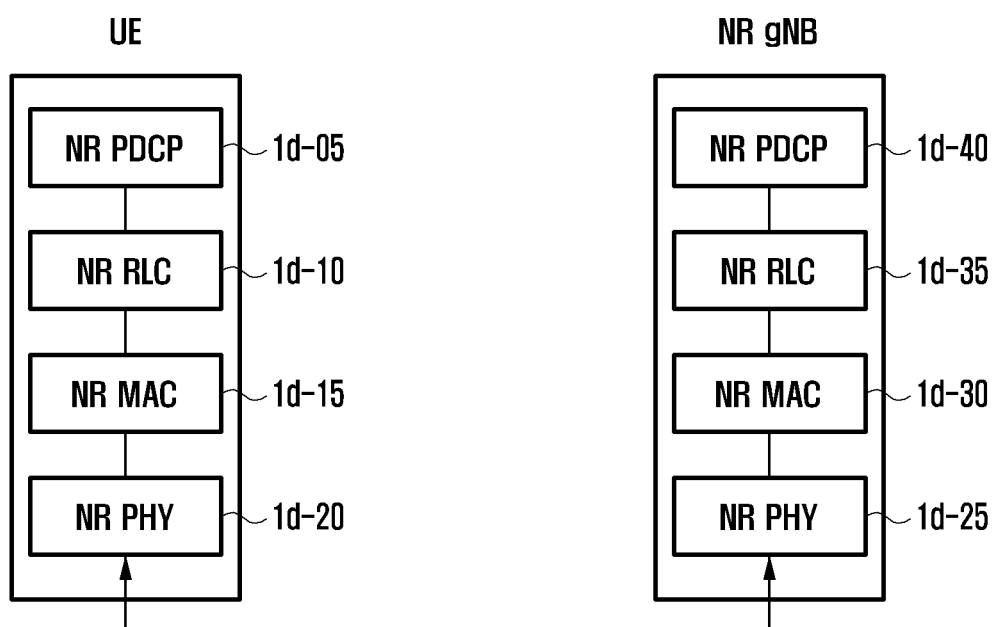
FIG. 1D illustrates a radio protocol structure of a next generation mobile communication system according to an embodiment of the disclosure.

FIG. 1D illustrates a radio protocol architecture of a next generation mobile communication system according to an embodiment of the disclosure.

Referring to FIG. 1D, the radio protocol of the next generation mobile communication system includes, for each of a UE and an NR base station, NR PDCPs 1d-05 and 1d-40, and NR RLCs 1d-10 and 1d-35, and NR MACs 1d-15 and 1d-30. The main function of the NR PDCPs 1d-05 and 1d-40 may include a part of the functions as follows:
Header compression and decompression: ROHC only
Transfer of user data
In-sequence delivery of higher layer PDUs
Out-of-sequence delivery of higher layer PDUs
PDCP PDU reordering for reception
Duplicate detection of lower layer SDUs
Retransmission of PDCP SDUs
Ciphering and deciphering
Timer-based SDU discard in uplink The reordering function of the NR PDCP device refers to a function of sequentially reordering PDCP PDUs, received from a lower layer, based on a PDCP sequence number (SN), and may include a function of transmitting data to a higher layer in the sequence of reordering, a function of transmitting data without considering the sequence, a function of reordering the sequence and recording missing PDCP PDUs, a function of providing a state report on the missing PDCP PDUs to a transmission side, and a function of requesting retransmission for the missing PDCP PDUs.

The main functions of the NR RLCs 1d-10 and 1d-35 may include a part of the functions as follows:
Transfer of higher layer PDUs
In-sequence delivery of higher layer PDUs
Out-of-sequence delivery of higher layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery function of the NR RLC device refers to a function of transmitting RLC SDUs, received from a lower layer, to a higher layer in the sequence of reception, and may include: if one RLC SDU is originally segmented into multiple RLC SDUs and received, a function of reassembling and transmitting the multiple RLC SDUs; a function of reordering the received RLC PDUs based on an RLC sequence number (SN) or PDCP SN; a function of reordering the sequence and recording missing RLC PDUs; a function of providing a state report on the missing RLC PDUs to a transmission side; and a function of requesting retransmission for the missing RLC PDUs. Alternatively, if the missing RLC SDU occurs, the in-sequence delivery function of the NR RLC device may include a function of sequentially transmitting only the RLC SDUs prior to the missing RLC SDU to a higher layer or sequentially transmitting all the RLC SDUs received before a timer starts to a higher layer if a predetermined timer expires although there is a missing RLC SDU, or sequentially transmitting all RLC SDUs received so far to a higher layer if a predetermined timer expires although there is a missing RLC SDU. In addition, the RLC PDUs may be processed in the sequence that the RLC PDUS are received (in the sequence of arrival regardless of the sequence of serial number and sequence number), and may be transmitted to a PDCP device out of sequence delivery. For segments, the in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer or may be replaced by a multiplexing function of the NR MAC layer.

The out-of-sequence delivery function of the NR RLC device refers to a function of directly transmitting the RLC SDUs, received from the lower layer, to a higher layer regardless of the order, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs 1d-15 and 1d-30 may be connected to multiple NR RLC layer devices configured in one UE, and a main function of the NR MAC may include a part of the functions as follows:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 1d-20 and 1d-25 may perform an operation of channel-coding and modulating higher layer data, generating the higher layer data into an OFDM symbol, transmitting the OFDM symbols via a radio channel, or demodulating and channel decoding of the OFDM symbols received via the radio channel, and transferring the OFDM symbol to a higher layer.

In the disclosure, a transmission terminal device may be a base station or a UE, and the reception terminal device may be a base station or a UE. That is, the disclosure may include both the case where the transmission terminal device is a base station and the reception terminal device is a UE (downlink data transmission scenario), or the case where the transmission terminal device is a UE and the reception terminal device is a base station (uplink data transmission scenario). The transmission terminal device may indicate a base station or a UE, and the reception terminal device may indicate a base station or a UE.

The disclosure considers a UE for which a carrier aggregation (CA), a dual connectivity (DC) technology, or a packet duplication transmission technology are configured, and specifies a proposed method using the following terms.

Primary cell (Pcell): Pcell refers to a serving cell used in a case where a UE establishes a first connection with a base station, and a connection is established by transmitting or receiving a major RRC message using the Pcell. In addition, the Pcell may indicate HARQ ACK or NACK since the Pcell always has a PUCCH transmission resource, and both uplink and downlink are always configured therein, and the Pcell may be used as a reference cell for timing adjustment (timing advance, a primary timing advance group (pTAG)). For example, if a carrier aggregation technology is configured after configuration of the Pcell, and a S cell is added thereto, the S cell may perform uplink data transmission by making reference to the timing advance value of the Pcell. In addition, if the dual access technology is configured, Pcell refers to PCell of a master cell group (MCG).

Master cell group (MCG): MCG refers to a serving cell in which a UE initially establishes a connection with a base station or a group of cells supported by a base station. If dual access technology is configured, main RRC messages are transmitted or received through the MCG.

Secondary cell group (SCG): SCG refers to a group of cells supported by another base station in addition to the MCG, in which a UE may establish a connection with a base station and add cells of the another base station. Further, if the dual access technology is established, the SCG may be added to increase the additional data rate or to efficiently support the mobility of the UE.

Primary secondary cell (PScell): If a dual access technology is configured in which a UE establishes a connection with a base station and a group of cells of another base station is added in addition to the MCG, a cell corresponding to the Pcell in the SCG is referred to as a PScell.

Secondary cell (Scell): Scell is a cell additionally configured by a base station in order to configure carrier aggregation technology after a UE establishes a first connection with the base station. The SCell may have a PUCCH transmission resource according to a base station configuration, and an uplink or a downlink may be configured therein according to the configuration of the base station. In addition, the SCell may be used as a reference cell for timing advance (secondary timing advance group (sTAG)) according to the configuration of the base station. For example, if the carrier aggregation technology is configured after the configuration of the Pcell, Scells are added thereto, and the sTAG is configured, other Scells of the sTAG may perform uplink data transmission by making reference to a timing advance value of a designated Scell. In addition, if the dual access technology is configured for a UE, Scell refers to Scells except the PCell of the master cell group (MCG) or Scells except the PScell of the secondary cell group (SCG).

Primary RLC entity: If the packet duplication configuration technology is configured, a plurality of RLC layer devices may be configured in one PDCP layer device, and one RLC layer device, which is always used without being deactivated among the plurality of RLC layer devices, is referred to as a primary RLC entity. In addition, the PDCP layer device may always transmit a PDCP control PDU to the primary RLC entity without performing duplicate transmission thereof Secondary RLC entity: If the packet duplication configuration technology is configured, a plurality of RLC layer devices may be configured in one PDCP layer device, the remaining RLC layer devices except for the primary RLC entity among the plurality of RLC layer devices are referred to as secondary RLC entities.

The disclosure proposes a method for dynamic packet duplication transmission, which enables dynamic duplicate transmission of zero, one, two, or up to three packets in order to enhance the reliability and lower the latency for a UE for which a carrier aggregation technology (CA), a dual connectivity technology (DC), or a packet duplication technology has been configured. In other words, the disclosure proposes a method for transmission data, in which one piece of raw data together with up to three pieces of copied data can be transmitted.

In the disclosure, the packet duplication technology may be configured for a UE through an RRC message by applying a dual access technology or a carrier dual access technology. Specifically, a plurality of RLC layer devices may be configured to be connected to one MAC layer device, and a plurality of RLC layer devices may be configured to be connected to one PDCP layer device and perform packet duplication thereof. According to another method, a plurality of RLC layer devices are configured to be connected to one MCG MAC layer device, a plurality of RLC layer devices are configured to be connected to one SCG MAC layer device, the plurality of RLC layer devices connected to different MAC layer devices may be configured to be connected to one PDCP layer device, and then packet duplication thereof may be configured to be performed.

In addition, the RRC message may indicate which RLC layer device among the plurality of RLC layer devices is a primary RLC entity and which are secondary RLC entities, using a logical channel identifier and a bearer identifier. For example, cell group configuration information may indicate configuration information of each RLC layer device, and may indicate a bearer identifier and a logical channel identifier corresponding to each RLC layer device. In addition, the bearer setup information may indicate configuration information of each PDCP layer device and indicate a bearer identifier corresponding to each PDCP layer device, and if a plurality of RLC layer devices are configured for the PDCP layer device or the bearer identifier, the bearer setup information may indicate a primary RLC entity via a logical channel identifier corresponding to the primary RLC entity. Accordingly, upon receiving the RRC message, a UE may configure a PDCP layer device based on a bearer identifier, connect a plurality of RLC layer devices corresponding to the bearer identifier to the PDCP layer device, and designate a primary RLC entity and a plurality of secondary RLC entities.

The disclosure considers an embodiment in which one primary RLC entity and up to three secondary RLC entities may be configured. Embodiments proposed in the disclosure may be extended to embodiments in which one or a plurality of primary RLC entities or secondary RLC entities are configured.

The disclosure proposes a method for efficiently processing PDCP control data (PDCP control PDU) generated by the PDCP layer device if the packet duplication transmission technology is configured as described above.

In the (1-1)th embodiment or the (1-2)th embodiment, which efficiently processes PDCP control data (PDCP control PDU) generated by the PDCP layer device if the packet duplication transmission technology proposed by the disclosure is configured, the PDCP layer device: configures PDCP data (PDCP PDU) for PDCP SDU received from a higher layer, and transmits the PDCP data in duplicate to a plurality of secondary RLC entities; applies packet duplication to PDCP control data generated by the PDCP layer device and transmits the duplicated PDCP control data to a plurality of secondary RLC entities. However, a reception PDCP layer device does not process the duplicated PDCP control data multiple times and if the duplicated PDCP control data has already been received by detecting duplication, the PDCP layer device defines and indicates a new field in the duplicated PDCP control data in order to discard the duplicated PDCP control data. In UE implementation, there is an advantage in that packet duplication can be collectively applied to PDCP data (PDCP SDU) received from a higher layer and PDCP control data generated by the PDCP layer device without distinguishing the PDCP data and the PDCP control data.

In the (1-3)th embodiment, which efficiently processes PDCP control data (PDCP control PDU) generated by the PDCP layer device if the packet duplication transmission technology proposed by the disclosure is configured, the PDCP layer device may configure PDCP data (PDCP PDU) for PDCP SDUs received from a higher layer and transmit the PDCP data in duplicate to a primary RLC entity and a plurality of secondary RLC entities, and may not apply packet duplication to PDCP control data generated by the PDCP layer device and always transmit the duplicated PDCP control data to the primary RLC entity instead of transmitting the same to the secondary RLC entities. Since the primary RLC entity may always be in an activated state in the packet duplication technology, in UE implementation, it is easier to transmit PDCP control data to the primary RLC entity than to transmit PDCP control data to the secondary RLC entity, which can be changed into an activated state or a deactivated state.

Figure 1E:
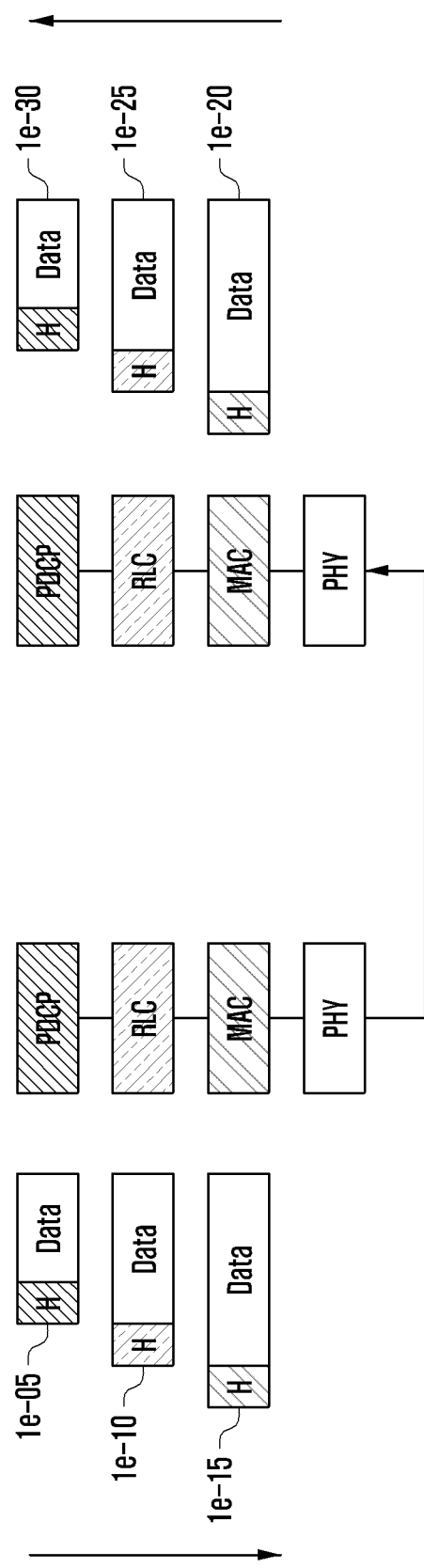
FIG. 1E illustrates a procedure in which data is processed at each layer in a next generation mobile communication system according to an embodiment of the disclosure.

FIG. 1E illustrates a procedure in which data is processed at each layer in a next generation mobile communication system according to an embodiment of the disclosure.

Referring to FIG. 1E, if an IP packet arrives at a PDCP layer device, the PDCP layer may perform a functional operation of the PDCP layer described in FIG. 1D in the above and configure a PDCP header, and thus configure data indicated by reference numeral 1e-05 and transfer the data to a lower layer. The RLC layer, which is a lower layer may recognize the entire PDCP PDU 1e-05, received by the PDCP layer, as one data, may perform an operation according to the RLC layer function described in FIG. 1D, and may configure an RLC header 1e-10 and transfer the same to a lower layer. If the MAC layer device, which is the lower layer, receives the header 1e-10 from the RLC layer, that is, upon receiving the RLC PDU, the MAC layer device recognizes the entire data, performs the functions of the MAC layer device described in FIG. 1D, and configures an MAC sub header 1e-15 and transfer the same to the lower layer.

If the reception MAC layer device of FIG. 1E receives an MAC PDU from the lower layer, the MAC layer device may read the contents of the MAC sub-header 1e-20, and may regard all the remaining as data and transfer the same to the RLC layer, which is the higher layer. If the RLC layer receives data 1e-25, the RLC layer reads only the RLC header corresponding to the RLC layer, performs an RLC layer function corresponding thereto, and transfers data 1e-30 to the higher layer. Similarly, the PDCP layer may read only the PDCP header, may perform an operation corresponding to the PDCP layer device, may remove the PDCP header, and may transfer the same to the higher layer.

As described above, each layer of the next-generation mobile communication system may read only header corresponding to each layer, and may not read headers or data of other layers. Therefore, each layer may manage and process independent information.

Figure 1F:
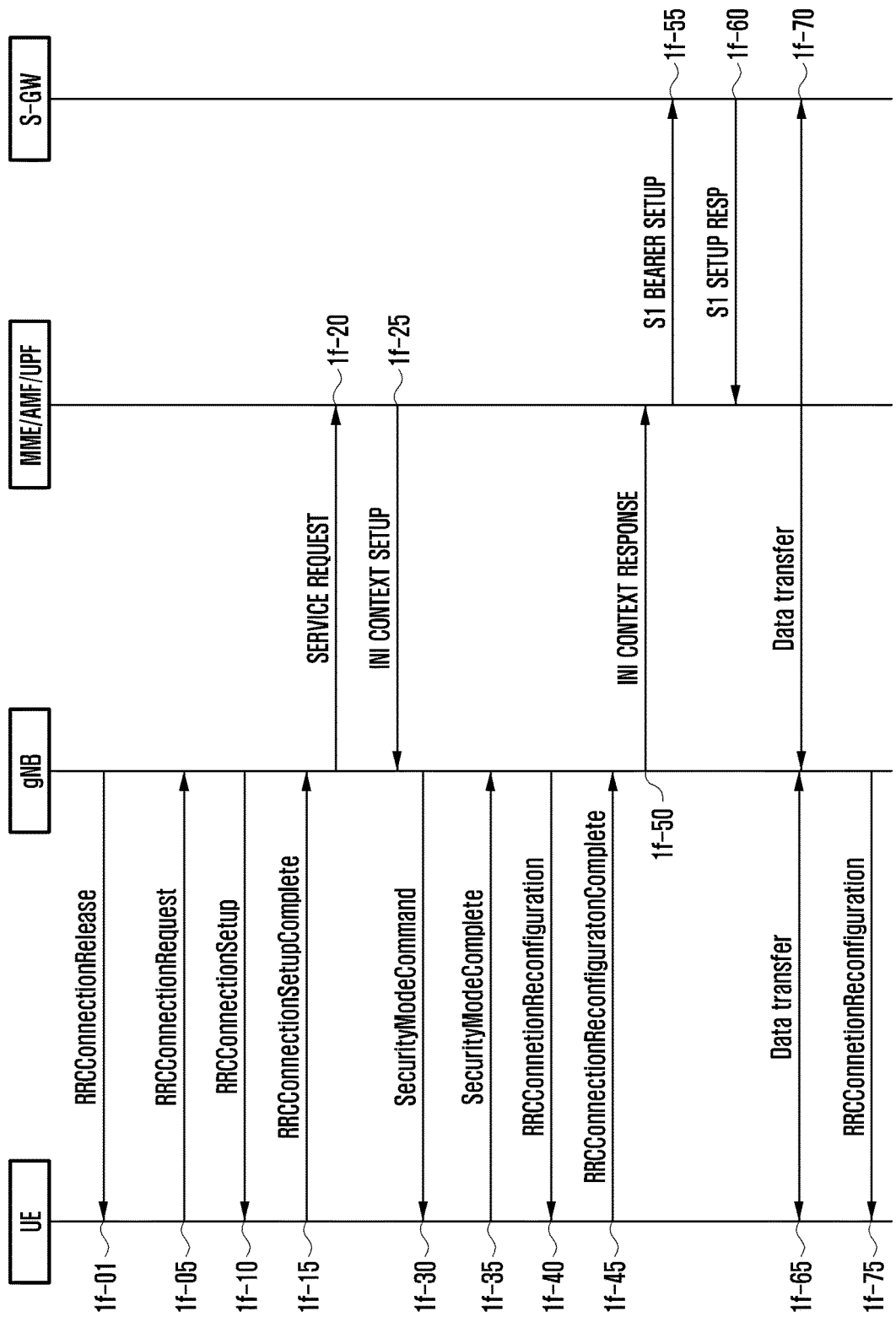
FIG. 1F illustrates a procedure of configuring a packet duplication transmission function in a PDCP layer, by a base station, through an RRC message if a user equipment (UE) establishes a connection with a network according to an embodiment of the disclosure.

FIG. 1F illustrates a procedure of configuring a packet duplication transmission function in a PDCP layer through an RRC message if a UE establishes a connection with a network according to an embodiment of the disclosure.

FIG. 1F illustrates a procedure in which a UE switches from an RRC idle mode or an RRC inactive mode (or lightly-connected mode) to an RRC connected mode and establishes a connection with a network, and illustrates a procedure of configuring uplink packet duplication transmission function (PDCP packet duplication) of the PDCP layer according to an embodiment of the disclosure. The procedure may be equally applied to configuration of a downlink packet duplication transmission function, and the uplink packet duplication transmission function configuration may also be used to configure both uplink and downlink packet duplication transmission functions.

Referring to FIG. 1F, if a UE for performing data transmission or reception in the RRC connected mode does not perform data transmission or reception for a predetermined reason or for a predetermined time, a base station may transmit a message to the UE to allow the UE to be switched to the RRC idle mode (indicated by reference numeral 1*f*-01). The message may be an RRCConnectionRelease message. Subsequently, a UE (hereinafter, idle mode UE), to which a connection is not currently established, may perform an RRC connection establishment process with the base station if there is data to be transmitted. If the UE is in the RRC inactive mode, the UE may transmit a message to perform an RRC connection resumption procedure. The message may be an RRCConnectionResumeRequest message. The UE establishes reverse transmission synchronization with the base station through a random access process and transmits a message to the base station (indicated by reference numeral 1*f*-05). The message may be an RRCConnectionRequest message. The message may include a cause (establishmentCause) for establishing a connection with an identifier of the UE. The base station may transmit an RRCConnectionSetup message so that the UE establishes an RRC connection (indicated by reference numeral 1*f*-10). The message may configure whether to use the packet duplication transmission function for each logical channel (logical channelconfig) or for each bearer or for each PDCP device (PDCP-config). Specifically, the message may designate a primary RLC entity and a secondary RLC entity which are connected to the PDCP layer device and can be used for packet duplicate transmission, the primary RLC entity or the secondary RLC entity may be indicated by a logical channel identifier or one RLC layer device of a master cell group (MCG) or a secondary cell group (SCG). Further, if the message configures two RLC layer devices to be connected to the PDCP layer device, a threshold that can be used by a split bearer may be configured. If the amount of data to be transmitted in the case of operating as a split bearer is less than the threshold, data transmission may be performed only to the primary RLC entity, and if the amount of data to be transmitted is greater than the threshold, data transmission may be performed to a primary RLC entity and a secondary RLC entity. The configured threshold and the primary RLC entity and the secondary RLC entity activate and use the packet duplication transmission function in dual connectivity, fall back to the split bearer if the packet duplication transmission function is deactivated via the MAC control information, and may continuously transmit or receive data. In addition, if the message configures the packet duplication transmission function, it is possible to configure whether to activate or deactivate the packet duplication transmission function for a data radio bearer (DRB). Alternatively, if the packet duplication transmission function is configured, the message designates the packet duplication transmission function to be in an activated state or deactivated state. In particular, in the case of a control bearer (signaling radio bearer (SRB)) rather than a data bearer, a packet duplication transmission function may be configured always to be activated. Alternatively, the packet duplication transmission function may be configured always to be deactivated. In addition, in a case of configuring the packet duplication transmission function, the message may designate and configure an initial state to be activated or deactivated. In addition, in a case of configuring the packet duplication transmission function, the message may designate a default RLC entity to which the PDCP layer device transmits data in the deactivated state, and the default RLC entity may be designated as a primary RLC entity or a secondary RLC entity, or may be indicated by a logical channel identifier. In addition, the packet duplication transmission technology is configured in order to prevent unnecessary configuration information from being increased in the message, and if the packet duplication transmission function is in a deactivated state, the PDCP layer device may be allowed to always transmit data to the primary RLC entity (the primary RLC entity is always used in the activated state and in the deactivated state, and thus ease of implementation is improved). In addition, the message may include mapping information between logical channel identifiers to which the packet duplication transmission technology is applied and cells to which the packet duplication transmission technology is applied, that is, the message may be configured to include, in a case of applying packet duplication transmission technology, mapping information indicating whether data corresponding to a certain logical channel identifier is transmitted to a certain cell (the logical channel identifiers may be configured to transmit data to the mapped cells only). The mapping information between the logical channel identifier and the cell, configured in the message, may release a mapping relationship, if the packet duplication transmission function is deactivated, and transmit data corresponding to the logical channel identifier to an arbitrary cell. In addition, the message may include indication information indicating whether to perform packet duplication transmission for PDCP control data (PDCP Control PDU) for each bearer or logical channel, and the indication information indicates one RLC layer device to which data is transmitted, by applying a packet duplication transmission technology to the PDCP control data, without transmitting data to the plurality of RLC layer devices. The indicated RLC layer device may be indicated as a primary RLC entity or a secondary RLC entity, and if there is no indication information, the message may always be transmitted to the primary RLC entity.

Specifically, the packet duplication technology may be configured for a UE through an RRC message by applying a dual access technology or a carrier dual access technology. Specifically, a plurality of RLC layer devices may be configured to be connected to one MAC layer device, and a plurality of RLC layer devices may be configured to be connected to one PDCP layer device and perform packet duplication thereof. According to another method, a plurality of RLC layer devices are configured to be connected to one MCG MAC layer device, a plurality of RLC layer devices are configured to be connected to one SCG MAC layer device, the plurality of RLC layer devices connected to different MAC layer devices may be configured to be connected to one PDCP layer device, and then packet duplication thereof may be configured to be performed. In addition, the RRC message may indicate which RLC layer device among the plurality of RLC layer devices is a primary RLC entity and which are secondary RLC entities, using a logical channel identifier and a bearer identifier. For example, cell group configuration information may indicate configuration information of each RLC layer device, and may indicate a bearer identifier and a logical channel identifier corresponding to each RLC layer device. In addition, the bearer setup information may indicate configuration information of each PDCP layer device and indicate a bearer identifier corresponding to each PDCP layer device, and if a plurality of RLC layer devices are configured for the PDCP layer device or the bearer identifier, the bearer setup information may indicate a primary RLC entity via a logical channel identifier corresponding to the primary RLC entity. Accordingly, upon receiving the RRC message, a UE may configure a PDCP layer device based on a bearer identifier, connect a plurality of RLC layer devices corresponding to the bearer identifier to the PDCP layer device, and designate a primary RLC entity and a plurality of secondary RLC entities.

In addition, the message may include RRC connection configuration information. The RRC connection is also referred to as a signaling radio bearer (SRB) and is used for transmitting or receiving an RRC message, which is a control message between a UE and a base station. A UE, which has established an RRC connection, may transmit an RRCConnetionSetupComplete message to the base station (indicated by reference numeral 1*f*-15). If the base station does not know UE capability for a UE that is currently establishing a connection or if the base station desires to identify UE capability, the base station may transmit a message asking about the UE capability. Further, the UE may transmit a message reporting its own capability. The message may indicate whether the UE supports a new packet duplicating transmission function, and the UE may include an indicator indicating whether the UE supports the new packet duplicating transmission function in the message and transmit the same. The message includes a control message (for example, SERVICE REQUEST), requesting a bearer setup for a predetermined service from an MME, an access and mobility management function (AMF), a user plane function (UPF), or a session management function (SMF). The message may be an RRCConnetionSetupComplete message. The base station may transmit the control message stored in the message to the MME, AMF, UPF, or SMF (indicated by reference numeral 1*f*-20). The MME may determine whether to provide a service requested by the UE. As a result of the determination, if the UE determines to provide the requested service, the MME, AMF, UPF, or SMF may transmit an INITIAL CONTEXT SETUP REQUEST message to the base station (indicated by reference numeral 1*f*-25). The message may include information, such as quality of service (QoS) information to be applied in a case where a data radio bearer (DRB) is configured and security-related information (for example, a security key and a security algorithm) to be applied to the DRB. The base station may exchange a SecurityModeCommand message 1*f*-30 and a SecurityModeComplete message 1*f*-35 in order to establish security with the UE. If the security configuration is completed, the base station may transmit an RRCConnectionReconfiguration message to the UE (indicated by reference numeral 1*f*-40). The message may configure whether to use the packet duplication transmission function for each logical channel (logical channelconfig) or for each bearer or for each PDCP device (PDCP-config). Specifically, the message may designate a primary RLC entity and a secondary RLC entity which are connected to the PDCP layer device and can be used for packet duplicate transmission, the primary RLC entity or the secondary RLC entity may be indicated by a logical channel identifier or one RLC layer device of a master cell group (MCG) or a secondary cell group (SCG). Further, if the message configures two RLC layer devices to be connected to the PDCP layer device, a threshold that can be used by a split bearer may be configured. If the amount of data to be transmitted if operating as a split bearer is less than the threshold, data transmission may be performed only to the primary RLC entity, and if the amount of data to be transmitted is greater than the threshold, data transmission may be performed to a primary RLC entity and a secondary RLC entity. The configured threshold and the primary RLC entity and the secondary RLC entity activate and use the packet duplication transmission function in dual connectivity, fall back to the split bearer if the packet duplication transmission function is deactivated through the MAC control information, and may continuously transmit or receive data. In addition, if the message configures the packet duplication transmission function, it is possible to configure whether to activate or deactivate the packet duplication transmission function for a data radio bearer (DRB). Alternatively, if the packet duplication transmission function is configured, the message designates the packet duplication transmission function to be in an activated state or deactivated state. In particular, in the case of a control bearer (signaling radio bearer (SRB)) rather than a data bearer, a packet duplication transmission function may be configured always to be activated. Alternatively, the packet duplication transmission function may be configured always to be deactivated. In addition, if the packet duplication transmission function is configured, the message may designate and configure an initial state to be activated or deactivated. In addition, if the packet duplication transmission function is configured, the message may designate a default RLC entity to which the PDCP layer device transmits data in the deactivated state, and the default RLC entity may be designated as a primary RLC entity or a secondary RLC entity, or may be indicated by a logical channel identifier. In addition, the packet duplication transmission technology is configured in order to prevent unnecessary configuration information from being increased in the message, and if the packet duplication transmission function is in a deactivated state, the PDCP layer device may be allowed to always transmit data to the primary RLC entity (the primary RLC entity is always used in the activated state and in the deactivated state, and thus ease of implementation is improved). In addition, the message may include mapping information between logical channel identifiers to which the packet duplication transmission technology is applied and cells to which the packet duplication transmission technology is applied, that is, the message may be configured to include, in a case of applying packet duplication transmission technology, mapping information indicating whether data corresponding to a certain logical channel identifier is transmitted to a certain cell (the logical channel identifiers may be configured to transmit data only to the mapped cells). The mapping information between the logical channel identifier and the cell, configured in the message, may release a mapping relationship, if the packet duplication transmission function is deactivated, and transmit data corresponding to the logical channel identifier to an arbitrary cell. In addition, the message may include indication information indicating whether to perform packet duplication transmission for PDCP control data (PDCP Control PDU) for each bearer or logical channel, and the indication information indicates one RLC layer device to which data is transmitted, by applying a packet duplication transmission technology to the PDCP control data, without transmission of two pieces of RLC layer data. The indicated RLC layer device may be indicated as a primary RLC entity or a secondary RLC entity, and if there is no indication information, the message may always be transmitted to the primary RLC entity.

Specifically, the packet duplication technology may be configured for a UE through an RRC message by applying a dual access technology or a carrier dual access technology. Specifically, a plurality of RLC layer devices may be configured to be connected to one MAC layer device, and a plurality of RLC layer devices may be configured to be connected to one PDCP layer device and perform packet duplication thereof. According to another method, a plurality of RLC layer devices are configured to be connected to one MCG MAC layer device, a plurality of RLC layer devices are configured to be connected to one SCG MAC layer device, the plurality of RLC layer devices connected to different MAC layer devices may be configured to be connected to one PDCP layer device, and then packet duplication thereof may be configured to be performed. In addition, the RRC message may indicate which RLC layer device among the plurality of RLC layer devices is a primary RLC entity and which are secondary RLC entities, using a logical channel identifier and a bearer identifier. For example, cell group configuration information may indicate configuration information of each RLC layer device, and may indicate a bearer identifier and a logical channel identifier corresponding to each RLC layer device. In addition, the bearer setup information may indicate configuration information of each PDCP layer device and indicate a bearer identifier corresponding to each PDCP layer device, and if a plurality of RLC layer devices are configured for the PDCP layer device or the bearer identifier, the bearer setup information may indicate a primary RLC entity via a logical channel identifier corresponding to the primary RLC entity. Accordingly, upon receiving the RRC message, a UE may configure a PDCP layer device based on a bearer identifier, connect a plurality of RLC layer devices corresponding to the bearer identifier to the PDCP layer device, and designate a primary RLC entity and a plurality of secondary RLC entities.

In addition, the message includes configuration information of a DRB in which user data is to be processed, a UE may configure DRB by applying the information, and may transmit an RRCConnectionReconfigurationComplete message to a base station (indicated by reference numeral 1*f*-45). A base station, which has completed DRB configuration with a UE, may transmit an INITIAL CONTEXT SETUP COMPLETE message to an MME (indicated by reference numeral 1*f*-50). The MME, which has received the INITIAL CONTEXT SETUP COMPLETE message, may exchange an S1 BEARER SETUP message and an S1 BEARER SETUP RESPONSE message (indicated by reference numerals 1*f*-55 and 1*f*-60). The S1 bearer may be a connection for data transmission, established between the S-GW and the base station, and may correspond to the DRB in one-to-one relationship. If the above process is completed, the UE may transmit or receive data through S-GW to or from the base station (indicated by reference numerals 1*f*-65 and 1*f*-70). As such, the general data transmission process largely may include three operations of: RRC connection configuration, security configuration, and DRB configuration. In addition, the base station may transmit an RRCConnectionReconfiguration message to the UE in order to perform updating, adding, or changing of a configuration (indicated by reference numeral 1*f*-75).

Figure 1G:
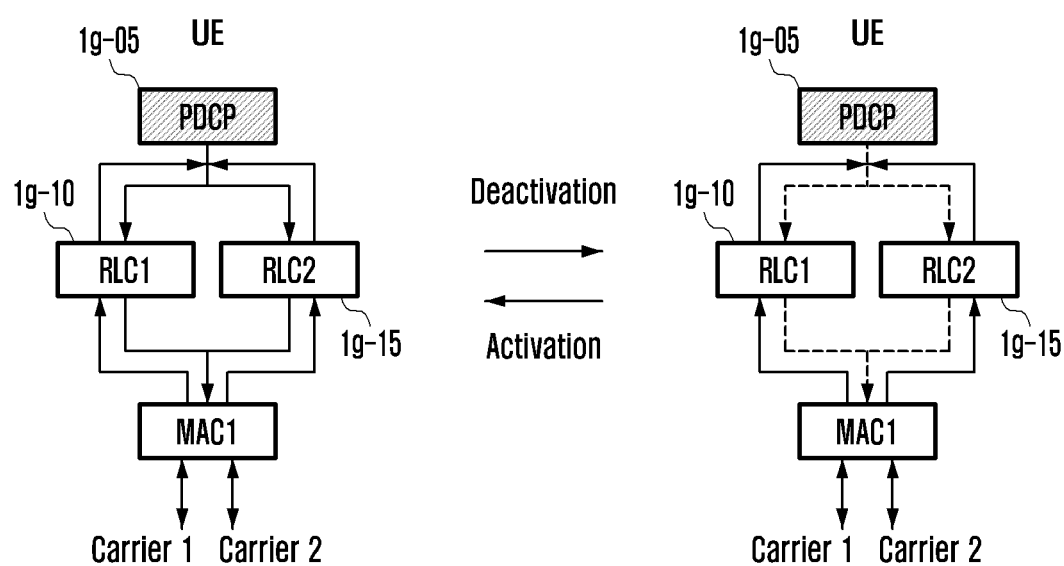
FIG. 1G illustrates a packet duplication transmission technology in which a PDCP layer performs packet transmission by duplicating packets based on a carrier aggregation technology, in a next generation mobile communication system according to an embodiment of the disclosure.

FIG. 1G illustrates a packet duplication transmission technology in which a PDCP layer performs packet transmission by duplicating packets based on a carrier aggregation technology, in a next generation mobile communication system according to an embodiment of the disclosure.

Referring to FIG. 1G, if a UE 1*g*-05 receives an RRC message as shown in FIG. 1F, the UE 1*g*-05 may configure a bearer (DRB or SRB) based on configuration information received through the message, and may configure a PDCP layer device, RLC layer devices, and MAC layer devices corresponding to each bearer. If a PDCP packet duplication transmission technology based on the carrier aggregation technology is configured for a bearer, a PDCP layer device, or a logical channel, the base station may configure, with respect to the bearer, two RLC layer devices 1*g*-10 and 1*g*-15 to be connected to a PDCP layer device for the UE.

The two RLC layer devices may be configured as a primary RLC entity 1*g*-10 and a secondary RLC entity 1*g*-15, and may perform indication using a logical channel identifier (LCID). As described above, if the packet duplicating transmission technology is configured based on the carrier aggregation technology, an initial state may be in an activated state immediately after configuration thereof according to the configuration information of the RRC message, or may be in a deactivated state immediately. If the bearer is an SRB, the initial state may be in an activated state immediately. Whether to activate or deactivate the packet duplication transmission technology for the bearer may be indicated by the base station through MAC control information (MAC control element). The base station transmits, to the UE, an indication of whether to activate or deactivate the packet duplication transmission technology through the MAC control information, and whether to activate or deactivate the packet duplication transmission technology may be indicated through control information for an uplink packet duplication transmission technology. Therefore, a downlink packet duplication transmission technology may or may not be used depending on the implementation of the base station. Therefore, if the primary RLC entity and the secondary RLC entity for packet duplication transmission technology are configured, the UE may always perform a reception operation in an activated state.

Figure 1H:
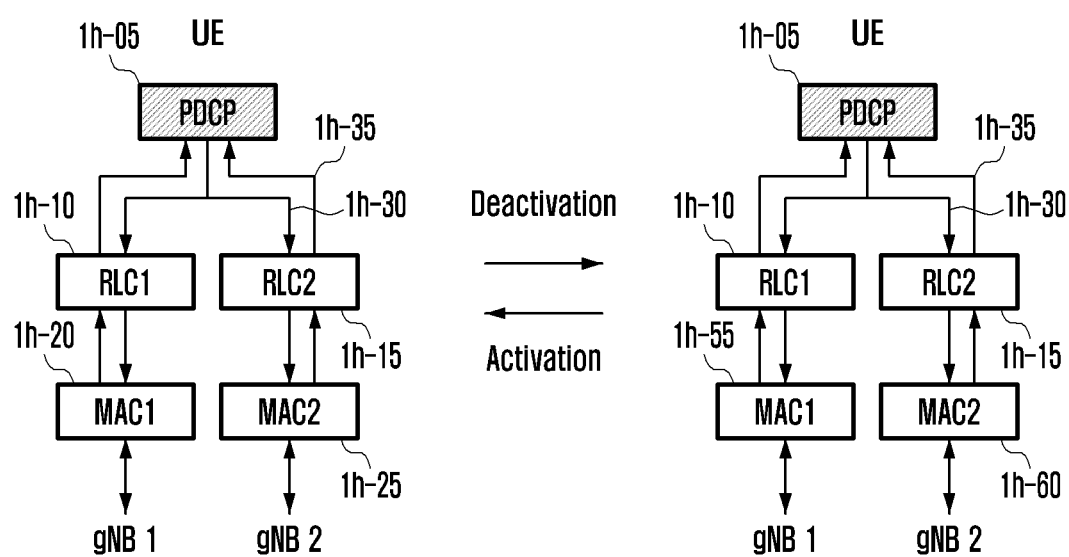
FIG. 1H illustrates a packet duplication transmission technology in which a PDCP layer performs packet transmission by duplicating packets based on a dual connectivity technology, in a next generation mobile communication system according to an embodiment of the disclosure.

FIG. 1H illustrates a packet duplication transmission technology in which a PDCP layer performs packet transmission by duplicating packets based on a dual connectivity technology, in a next generation mobile communication system according to an embodiment of the disclosure.

Referring to FIG. 1H, if a UE 1*h*-05 receives an RRC message as shown in FIG. 1F, the UE 1*h*-05 may configure a bearer (DRB or SRB) based on configuration information received through the message, and may configure a PDCP layer device, an RLC layer devices, and MAC layer devices corresponding to each bearer. If a PDCP packet duplication transmission technology based on the dual connectivity technology is configured for a bearer, a PDCP layer device, or a logical channel, the base station may configure, with respect to a bearer, two RLC layer devices 1*h*-10 and 1*h*-15 to be connected to a PDCP layer device for the UE. The two RLC layer devices may be configured as a primary RLC entity 1*h*-10 and a secondary RLC entity 1*h*-15, and may perform indication using a logical channel identifier (LCID) and a cell group identifier. As described above, if the packet duplicating transmission technology is configured based on the dual connectivity technology, an initial state may be in an activated state immediately after configuration thereof according to the configuration information of the RRC message, or may be in a deactivated state immediately. If the bearer is an SRB, the initial state may be in an activated state immediately. Whether to activate or deactivate the packet duplication transmission technology for the bearer may be indicated by the base station through the MAC control information (MAC control element). The base station transmits, to the UE, an indication of whether to activate or deactivate the packet duplication transmission technology through the MAC control information, and whether to activate or deactivate the packet duplication transmission technology may be indicated through control information for uplink packet duplication transmission technology. In the above description, the base station may transmit the MAC control information indicating whether to activate or deactivate the uplink packet duplicate transmission to MAC layer devices 1*h*-20 and 1*h*-55 corresponding to a master cell group or MAC layer devices 1*h*-25 and 1*h*-60 corresponding to a secondary cell group. Alternatively, for convenience of implementation, the master cell group is always activated, and the base station may always transmit the MAC control information to only the MAC layer devices corresponding to the master cell group. Unlike the uplink packet duplication transmission technology, the downlink packet duplication transmission technology may or may not be used depending on the implementation of the base station. Therefore, if the primary RLC entity and the secondary RLC entity for packet duplication transmission technology are configured, the UE may always perform a reception operation in an activated state.

Figure 1I:
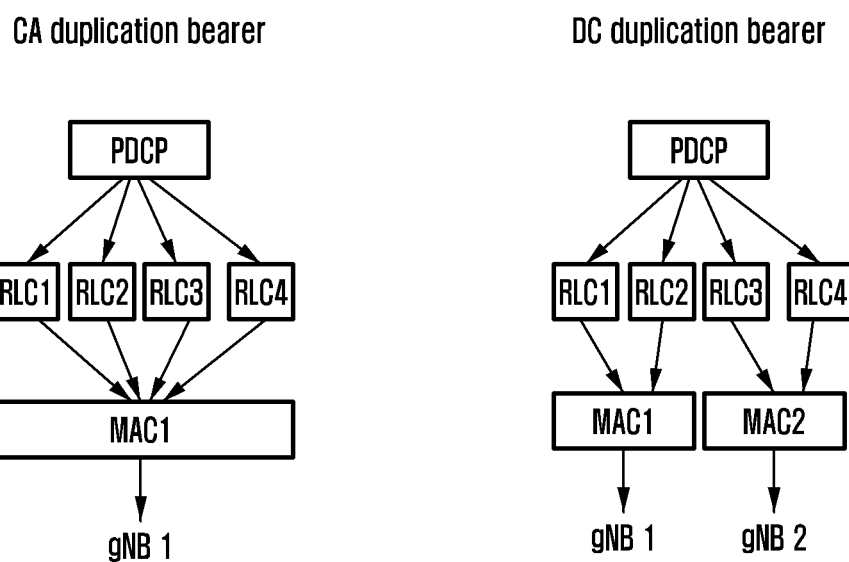
FIG. 1I illustrates an embodiment in which the packet duplication transmission technology described in FIG. 1G

FIG. 1I illustrates an embodiment in which the packet duplication transmission technology described in FIG. 1G or FIG. 1H is extended to a plurality of RLC layer devices according to an embodiment of the disclosure.

Referring to FIG. 1I, the disclosure considers a method for dynamic packet duplication transmission, which enables dynamic duplicate transmission of zero, one, two, or up to three packets in order to increase the reliability and lower the latency for a UE for which a carrier aggregation technology (CA), a dual connectivity technology (DC), or a packet duplication technology has been configured. In other words, the disclosure proposes a method for transmission data, in which one piece of raw data together with up to three pieces of copied data can be transmitted.

In the disclosure, the base station may transmit MAC control information in order to indicate, for each bearer or logical channel, channel activation and deactivation for secondary RLC entities connected to a bearer for which the packet duplication transmission technology is configured. In addition, the base station may change the primary RLC entity to another secondary RLC entity through indication of the MAC control information.

The packet duplication transmission technology of the disclosure described above may be applied to user data (PDCP data PDU) of a PDCP layer device. In addition, the packet duplication transmission technology described and proposed in the above may be equally applied to control data (PDCP control PDU) of the PDCP layer device. That is, the disclosure may apply the above-described packet duplication technology to a PDCP layer status report generated by the PDCP layer device or interspersed ROHC feedback for the header compression protocol, and may copy the PDCP layer control data (the PDCP layer status report or the interspersed ROHC feedback for a header compression protocol) and perform packet duplication transmission to a primary RLC entity and a plurality of secondary RLC entities.

However, it should be noted that in a case of user data of the PDCP layer device, since there is a PDCP serial number, if any one of data transmitted in duplicate by a transmission terminal is received, a reception terminal may identify a duplicate packet received after that and discard the duplicate packet immediately. For example, if the reception terminal receives data corresponding to PDCP serial number 3 and other RLC layer devices receive data corresponding to PDCP serial number 3 in duplicate, the duplicate data may be discarded immediately because the data has already been received. That is, the reception PDCP layer device can perform duplicate detection of PDCP user data. On the other hand, since the PDCP control data does not have a PDCP serial number and no special field, the reception PDCP layer device cannot perform duplicate detection of the PDCP control data, and thus needs to regard the PDCP control data received in duplicate as new PDCP control data and perform reception processing thereof multiple times.

If a PDCP layer status report for reporting information of data which is successfully received or not from the PDCP layer device and a header compression protocol (ROHC) are configured, the control data (PDCP control PDU) of the PDCP layer device may include interspersed ROHC feedback for a header compression protocol capable of transmitting, via feedback, whether header decompression is successful or has failed and configuration information. Even if the PDCP layer status report is received in duplicate, the data throughput only may increase and a large problem may not occur. However, the feedback for the header compression protocol may adversely affect the compression rate of the header compression protocol if more feedback is received than originally transmitted from the transmission terminal.

Therefore, the disclosure proposes a method for reducing unnecessary duplicate data throughput of the reception PDCP layer device, and if header compression (robust header compression (ROHC)) is configured, for processing control data of the PDCP layer device by a bearer in which the packet duplication transmission technology is configured for smooth operation of a header compression/decompression protocol.

In the disclosure, a (1-1)th embodiment in which control data of a PDCP layer device is processed using a packet duplication transmission technology based on a carrier aggregation technology or a packet duplication transmission technology based on a dual access technology is as follows.

Figure 1J:
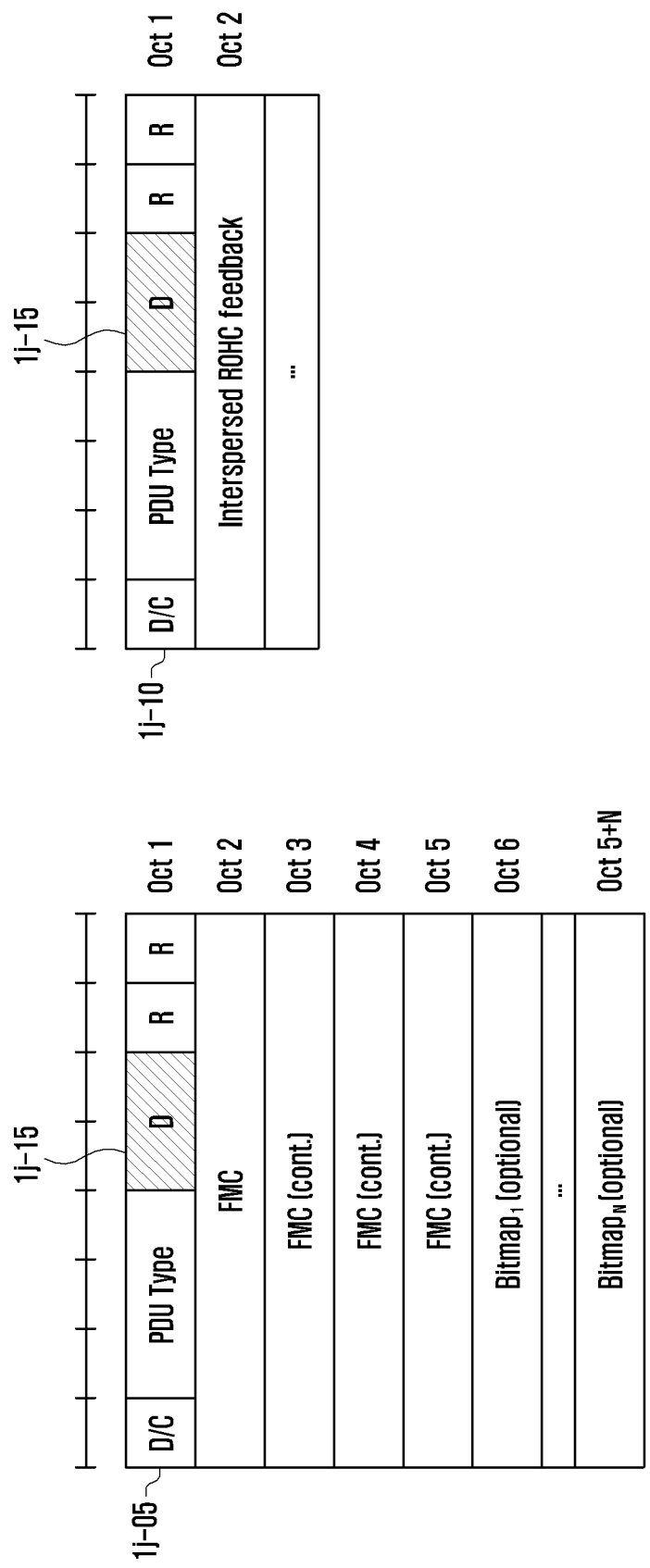
FIG. 1J illustrates a (1-1)th embodiment in which control data of a PDCP layer device is processed using a packet duplication transmission technology based on a carrier aggregation technology or a packet duplication transmission technology based on a dual access technology according to an embodiment of the disclosure.

FIG. 1J illustrates a (1-1)th embodiment in which control data of a PDCP layer device is processed using a packet duplication transmission technology based on a carrier aggregation technology or a packet duplication transmission technology based on a dual access technology according to an embodiment of the disclosure.

The (1-1)th embodiment proposes introduction of a new D field 1*j*-15 so as to enable unnecessary data processing not to be repeatedly performed, if a PDCP layer status report as shown in FIG. 1J-05 or interspersed ROHC feedback for a header compression protocol as shown in FIG. 1J-10 is received in duplicate by a reception terminal via the packet duplication transmission technology. The D field may be defined as, for example, 2 bits, and may indicate which RLC layer device transmits the PDCP layer control data. That is, "00" may indicate PDCP control data transmitted from a primary RLC entity during packet duplication transmission, and "01" may indicate PDCP control data transmitted from a secondary RLC layer entity, which has the lowest (or highest) logical channel identifier value, among the secondary RLC entities, "10" may indicate PDCP control data transmitted from a secondary RLC layer entity, which has the second lowest (or second highest) logical channel identifier value, among the secondary RLC entities, and "11" may indicate PDCP control data transmitted from a secondary RLC layer entity, which has the next lowest (or next highest) logical channel identifier value, among the secondary RLC entities. Accordingly, the reception PDCP layer device may perform duplicate detection using the D field and prevent unnecessary duplicate data processing. That is, the reception PDCP layer device may indicate which RLC layer device, among the plurality of RLC layer devices, transmits the 2 bits in duplicate.

The PDU type field may indicate whether the PDCP layer control data is a PDCP layer status report or an interspersed ROHC feedback for a header compression protocol.

Therefore, if duplicated PDCP layer control data is received from the reception PDCP layer device using the D field proposed in the disclosure, and if it is identified that the PDCP layer control data is PDCP layer control data having been already received, by checking the D field, the PDCP layer control data can be discarded immediately instead of repeatedly performing unnecessary data processing.

In the disclosure, a (1-2)th embodiment in which control data of a PDCP layer device is processed using a packet duplication transmission technology based on a carrier aggregation technology or a packet duplication transmission technology based on a dual access technology is as follows.

Figure 1K:
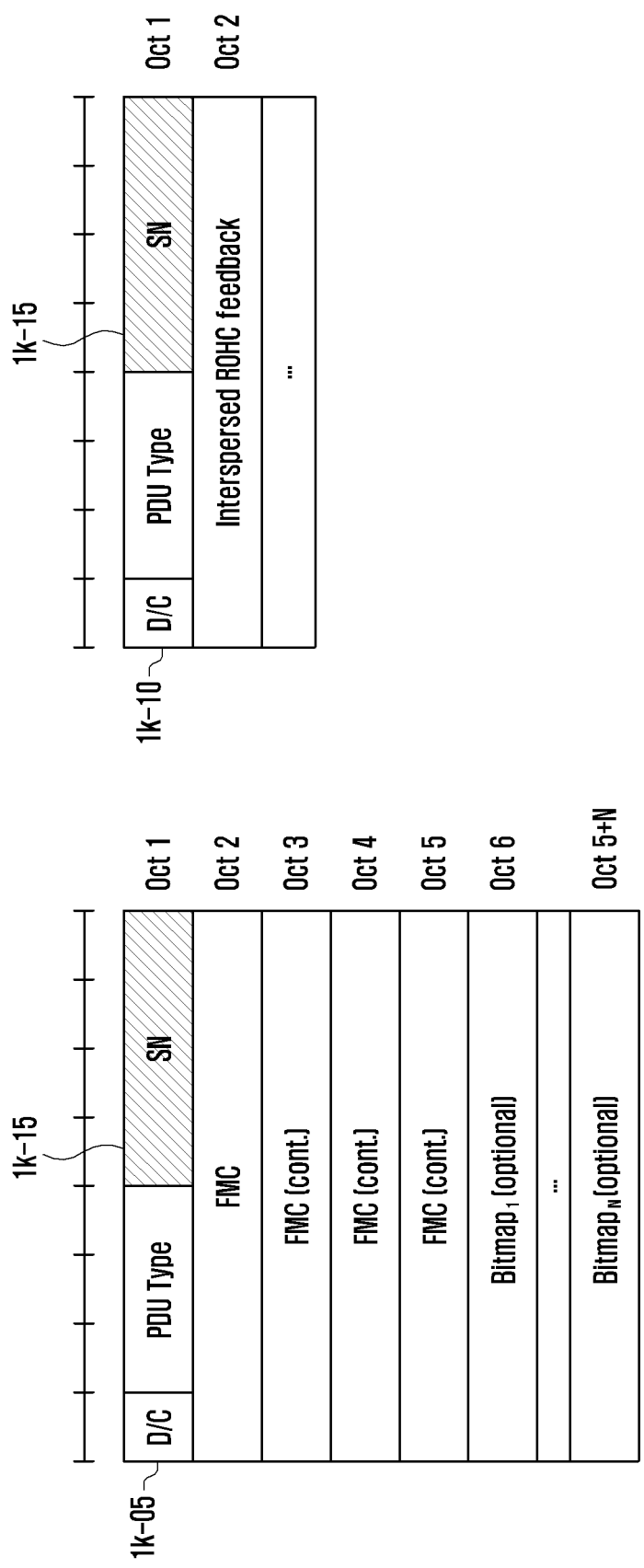
FIG. 1K illustrates a (1-2)th embodiment in which control data of a PDCP layer device is processed using a packet duplication transmission technology based on a carrier aggregation technology or a packet duplication transmission technology based on a dual access technology according to an embodiment of the disclosure.

FIG. 1K illustrates a (1-2)th embodiment in which control data of a PDCP layer device is processed using a packet duplication transmission technology based on a carrier aggregation technology or a packet duplication transmission technology based on a dual access technology according to an embodiment of the disclosure.

The (1-2)th embodiment proposes a new sequence number for PDCP control PDU (SN field) 1$k$-15 so as to enable unnecessary data processing not to be repeatedly performed, if a PDCP layer status report as shown in reference numeral 1$k$-05 in FIG. 1K or interspersed ROHC feedback for a header compression protocol as shown in reference numeral 1$k$-10 in FIG. 1K is received in duplicate by a reception terminal via the packet duplication transmission technology. The SN field may be defined as 2 bits, 3 bits, or 4 bits, and the serial number of the SN field may be increased by 1 each time one PDCP layer control data is transmitted. The serial number may be allocated in a cyclic manner in which the number starts from 0, increases up to a value of 2^(bit length)−1, and then returns back to 0. In the case of increasing the serial number, an individual SN field may be used for a PDCP layer status report or interspersed ROHC feedback for a header compression protocol. That is, an SN field for the PDCP layer status report and an SN field for the interspersed ROHC feedback for the header compression protocol may be independently defined and used. Alternatively, for convenience of implementation, the SN field for PDCP layer status report and the SN field for interspersed ROHC feedback for a header compression protocol are not separately distinguished and share one SN field, and each time one of the PDCP layer control data is transmitted, the serial number of the SN field may be increased by one. The PDU type field may indicate whether the PDCP layer control data is a PDCP layer status report or interspersed ROHC feedback for a header compression protocol.

In the case of using the SN field, if the PDCP layer control data is transmitted in duplicate to the primary RLC entity and the plurality of secondary RLC entities, the same serial number value of the SN field may be allocated and transmitted in duplicate. Therefore, if the PDCP layer control data having the same serial number value is received in duplicate using the SN field, the reception PDCP layer device may immediately discard the unnecessary duplicately received PDCP layer control data without performing processing thereof.

In addition, a transmission PDCP layer device and a reception PDCP layer device may define and use new state variables in order to allocate, compare, increase, and operate the serial number SN field values introduced in the above. For example, a transmission terminal may define and use TX_PDCP_CONTROL_SN in order to assign the serial number of PDCP layer control data, and a reception terminal may also define RX_PDCP_CONTROL_SN to check, update, and perform duplicate detection of the serial number of received PDCP layer control data. If necessary, the reception PDCP layer device may drive a PUSH receiving window or a PULL receiving window based on the serial number of the SN field, and may apply a timer.

Therefore, if a reception terminal PDCP layer device receives duplicated PDCP layer control data using a SN field proposed by the disclosure, if it is identified that the PDCP layer control data is already received data by checking the SN field, the PDCP layer control data may be discarded immediately without performing unnecessary data processing.

In the disclosure, a (1-3)th embodiment in which control data of a PDCP layer device is processed using a packet duplication transmission technology based on a carrier aggregation technology or a packet duplication transmission technology based on a dual access technology is as follows.

The (1-3)th embodiment proposes an aspect of not applying a packet duplication transmission technology to the PDCP layer control data, in order to prevent unnecessary data processing from being performed repeatedly if a PDCP layer status report as shown in reference numeral 1$k$-05 in FIG. 1K or interspersed ROHC feedback for a header compression protocol as shown in reference numeral 1$k$-10 in FIG. 1K is received in duplicate by a reception terminal via the packet duplication transmission technology.

The (1-3)th embodiment proposes an aspect in which, if a base station configures the packet duplication transmission technology for each bearer or logical channel through an RRC message in FIG. 1F and activates the packet duplication transmission technology through MAC control information, a UE applies the packet duplication transmission technology to only PDCP layer control data (PDCP data PDU), and does not apply the packet duplication transmission technology to the PDCP layer control data (PDCP control PDU). In FIG. 1F, if the RLC layer device (a primary RLC entity or a secondary RLC entity) to which the PDCP layer control data is to be transmitted is indicated through an RRC message, the UE may transmit the PDCP layer control data to the RLC layer device only indicated above. If the packet duplication transmission function is activated for convenience of implementation, the UE does not apply the packet duplication transmission technology to the PDCP layer control data, and may transmit the PDCP layer control data to a primary RLC entity which is always connected. As described above with reference to FIG. 1F, the primary RLC entity may be configured to indicate, through the RRC message, which cell group an RLC entity belongs to, and which bearer identifier or which logical channel identifier an RLC layer device corresponds to.

Therefore, as proposed in the (1-3)th embodiment, the packet duplication transmission technology may not be applied to the PDCP layer control data, and thus the reception terminal PDCP layer device may not receive duplicated PDCP layer control data.

A method for applying the packet duplication transmission technology to the PDCP layer control data, proposed in the (1-3)th embodiment, may identify data in the case of applying the packet duplication transmission technology and distinguish PDCP layer user data and PDCP layer control data to perform different data processing thereof.

In the (1-3)th embodiment, which efficiently processes PDCP control data (PDCP control PDU) generated by the PDCP layer device if the packet duplication transmission technology proposed by the disclosure is configured, the PDCP layer device may configure PDCP data (PDCP PDU) for PDCP SDUs received from a higher layer and transmit the PDCP data in duplicate to a primary RLC entity and a plurality of secondary RLC entities, and may not apply packet duplication to PDCP control data generated by the PDCP layer device and always transmit the duplicated PDCP control data to the primary RLC entity instead of transmitting the same to the secondary RLC entities. Since the primary RLC entity may always be in an activated state in the packet duplication technology, in UE implementation, it is easier to transmit PDCP control data to the primary RLC entity than to transmit PDCP control data to the secondary RLC entity, which can be changed into an activated state or a deactivated state.

Further, in the (1-3)th embodiment, since the PDCP layer device performs transmission only to the primary RLC entity without applying packet duplication to PDCP control data, if the primary RLC entity is changed to another RLC layer device (for example, one RLC layer device among a plurality of different secondary RLC entities), then, after the change, in a case where newly generated PDCP control data is transmitted, the newly generated PDCP control data needs to be transmitted to a newly changed primary RLC entity.

Accordingly, if the MAC layer device receives the MAC CE and receives an instruction indicating to change the primary RLC entity connected to a bearer for which the packet duplication transmission technology is configured to another RLC layer device (for example, one RLC layer device among a plurality of different secondary RLC entities), the MAC layer device needs to notify the PDCP layer device of instruction information or to indicate the instruction to the PDCP layer device. That is, the MAC layer device needs to indicate which RLC layer device (or a logical channel identifier) is the new primary RLC entity. Then, the PDCP layer device changes or regards the existing primary RLC entity to be the secondary RLC entity, configures the newly indicated RLC layer device as the primary RLC entity, and may perform processing of the PDCP control data as described above.

In addition, the RRC layer device receives the RRC message and receives an instruction indicating to change the primary RLC entity connected to a bearer for which the packet duplication transmission technology is configured to another RLC layer device (for example, one RLC layer device among a plurality of different secondary RLC entities), the RRC layer device needs to notify the PDCP layer device of instruction information or indicate the instruction information to the PDCP layer device. That is, the RRC layer device needs to indicate which RLC layer device (or a logical channel identifier) is the new primary RLC entity. Then, the PDCP layer device changes or regards the existing primary RLC entity to be the secondary RLC entity, configures the newly instructed RLC layer device as the primary RLC entity, and performs processing of the PDCP control data as described above.

If the (1-3)th embodiment of processing the PDCP control data proposed by the disclosure is applied to the case of transmitting duplicated data to a plurality of RLC layer devices by applying the packet duplication transmission technology proposed by the disclosure, and if the plurality of RLC layer devices operate in an RLC AM mode, the RLC layer device may receive an RLC status report and indicate data for which successful transmission is performed to a higher PDCP layer device. The PDCP layer device may indicate to other plural RLC layer devices that it is no longer necessary to perform duplicate transmission of PDCP user data having been successfully transmitted from a certain RLC layer device among the plurality of RLC layer devices. However, the PDCP layer device may not indicate to other plural RLC layer devices that it is no longer necessary to perform duplicate transmission of PDCP user data having been successfully transmitted from a certain RLC layer device among the plurality of RLC layer devices.

In a case where the (1-1)th embodiment or the (1-2)th embodiment of processing the PDCP control data proposed by the disclosure is applied to the case of transmitting duplicated data to a plurality of RLC layer devices by applying the packet duplication transmission technology proposed by the disclosure, if the plurality of RLC layer devices operate in an RLC AM mode, the RLC layer device may receive an RLC status report and indicate data for which successful transmission is identified to a higher PDCP layer device. The PDCP layer device may indicate to other plural RLC layer devices that it is no longer necessary to perform duplicate transmission of PDCP user data having been successfully transmitted from one RLC layer device, among the plurality of RLC layer devices. However, the PDCP layer device may indicate that it is no longer necessary to perform duplicate transmission of PDCP user data having been successfully transmitted from one RLC layer device, among the plurality of RLC layer devices, to other plural RLC layer devices.

Figure 1L:
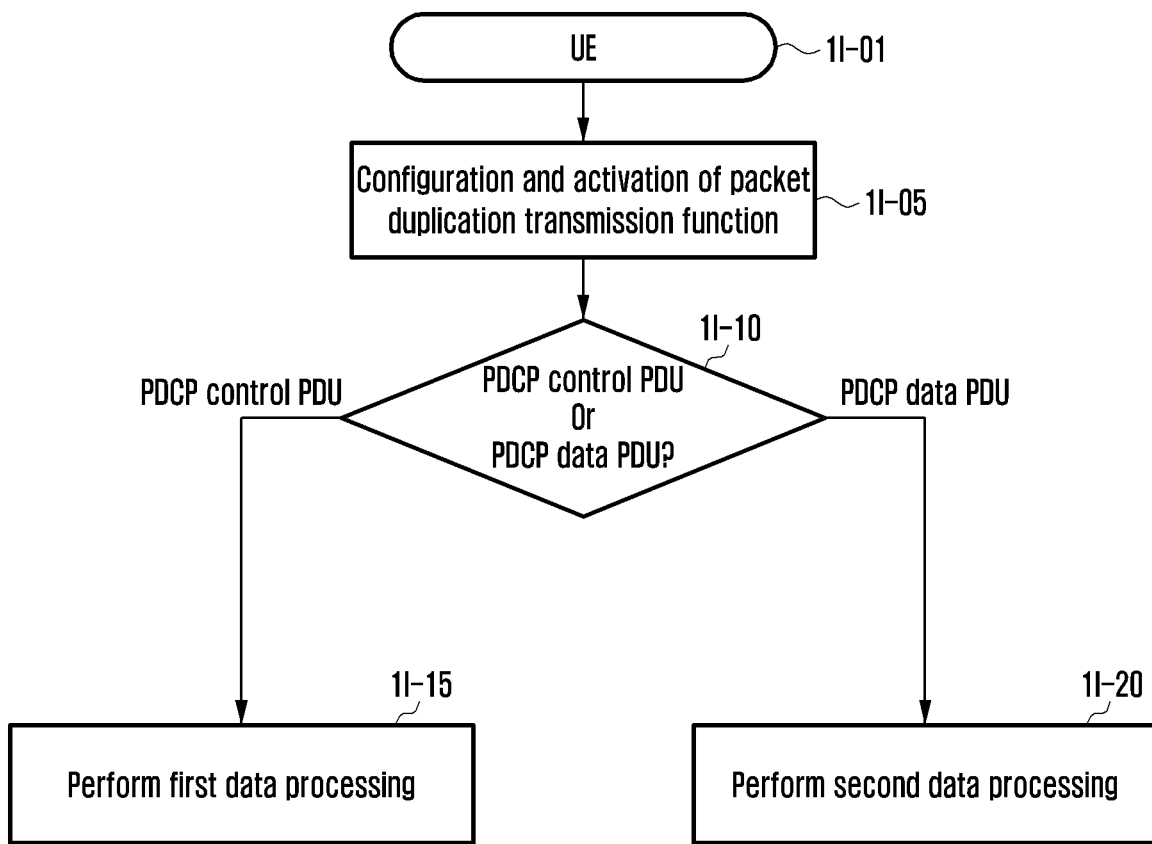
FIG. 1L illustrates a UE operation in which a PDCP layer performs a packet duplication transmission technology based on a carrier aggregation technology or a dual access technology in a next generation mobile communication system according to an embodiment of the disclosure.

FIG. 1L illustrates a terminal operation in which a PDCP layer performs a packet duplication transmission technology based on a carrier aggregation technology or a dual access technology in a next generation mobile communication system according to an embodiment of the disclosure.

Referring to FIG. 1L, if a UE 1*l*-01 receives an RRC message as shown in FIG. 1F, the UE 1*l*-01 may configure a bearer (DRB or SRB) based on configuration information received through the message, and may configure a PDCP layer device, an RLC layer devices, and MAC layer devices corresponding to each bearer. If a PDCP packet duplication transmission technology based on the carrier aggregation technology or the dual connectivity technology is configured for a bearer, a PDCP layer device, or a logical channel, the base station may configure, for the UE, two RLC layer devices to be connected to a PDCP layer device with respect to the bearer. The two RLC layer devices may be configured as a primary RLC entity and a secondary RLC entity, and may perform indication using a logical channel identifier (LCID). As described above, if the packet duplicating transmission technology is configured described above, an initial state may be in an activated state immediately after configuration thereof according to the configuration information of the RRC message, or may be in a deactivated state immediately. If the bearer is an SRB, the initial state may be in an activated state immediately. Whether to activate or deactivate the packet duplication transmission technology for the bearer may be indicated by the base station through the MAC control information (MAC control element). Whether to activate or deactivate the packet duplication transmission technology for the bearer may be indicated by the base station through MAC control information, and whether to activate or deactivate the packet duplication transmission technology may be indicated through control information for an uplink packet duplication transmission technology. The activation state may be configured using the MAC control information (indicated by reference numeral 1*l*-05).

The UE may first identify data to which packet duplication transmission is to be applied if packet duplication transmission is performed in a PDCP layer device for which the packet duplication transmission technology is activated (indicated by reference numeral 1*l*-10). As a result of identification, if the data is PDCP layer user data (PDCP data PDU) (indicated by reference numeral 1*l*-20), the UE performs second data processing. As described above with reference to FIGS. 1G and 1H, the second data processing indicates that packet duplication of the PDCP layer user data is performed and the PDCP layer user data is transmitted in duplicate to the primary RLC entity and the secondary RLC entity. Data to which packet duplication transmission is applied may be identified (indicated by reference numeral 1*l*-10). If the data is the PDCP layer control data (PDCP control PDU) (indicated by reference numeral 1*l*-15), first data processing thereof may be performed. In the above description, the first data processing refers to data processing performed by applying the (1-1)th embodiment, (1-2)th embodiment, or (1-3)th embodiment.

Figure 1M:
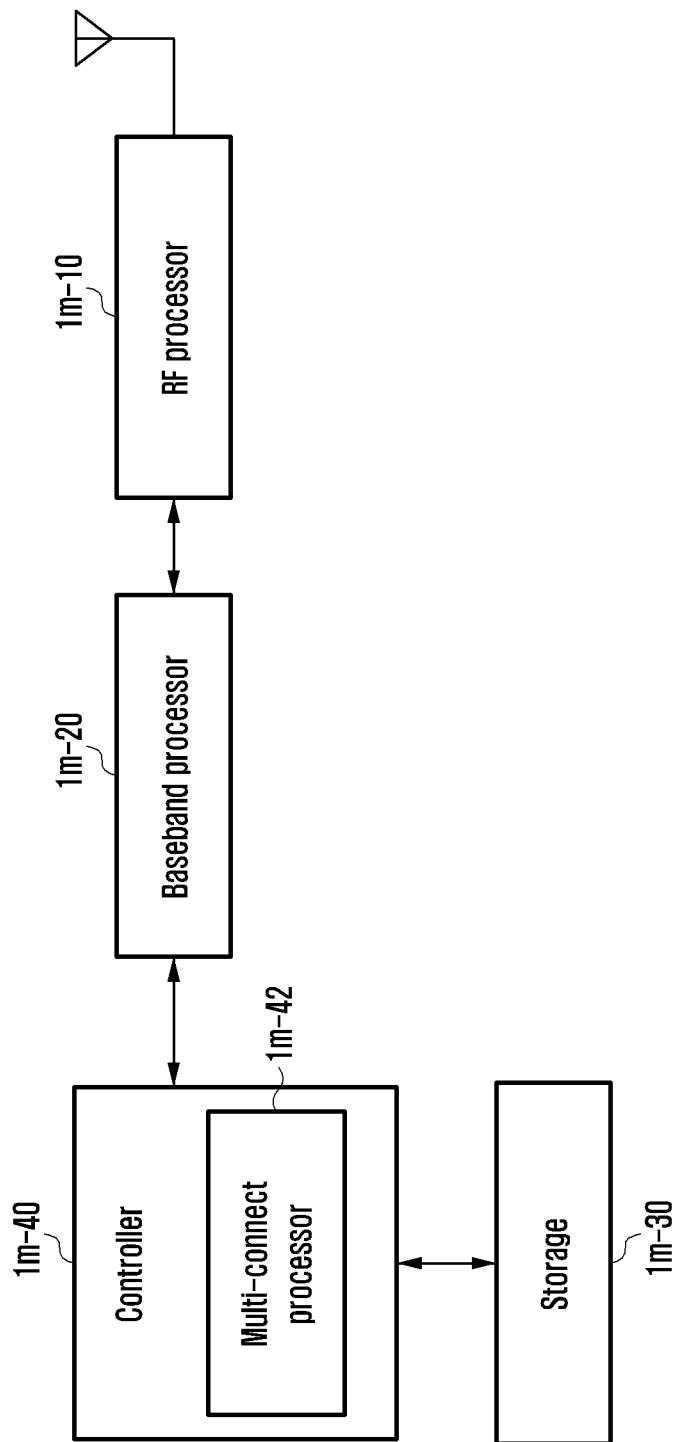
FIG. 1M illustrates a structure of a UE according to an embodiment of the disclosure.

FIG. 1M illustrates a structure of a UE according to an embodiment of the disclosure.

Referring to FIG. 1M, the UE includes a radio frequency (RF) processor 1*m*-10, a baseband processor 1*m*-20, a storage 1*m*-30, and a controller 1*m*-40.

The RF processor 1*m*-10 may perform a function of transmitting or receiving a signal, such as band conversion and amplification of the signal, through a radio channel That is, the RF processor 1*m*-10 up-converts a baseband signal provided from the baseband processor 1*m*-20 into an RF band signal and transmits the RF band signal through an antenna, and down-converts the RF band signal, received through the antenna, to a baseband signal. For example, the RF processor 1*m*-10 may include a transmission filter, a reception filter, an amplifier, a mixer, an oscillator, a digital to analog convertor (DAC), an analog to digital convertor (ADC), and the like. In FIG. 1M, only one antenna is shown, but the UE may include a plurality of antennas. Further, the RF processor 1*m*-10 may include a plurality of RF chains. Furthermore, the RF processor 1*m*-10 may perform beamforming. For the beamforming, the RF processor 1*m*-10 may adjust a phase and a magnitude of each of the signals transmitted or received through a plurality of antennas or antenna elements. In addition, the RF processor may perform a MIMO operation, and may receive multiple layers at the time of performing the MIMO operation. The RF processor 1*m*-10 may perform reception beam sweeping by appropriately configuring a plurality of antennas or antenna elements under control of the controller, or may adjust a direction and a width of a reception beam so that the reception beam is coordinated with the transmission beam.

The baseband processor 1*m*-20 may perform a conversion function between a baseband signal and a bit string according to the physical layer standard of a system. For example, upon transmitting data, the baseband processor 1*m*-20 generates complex symbols by encoding and modulating a transmission bit string. In addition, upon receiving data, the baseband processor 1*m*-20 reconstructs the reception bit string by demodulating and decoding the baseband signal provided from the RF processor 1*m*-10. For example, according to an orthogonal frequency division multiplexing (OFDM) scheme, upon transmitting data, the baseband processor 1*m*-20 generates complex symbols by encoding and modulating a transmission bit string, maps the complex symbols onto subcarriers, and then configures OFDM symbols by performing an inverse fast Fourier transform (IFFT) operation and insertion of a cyclic prefix (CP). In addition, upon receiving data, the baseband processor 1*m*-20 divides the baseband signal provided from the RF processor 1*m*-10 in OFDM symbol units, reconstructs signals, which have been mapped onto the subcarriers through a fast Fourier transform (FFT) operation, and then reconstructs the reception bit strings by demodulating and decoding the mapped signals.

The baseband processor 1*m*-20 and the RF processor 1*m*-10 transmit or receive signals as described above. Accordingly, the baseband processor 1*m*-20 and the RF processor 1*m*-10 may be referred to as a transmitter, a receiver, a transceiver, or a communication unit. Furthermore, at least one of the baseband processor 1*m*-20 and the RF processor 1*m*-10 may include a plurality of communication modules to support different radio access technologies. In addition, at least one of the baseband processor 1*m*-20 and the RF processor 1*m*-10 may include different communication modules to process signals of different frequency bands. For example, the different radio access technologies may include an LTE network, an NR network, and the like. In addition, the different frequency bands may include a super high frequency (SHF) (e.g., 2.5 GHz, 5 GHz) band, and a millimeter wave (e.g., 60 GHz) band.

The storage 1*m*-30 stores data, such as a basic program, an application program, and configuration information for performing the UE operation. The storage 1*m*-30 provides stored data at the request of the controller 1*m*-40.

The controller 1*m*-40 controls overall operations of the UE. For example, the controller 1*m*-40 may transmit or receive a signal through the baseband processor 1*m*-20 and the RF processor 1*m*-10. In addition, the controller 1*m*-40 records or reads data in or from the storage 1*m*-30. To this end, the controller 1*m*-40 may include at least one processor. For example, the controller 1*m*-40 may include a communication processor (CP) for performing control for communication and an application processor (AP) for controlling a higher layer such as an application program (not shown). For example, the controller 1*m*-40 may further include a multi-connect processor 1*m*-42 for connectivity.

Figure 1N:
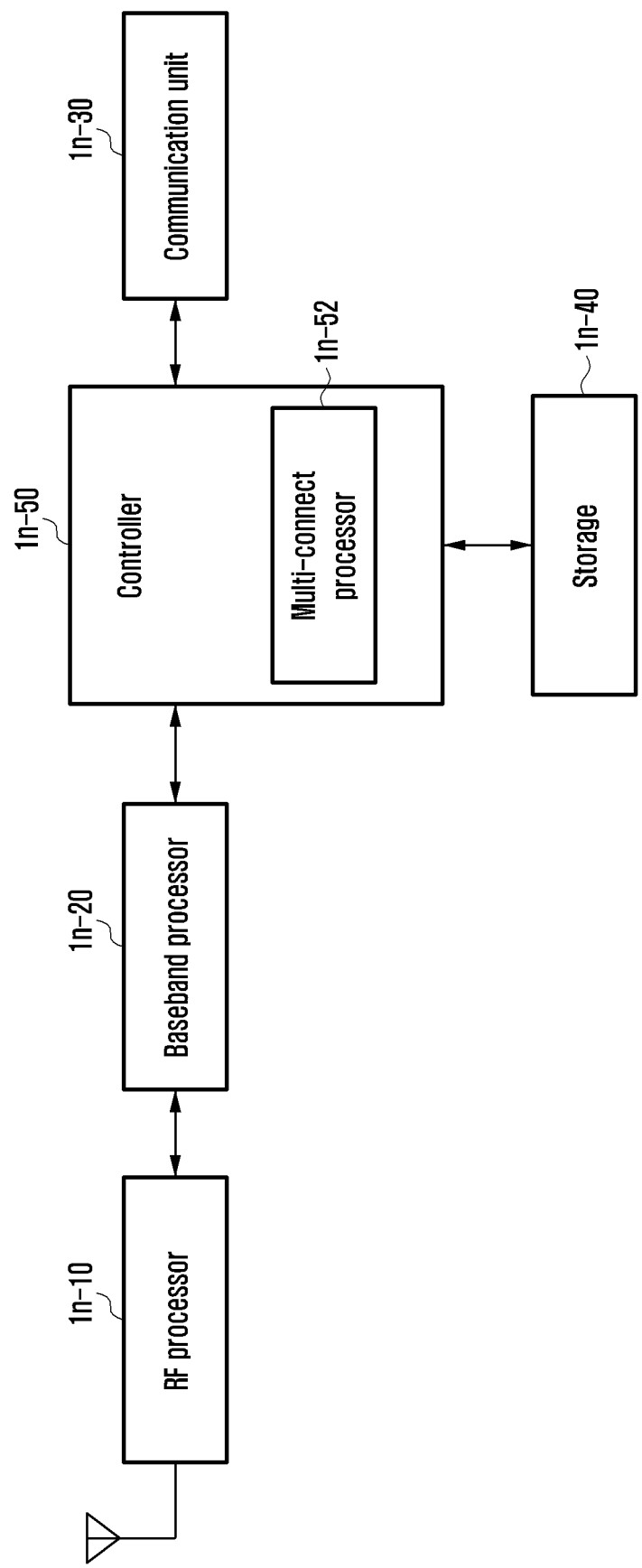
FIG. 1N illustrates a block configuration of a TRP in a wireless communication system according to an embodiment of the disclosure.

FIG. 1N illustrates a block configuration of a TRP in a wireless communication system according to an embodiment of the disclosure.

Referring to FIG. 1N, the base station may include an RF processor 1*n*-10, a baseband processor 1*n*-20, a backhaul communication unit 1*n*-30, a storage 1*n*-40, and a controller 1*n*-50.

The RF processor 1*n*-10 may perform a function of transmitting or receiving a signal, such as band conversion and amplification of the signal, through a radio channel That is, the RF processor 1*n*-10 up-converts a baseband signal provided from the baseband processor 1*n*-20 into an RF band signal and transmits the RF band signal through an antenna, and down-converts the RF band signal, received through the antenna, into a baseband signal. For example, the RF processor 1*n*-10 may include a transmission filter, a reception filter, an amplifier, a mixer, an oscillator, a DAC, an ADC, and the like. In FIG. 1N, only one antenna is shown, but a first access node may include a plurality of antennas. Further, the RF processor 1*n*-10 may include a plurality of RF chains. Furthermore, the RF processor 1*n*-10 may perform beamforming. For the beamforming, the RF processor 1*n*-10 may adjust a phase and a magnitude of each of the signals transmitted and received through a plurality of antennas or antenna elements. The RF processor may perform a downlink MIMO operation by transmitting one or more layers.

The baseband processor 1*n*-20 may perform a conversion function between a baseband signal and a bit string according to the physical layer standard of a first radio access technology. For example, upon transmitting data, the baseband processor 1*n*-20 generates complex symbols by encoding and modulating a transmission bit stream. In addition, upon receiving data, the baseband processor 1*n*-20 reconstructs a reception bit string by demodulating and decoding the baseband signal provided from the RF processor 1*n*-10. For example, according to the OFDM scheme, upon transmitting data, the baseband processor 1*n*-20 generates complex symbols by encoding and modulating a transmission bit stream, maps the complex symbols onto subcarriers, and then configures OFDM symbols by performing an IFFT operation and CP insertion. In addition, upon receiving data, the baseband processor 1n-20 divides the baseband signal provided from the RF processor 1n-10 in OFDM symbol units, reconstructs the signals, which have been mapped onto the sub-carriers, through a FFT operation, and then reconstructs the reception bit string by demodulating and decoding the mapped signals. The baseband processor 1n-20 and the RF processor 1n-10 transmit or receive signals as described above. Accordingly, the baseband processor 1n-20 and the RF processor 1n-10 may be referred to as a transmitter, a receiver, a transceiver, a communication unit, or a wireless communication unit.

The communication unit 1n-30 provides an interface for communicating with other nodes in a network.

The storage 1n-40 stores data, such as a basic program, an application program, and configuration information for performing the operation of a main station. In particular, the storage 1n-40 may store information on a bearer allocated to the connected terminal, a measurement result reported from the connected terminal, and the like. In addition, the storage 1n-40 may store information serving as a criterion for determining whether to provide or stop multiple connections to the terminal. In addition, the storage 1n-40 provides stored data at the request of the controller 1n-50.

The controller 1n-50 controls the overall operations of the main station. For example, the controller 1n-50 may transmit or receive a signal through the baseband processor 1n-20 and the RF processor 1n-10 or through the backhaul communication unit 1n-30. In addition, the controller 1n-50 records or reads data in the storage 1n-40. To this end, the controller 1n-50 may include at least one processor. For example, the controller 1m-40 may further include a multi-connect processor 1n-52 for connectivity FIG. 2A illustrates the structure of an LTE system according to an embodiment of the disclosure.

Figure 2A:
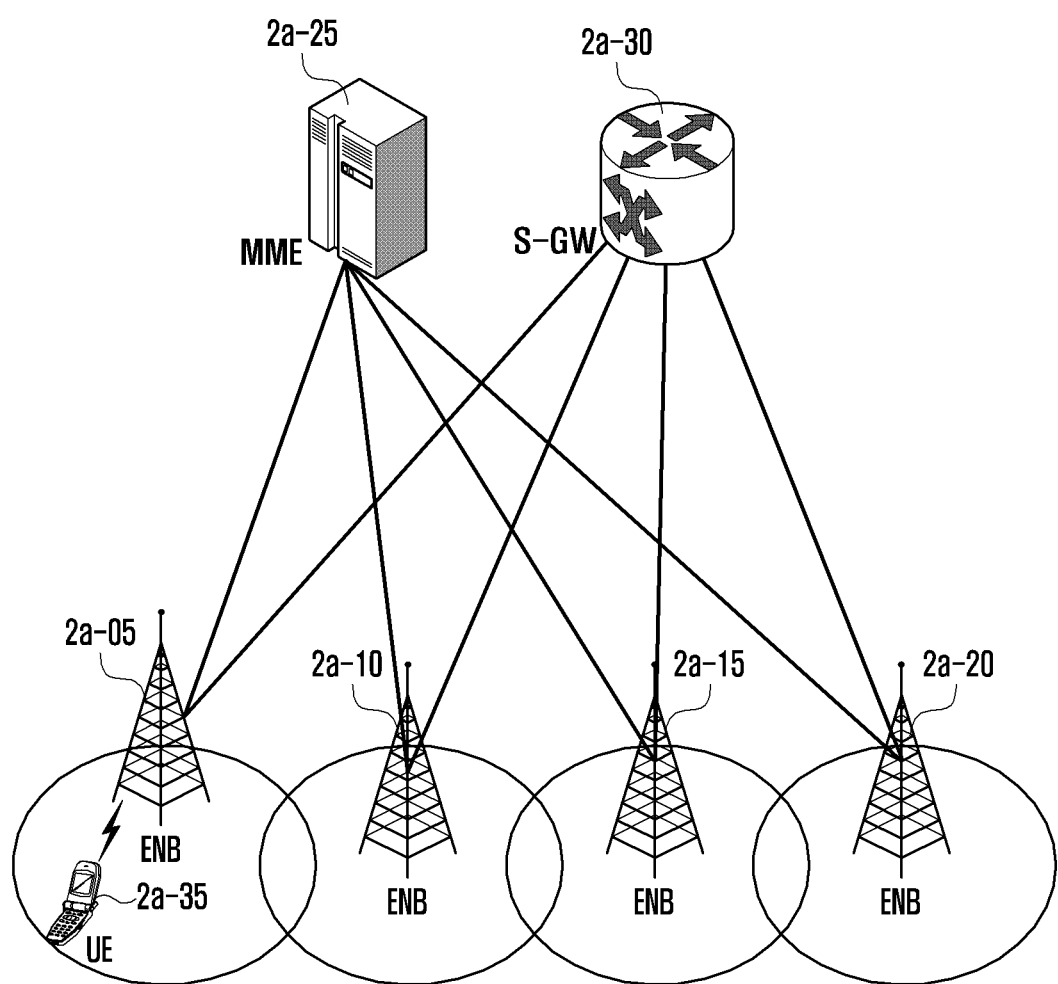
FIG. 2A illustrates the structure of an LTE system according to an embodiment of the disclosure.

Referring to FIG. 2A, a radio access network of an LTE system may include a next-generation base station (evolved Node B, hereinafter referred to as an eNB, a Node B, or a base station) 2a-05, 2a-10, 2a-15, and 2a-20, a mobility management entity (MME) 2a-25, and a serving-gateway (S-GW) 2a-30. A user equipment (hereinafter referred to as a UE or a terminal) 2a-35 is connected to an external network through the eNBs 2a-05, 2a-10, 2a-15, and 2a-20, and the S-GW 2a-30.

In FIG. 2A, the eNBs 2a-05, 2a-10, 2a-15, and 2a-20 may correspond to legacy Node B of a UMTS system. The eNB may be connected to the UE 2a-35 through a radio channel, and may play a more complicated role than the legacy Node B. In an LTE system, since all user traffic, including realtime services such as voice over IP (VoIP) over the Internet protocol, is serviced through a shared channel, there is a need for a device that performs scheduling by collecting state information, such as buffer states, available transmit power states, and channel states of UEs. The eNBs 2a-05, 2a-10, 2a-15, and 2a-20 may function as the device for performing scheduling. One eNB generally controls a plurality of cells. For example, in order to realize a transmission rate of 100 Mbps, the LTE system uses orthogonal frequency division multiplexing (hereinafter, referred to as OFDM) scheme in a 20 MHz bandwidth, as a radio access technology. In addition, an adaptive modulation & coding (hereinafter referred to as AMC) scheme that determines a modulation scheme and a channel coding rate according to the channel state of a UE is employed. The S-GW 2a-30 is a device for providing a data bearer, and generates or removes a data bearer under the control of the MME 2a-25. The MME is a device that is in charge of various control functions as well as a mobility management function for the UE and is connected to a plurality of base stations.

Figure 2B:
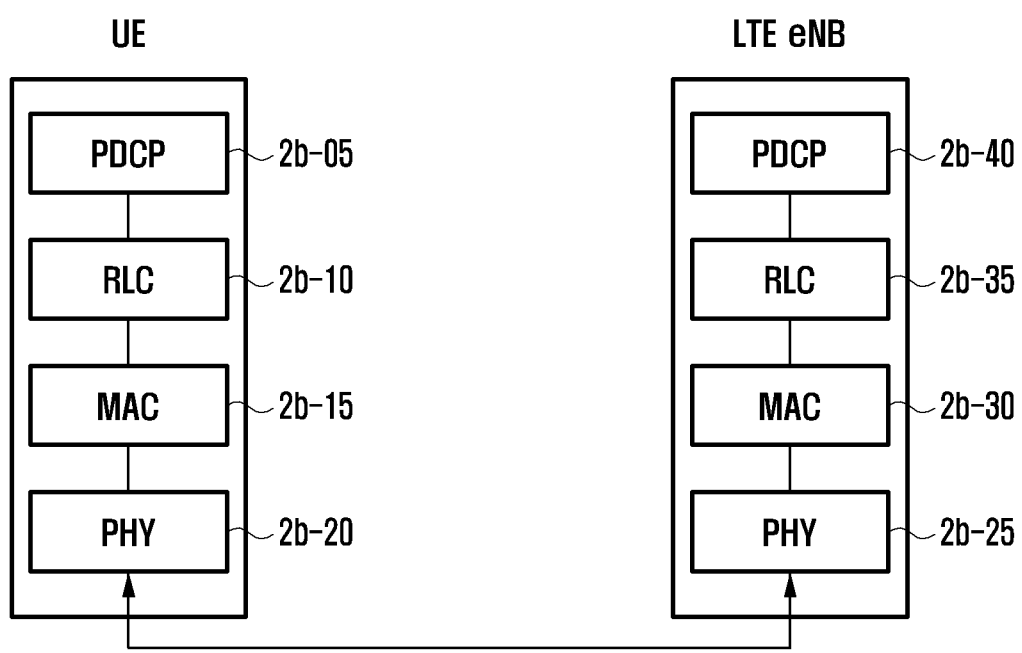
FIG. 2B illustrates a radio protocol structure in an LTE system according to an embodiment of the disclosure.

FIG. 2B illustrates a radio protocol structure in an LTE system according to an embodiment of the disclosure.

Referring to FIG. 2B, a radio protocol of an LTE system includes, for each of a UE and an eNB, packet data convergence protocols (PDCPs) 2b-05 and 2b-40, radio link controls (RLCs) 2b-10 and 2b-35, and medium access controls (MACs) 2b-15 and 2b-30. PDCPs 2b-05 and 2b-40 are in charge of an operation such as IP header compression/reconstruction. The main functions of PDCP are summarized as follows.

Header compression and decompression: ROHC only
Transfer of user data
In-sequence delivery of higher layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The radio link controls (hereinafter referred to as RLCs) 2b-10 and 2b-35 may reconfigure a PDCP packet data unit (PDU) to an appropriate size so as to perform an ARQ operation. The main functions of RLCs are summarized as follows.

Transfer of higher layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MACs 2b-15 and 2b-30 are connected to multiple RLC layer devices configured in one terminal, and may perform an operation of multiplexing RLC PDUs with a MAC PDU and demultiplexing the RLC PDUs from the MAC PDU. The main functions of the MAC are summarized as follows.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding Physical layers 2b-20 and 2b-25 may perform an operation of channel coding and modulating higher layer data, generating the higher layer data into an OFDM symbol, transmitting the OFDM symbol through a radio channel, or demodulating an OFDM symbol received through a radio channel, channel-decoding the OFDM symbol, and transmitting the OFDM symbol to a higher layer.

Figure 2C:
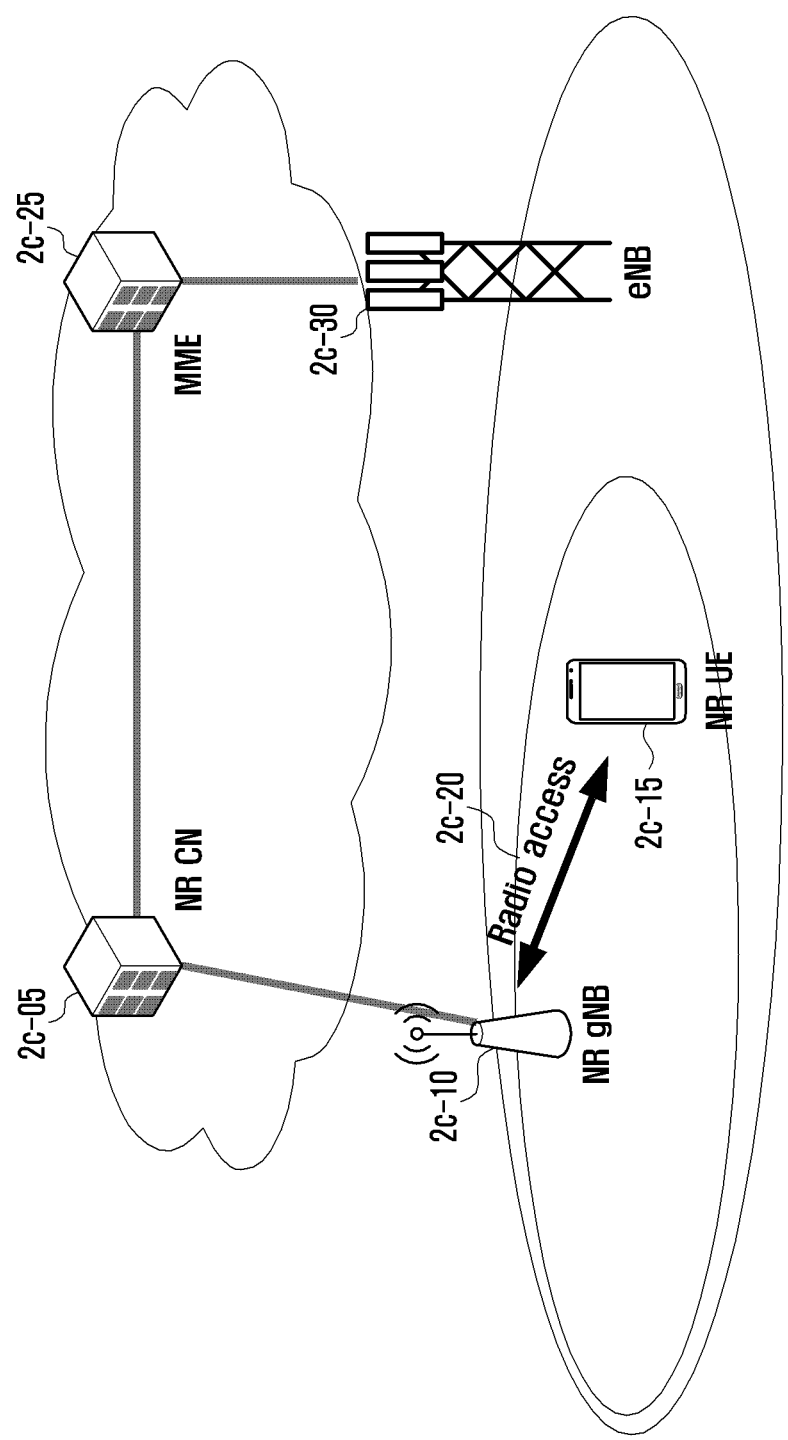
FIG. 2C illustrates the structure of a next generation mobile communication system according to an embodiment of the disclosure.

FIG. 2C illustrates the structure of a next generation mobile communication system according to an embodiment of the disclosure.

Referring to FIG. 2C, a radio access network of a next generation mobile communication system may include a next generation base station (new radio node B, (hereinafter referred to as an NR gNB or an NR base station) 2c-10 and a new radio core network (NR CN) 2c-05. A user equipment (a new radio user equipment, hereinafter referred to as an NR UE or a terminal) 2c-15 accesses an external network via an NR gNB 2c-10 and an NR CN 2c-05 through a radio access channel 2c-20.

In FIG. 2C, the NR gNB 2c-10 may correspond to an evolved node B (eNB) of the legacy LTE system. The NR gNB is connected to the NR UE 2c-15 via a radio channel and may provide a more excellent service as compared to the legacy node B. In the next generation mobile communication system, since all types of user traffics are serviced through a shared channel, there is a need for a device for performing scheduling by collecting state information, such as buffer states, available transmission power states, and channel states of UEs. Further, the NR gNB 2c-10 is in charge of such a function of the device. One NR gNB generally controls a plurality of cells. In order to implement ultra-high speed data transmission as compared to the legacy LTE, the NR gNB may have the legacy maximum bandwidth or more, and may additionally employ beamforming technology using an orthogonal frequency division multiplexing (hereinafter, referred to as OFDM) as a radio access technology. In addition, the NR gNB adopts an adaptive modulation & coding (hereinafter referred to as AMC) scheme that determines a modulation scheme and a channel coding rate based on the channel state of a UE. The NR CN 2c-05 may perform functions, such as mobility support, bearer setup, and QoS configuration. The NR CN is a device that is in charge of various control functions as well as a mobility management function for a UE, and is connected to a plurality of base stations. In addition, the next generation mobile communication system may further operate in conjunction with the legacy LTE system, and the NR CN is connected to an MME 2c-25 via a network interface. The MME is connected to an eNB 2c-30, that is, the legacy base station.

Figure 2D:
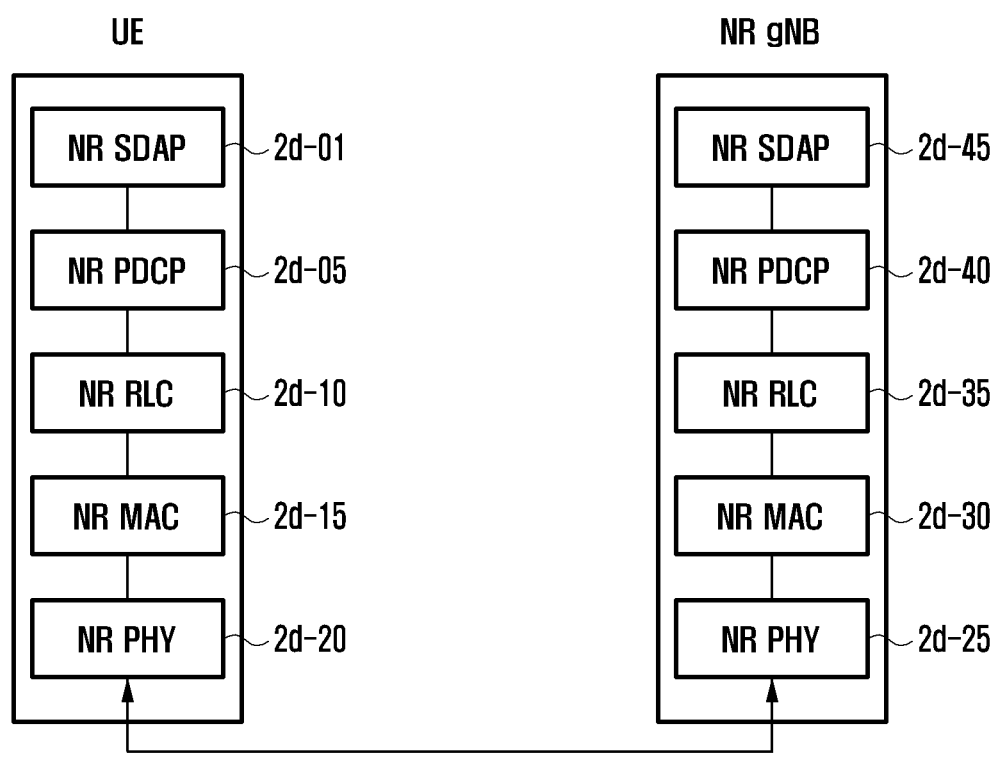
FIG. 2D illustrates a radio protocol structure of a next generation mobile communication system according to an embodiment of the disclosure.

FIG. 2D illustrates a radio protocol architecture of a next generation mobile communication system according to an embodiment of the disclosure.

Referring to FIG. 2D, the radio protocol of the next generation mobile communication system includes, for each of a UE and an NR base station, NR SDAPs 2d-01 and 2d-45, NR PDCPs 2d-05 and 2d-40, and NR RLCs 2d-10 and 2d-35, and NR MACs 2d-15 and 2d-30.

The main function of the NR SDAPs 2d-01 and 2d-45 may include a part of the functions as follows:
  Transfer of user plane data
  Mapping between a QoS flow and a data bearer (DRB) for both uplink (UL) and downlink (DL)
  Marking QoS flow ID in both UL and DL packets
  Mapping reflective QoS flow to data bearer for UL SDAP PDUs.

A UE may receive a configuration, such as whether to use the header of an SDAP layer device or the function of the SDAP layer device, through an RRC message, for each PDCP layer device, for each bearer, or for each logical channel. If the SDAP header is configured, the UE may be indicated to update or reconfigure mapping information between a QoS flow and a data bearer for the uplink and downlink, through an NAS QoS reflection configuration 1-bit indicator (NAS reflective QoS) and AS QoS reflection configuration 1-bit indicator (AS reflective QoS) of the SDAP header. The SDAP header may include QoS flow ID information indicating QoS. The QoS information may be used as data processing priority, scheduling information, and the like to support a smooth service.

The main function of the NR PDCPs 2d-05 and 2d-40 may include a part of the functions as follows:
  Header compression and decompression: ROHC only
  Transfer of user data
  In-sequence delivery of higher layer PDUs
  Out-of-sequence delivery of higher layer PDUs
  PDCP PDU reordering for reception
  Duplicate detection of lower layer SDUs
  Retransmission of PDCP SDUs
  Ciphering and deciphering
  Timer-based SDU discard in uplink The reordering function of the NR PDCP device refers to a function of sequentially reordering PDCP PDUs, received from a lower layer, based on a PDCP sequence number (SN), and may include a function of transmitting data to a higher layer in the sequence of reordering, a function of transmitting data without considering the sequence, a function of reordering the sequence and recording missing PDCP PDUs, a function of providing a state report on the missing PDCP PDUs to a transmission side, and a function of requesting retransmission for the missing PDCP PDUs.

The main functions of the NR RLCs 2d-10 and 2d-35 may include a part of the functions as follows:
  Transfer of higher layer PDUs
  In-sequence delivery of higher layer PDUs
  Out-of-sequence delivery of higher layer PDUs
  Error Correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment The in-sequence delivery function of the NR RLC device refers to a function of transmitting RLC SDUs, received from a lower layer, to a higher layer in the sequence of reception, and may include: if one RLC SDU is originally segmented into multiple RLC SDUs and received, a function of reassembling and transmitting the multiple RLC SDUs; a function of reordering the received RLC PDUs based on an RLC sequence number (SN) or PDCP SN; a function of reordering the sequence and recording missing RLC PDUs; a function of providing a state report on the missing RLC PDUs to a transmission side; and a function of requesting retransmission for the missing RLC PDUs. Alternatively, if the missing RLC SDU occurs, the in-sequence delivery function of the NR RLC device may include a function of sequentially transmitting only the RLC SDUs prior to the missing RLC SDU to a higher layer or sequentially transmitting all the RLC SDUs received before a timer starts to a higher layer if a predetermined timer expires although there is a missing RLC SDU, or sequentially transmitting all RLC SDUs received so far to a higher layer if a predetermined timer expires although there is a missing RLC SDU. In addition, the RLC PDUs may be processed in the sequence that the RLC PDUS are received (in the sequence of arrival regardless of the sequence of serial number and sequence number), and may be transmitted to a PDCP device out of sequence delivery. For segments, the in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer or may be replaced by a multiplexing function of the NR MAC layer.

The out-of-sequence delivery function of the NR RLC device refers to a function of directly transmitting the RLC SDUs, received from the lower layer, to a higher layer regardless of the order, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs 2d-15 and 2d-30 may be connected to multiple NR RLC layer devices configured in one UE, and a main function of the NR MAC may include a part of the functions as follows:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding The NR PHY layers 2d-20 and 2d-25 may perform an operation of channel-coding and modulating higher layer data, generating the higher layer data into an OFDM symbol, transmitting the OFDM symbols via a radio channel, or demodulating and channel decoding of the OFDM symbols received via the radio channel, and transferring the OFDM symbol to a higher layer.

The disclosure proposes a method for compression and decompression of an Ethernet header in the case of using an Ethernet protocol in a next generation mobile communication system.

Figure 2E:
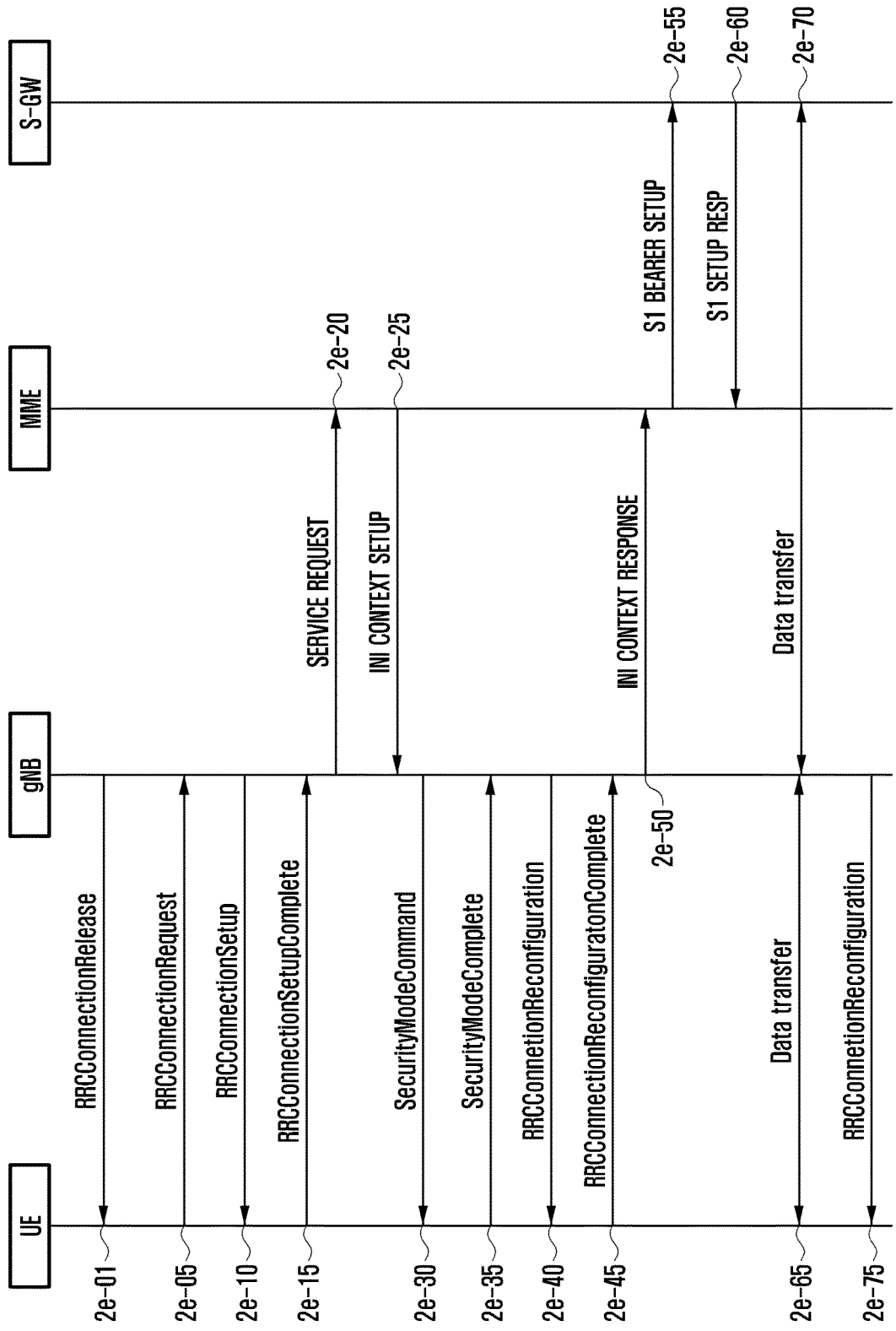
FIG. 2E illustrates a procedure of configuring Ethernet header protocol-related configuration information for a UE, by a base station, if the UE establishes a connection with a network, the disclosure according to an embodiment of the disclosure.

FIG. 2E illustrates a procedure of configuring Ethernet header protocol-related configuration information for a UE, by a base station, if the UE establishes a connection with a network, according to an embodiment of the disclosure.

FIG. 2E illustrates a procedure in which a UE switches from an RRC idle mode or an RRC inactive mode (or lightly-connected mode) to an RRC connected mode and establishes a connection with a network, and illustrates a procedure of configuring Ethernet header protocol-related configuration information for a UE, by a base station. Specifically, an SDAP layer device or a PDCP layer device indicates whether to perform the Ethernet header compression and decompression procedure, and indicates whether to use the Ethernet header compression and decompression procedure only in the downlink, only in the uplink, or both uplink and downlink, the Ethernet header protocol-related configuration information being configured only for a UE having UE capability, which can use the Ethernet protocol or only for a UE having UE capability, which can use the Ethernet header compression and decompression procedure. If the UE reports a UE capability to a base station, the UE defines a new indicator and may report to the base station whether the UE can use the Ethernet protocol or can use the Ethernet header compression and decompression procedure. In addition, the base station may configure which type of Ethernet frame or Ethernet header is to be used for each bearer or logical channel to determine which type of fields are configured in the Ethernet header, how many bytes the Ethernet header size is, how many bits the size of each field of the Ethernet header is, or how the fields of the Ethernet header are configured. In addition, in a case where padding is added to the Ethernet frame, the UE may indicate whether to configure using a function of preventing the padding from being transmitted through the actual wireless link by removing the padding at the transmission terminal and by adding the padding at the reception terminal.

Referring to FIG. 2E, if a UE for performing data transmission or reception in the RRC connected mode does not perform data transmission or reception for a predetermined reason or for a predetermined time, a base station may transmit a message to the UE to allow the UE to be switched to the RRC idle mode (indicated by reference numeral 2e-01). The message may be an RRCConnectionRelease message. Subsequently, a UE (hereinafter, idle mode UE or inactive UE), to which a connection is not currently established, may perform an RRC connection resume procedure or an RRC connection establishment process with the base station if data to be transmitted is generated. The UE establishes reverse transmission synchronization with the base station through a random access process and transmits a message to the base station (indicated by reference numeral 2e-05). The message may be an RRCConnectionRequest message (in a case of a resume procedure, RRCResumeRequest message). The message may include a cause (establishmentCause) for establishing a connection with an identifier of the UE. The base station transmits a message so that the UE establishes an RRC connection (indicated by reference numeral 2e-10). The message may ben RRCConnectionSetup message (in a case of a resume procedure, RRCResumeRequest message). The message may include information indicating whether to use Ethernet protocol or whether to use a header compression and decompression procedure for each logical channel (logical channelconfig), for each bearer, for each PDCP device (PDCP-config), or for each SDAP layer device. Further, more specifically, each logical channel, bearer, or each PDCP device (or SDAP device) may indicate whether to use the Ethernet protocol or Ethernet header compression and decompression procedure only for a certain IP flow or a certain QoS flow (the SDAP device may be configured with information about IP flow or QoS flow as to whether to apply the Ethernet protocol or whether to use or not the Ethernet header compression method, so that the SDAP device may indicate, to the PDCP device, each QoS flow as to whether to apply the Ethernet protocol or whether to use the Ethernet header compression method. According to another method, the SDAP layer device or PDCP device may check each QoS flow for itself and determine whether or not to apply the Ethernet protocol or the Ethernet header compression method). In addition, if the SDAP device indicates whether to apply the Ethernet protocol or whether to use the Ethernet header compression method, the SDAP device may indicate an identifier for a predefined library or dictionary information to be used in whether to apply the Ethernet protocol or the Ethernet header compression method or the buffer size to be used. In addition, the message may include a command for setup or releasing whether to apply the Ethernet protocol or performing the Ethernet header compression method. In addition, In the above description, whether to apply the Ethernet protocol or using the Ethernet header compression method may be configured via an RLC AM bearer (an ARQ function, a lossless mode having a retransmission function) or via RLC UM bearer at all times, or may be configured together with a header compression protocol (ROHC) or may not be configured at the same time according to cases. In addition, the message may indicate whether to use the function of the SDAP layer device or the SDAP header for each logical channel (logicalchannelconfig), for each bearer, or for each PDCP device (PDCP-config). The message may indicate whether to apply IP packet header compression (ROHC) for each logical channel (logical channelconfig), for each bearer, or for each PDCP device (PDCP-config), and whether to apply the ROHC to uplink and downlink, respectively, may be configured via an indicator. In addition, whether to use a user data compression method (UDC) for each logical channel, for each bearer, or for each PDCP device may be configured for the uplink and the downlink, respectively. That is, the UDC may be configured to be used for the uplink and not to be used for the downlink. On the contrary, the UDC may be configured not to be used for the uplink and to be used for the downlink. In addition, the UDC may be configured to be used in both directions. In addition, the message may simultaneously configure the Ethernet header compression procedure and the ROHC header compression procedure. In addition, the message may define an indicator (drbEthHCContinue) to indicate continuously using context or Ethernet header compression protocol-related configuration information without initialization thereof in the case of a handover (for example, handover in a base station) or in the case of switching from an RRC inactive mode to an RRC connected mode. A UE having received the indicator may continuously use the Ethernet header compression protocol-related configuration information or the context, without initializing the same, by considering the indicator in the case of reestablishing the SDAP layer device or the PDCP layer device. Accordingly, the overhead due to reconfiguration of the Ethernet header compression protocol can be reduced. Further, the message may define a new indicator and indicate to initialize the context or the Ethernet header compression protocol-related configuration information. In addition, the RRC message may configure whether to configure an SDAP protocol or an SDAP header. In addition, the message may configure which type of Ethernet frame or Ethernet header is to be used for each bearer or logical channel to determine which type of fields are configured in the Ethernet header, how many bytes the Ethernet header size is, how many bits the size of each field of the Ethernet header is, or a method in which the fields of the Ethernet header are configured. In addition, in a case where padding is added to the Ethernet frame, the UE may indicate whether to configure using a function of preventing the padding from being transmitted through the actual wireless link by removing the padding at the transmission terminal and by adding the padding at the reception terminal.

In addition, the message may include RRC connection configuration information. The RRC connection is also referred to as a signaling radio bearer (SRB) and is used for transmitting or receiving an RRC message, which is a control message between a UE and a base station. A UE, which has established an RRC connection, may transmit a message to the base station (indicated by reference numeral 2e-15). The message may be an RRCConnetionSetupComplete message. If the base station does not know a UE capability of a UE that is currently establishing a connection or if the base station desires to identify a UE capability, the base station may transmit a message asking about the UE capability. Further, the UE may transmit a message reporting its own capability. The message may indicate whether the UE supports a new packet duplicating transmission function, and the UE may include an indicator indicating whether the UE supports the new packet duplicating transmission function in the message and transmit the same. The message may include a control message (for example, SERVICE REQUEST) requesting a bearer setup for a predetermined service from an MME. The base station may transmit the control message stored in the message to the MME (indicated by reference numeral 2e-20), and the MME may determine whether to provide a service requested by the UE. As a result of the determination, if the UE determines to provide the requested service, the MME may transmit an INITIAL CONTEXT SETUP REQUEST message to the base station (indicated by reference numeral 2e-25). The message may include information, such as quality of service (QoS) information to be applied in a case where a data radio bearer (DRB) is configured and security-related information (for example, a security key and a security algorithm) to be applied to the DRB. The base station may exchange a SecurityModeCommand message 2e-30 and a SecurityModeComplete message 2e-35 in order to establish security with the UE. If the security configuration is completed, the base station may transmit a message to the UE (indicated by reference numeral 2e-40). The message may be an RRCConnectionReconfiguration message.

The message may include information indicating whether to use Ethernet protocol or whether to use a header compression and decompression procedure for each logical channel (logical channelconfig), for each bearer, for each PDCP device (PDCP-config), or for each SDAP layer device. Further, more specifically, each logical channel, bearer, or each PDCP device (or SDAP device) may indicate whether to use the Ethernet protocol or Ethernet header compression and decompression procedure only for a certain IP flow or a certain QoS flow (the SDAP device may be configured with information about IP flow or QoS flow as to whether to apply the Ethernet protocol or whether to use or not the Ethernet header compression method, so that the SDAP device may indicate, to the PDCP device, each QoS flow as to whether to apply the Ethernet protocol or whether to use the Ethernet header compression method. Alternatively, the SDAP layer device or PDCP device may check each QoS flow for itself and determine whether or not to apply the Ethernet protocol or the Ethernet header compression method). In addition, if the SDAP device indicates whether to apply the Ethernet protocol or whether to use the Ethernet header compression method, the SDAP device may indicate an identifier for a predefined library or dictionary information to be used in whether to apply the Ethernet protocol or the Ethernet header compression method or the buffer size to be used. In addition, the message may include a command for setup or releasing whether to apply the Ethernet protocol or performing the Ethernet header compression method. In addition, In the above description, whether to apply the Ethernet protocol or using the Ethernet header compression method may be configured via an RLC AM bearer (an ARQ function, a lossless mode having a retransmission function) or via RLC UM bearer at all times, or may be configured together with a header compression protocol (ROHC) or may not be configured at the same time according to cases. In addition, the message may indicate whether to use the function of the SDAP layer device or the SDAP header for each logical channel (logicalchannelconfig), for each bearer, or for each PDCP device (PDCPconfig). The message may indicate whether to apply the IP packet header compression (ROHC) for each logical channel (logical channelconfig), for each bearer, or for each PDCP device (PDCP-config), and whether to apply ROHC to uplink and downlink, respectively, may be configured via an indicator. In addition, whether to use a user data compression method (UDC) for each logical channel, for each bearer, or for each PDCP device may be configured for the uplink and the downlink, respectively. That is, the UDC may be configured to be used for the uplink and not to be used for the downlink. On the contrary, the UDC may be configured not to be used for the uplink and to be used for the downlink.

In addition, the UDC may be configured to be used in both directions.

In addition, the message may simultaneously configure the Ethernet header compression procedure and the ROHC header compression procedure. In addition, the message may define an indicator (drbEthHCContinue) to indicate continuously using context or Ethernet header compression protocol-related configuration information without initialization thereof in the case of a handover (for example, handover in a base station) or in the case of switching from an RRC inactive mode to an RRC connected mode. A UE having received the indicator may continuously use the Ethernet header compression protocol-related configuration information or the context, without initializing the same, by considering the indicator in the case of reestablishing the SDAP layer device or the PDCP layer device. Accordingly, the overhead due to reconfiguration of the Ethernet header compression protocol can be reduced. Further, the message may define a new indicator and indicate to initialize the context or the Ethernet header compression protocol-related configuration information. In addition, the RRC message may configure whether to configure an SDAP protocol or an SDAP header. In addition, the message may configure which type of Ethernet frame or Ethernet header is to be used for each bearer or logical channel to determine which type of fields are configured in the Ethernet header, how many bytes the Ethernet header size is, how many bits the size of each field of the Ethernet header is, or a method in which the fields of the Ethernet header are configured. In addition, in a case where padding is added to the Ethernet frame, the UE may indicate whether to configure using a function of preventing the padding from being transmitted through the actual wireless link by removing the padding at the transmission terminal and adding the padding at the reception terminal.

In addition, the message includes configuration information of a DRB in which user data is to be processed, and a UE may configure DRB by applying the information and transmit a message to a base station (indicated by reference numeral 2e-45). The message may be an RRCConnectionReconfigurationComplete message. A base station, which has completed DRB configuration with a UE, may transmit an INITIAL CONTEXT SETUP COMPLETE message to an MME (indicated by reference numeral 2e-50), and the MME, which has received the INITIAL CONTEXT SETUP COMPLETE message, may exchange an S1 BEARER SETUP message and an S1 BEARER SETUP RESPONSE message (indicated by reference numerals 2e-55 and 2e-60). The S1 bearer may be a connection for data transmission, established between the S-GW and the base station, and may correspond to the DRB in one-to-one relationship. If the above process is completed, the UE transmits or receives data through S-GW to or from the base station (indicated by reference numerals 2e-65 and 2e-70). As such, the general data transmission process largely may include three operations of: RRC connection configuration, security configuration, and DRB configuration. In addition, the base station may transmit an RRCConnectionReconfiguration message to the UE in order to perform updating, adding, or changing of a configuration (indicated by reference numeral 2e-75).

Figure 2F:
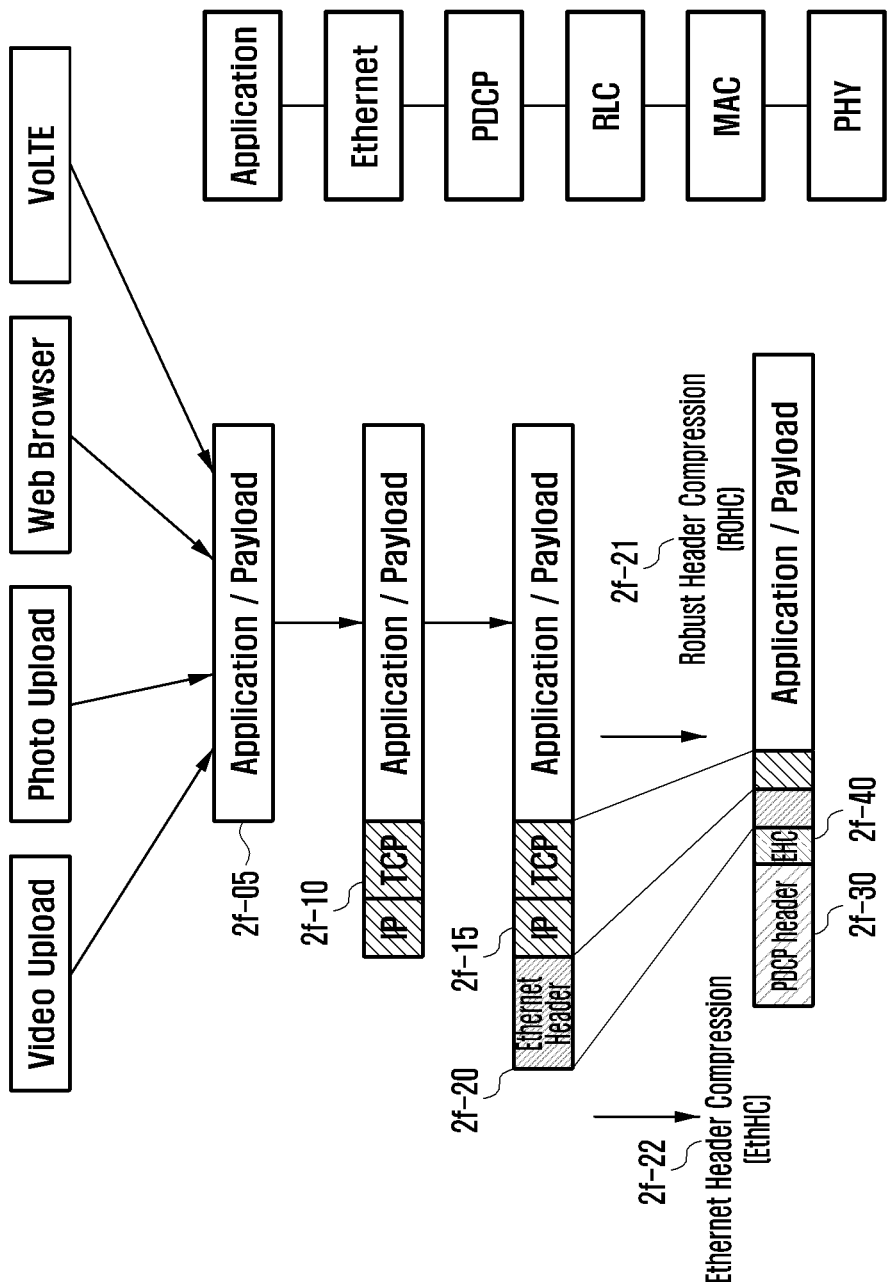
FIG. 2F illustrates an Ethernet header compression (EthHC) method according to an embodiment of the disclosure.

FIG. 2F illustrates an Ethernet header compression (EthHC) method according to an embodiment of the disclosure.

Referring to FIG. 2F, higher layer data 2f-05 may be generated as data corresponding to services, such as video transmission, photo transmission, web search, and VoLTE. Data generated by an application layer device may be processed through TCP/IP or UDP corresponding to a network data transport layer, or may be processed through the Ethernet protocol and configure respective headers 2f-10, 2f-15, and 2f-20 (a higher layer header or an Ethernet header) and may be transferred to the PDCP layer. If the PDCP layer receives data (PDCP SDU) from a higher layer, the PDCP layer may perform the following procedure.

If the header compression (ROHC) or Ethernet header compression procedure is configured to be used in the PDCP layer through RRC messages, such as 2e-10, 2e-40, or 2e-75 in FIG. 2E, a TCP/IP header is compressed via ROHC as shown in 2f-21, and the PDCP layer device may perform the Ethernet header compression procedure for the Ethernet header 2f-20 as shown in reference numeral 2f-22. Further, a separate Ethernet header compression (EHC) header 2f-40, which includes a field for indicating whether to compress the Ethernet header or a field for indicating which fields of the Ethernet header are compressed (omitted) or not compressed (non-omitted), is configured and the EHC header may be configured before the compressed header. If integrity verification is configured, a PDCP PDU may be configured by performing integrity protection for the PDCP header, the EHC header, compressed headers, and data, performing a ciphering procedure for the EHC header, compressed headers, and data, or compressed headers and data except for the EHC header, and configuring a PDCP header 2f-30. The PDCP layer device may include a header compressor/decompressor, may determine whether to perform header compression for each data as configured through the RRC message, and may use the header compressor/decompressor. The transmission terminal may compress the Ethernet header or a higher layer header (e.g., TCP/IP header) using the header compressor in the transmission PDCP layer device, and the reception terminal may decompress the Ethernet header or the higher layer header (e.g., TCP/IP header) using the header decompressor in the reception PDCP layer device.

The procedure of FIG. 2F described above may be applied to the case where a UE performs downlink data header compression as well as uplink header compression. In addition, a description of uplink data may be equally applied to downlink data.

The method for performing Ethernet header compression on the Ethernet header proposed by the disclosure is a method for reducing the header size by omitting fields indicating static information and indicating only changed information. Therefore, at first, information may be transmitted by including the full header information and configuration information for compression (for example, a traffic (or service)-specific identifier (type) for the Ethernet protocol, a traffic (or service)-specific serial number, information related to a compression rate, etc.). In addition, fields (for example, a transmission address field or a reception address field (MAC address), a preamble field, the start of frame delimiter (SFD), or frame checksum (FCS), or an Ethernet type field, etc.) corresponding to unchanged information in comparison with full information transmitted at first may be omitted or not be transmitted, and the header may be configured to include only fields corresponding to changed information so as to reduce the size of the header. Alternatively, compressible fields and non-compressible fields are distinguished, and if the values of the compressible fields are not changed in comparison with the field values of the full header transmitted at first, only compressible fields are compressed (or omitted) and transmitted, and non-compressible fields are always transmitted without being compressed (or omitted). In addition, if even one field among the compressible fields has a value having been changed compared to a field value of the previously transmitted full header, it may be characterized in that the full header is transmitted again. In addition, each time the full header is received, the reception PDCP layer device may always transmit feedback indicating that the full header is received well to a transmission PDCP layer device.

Figure 2G:
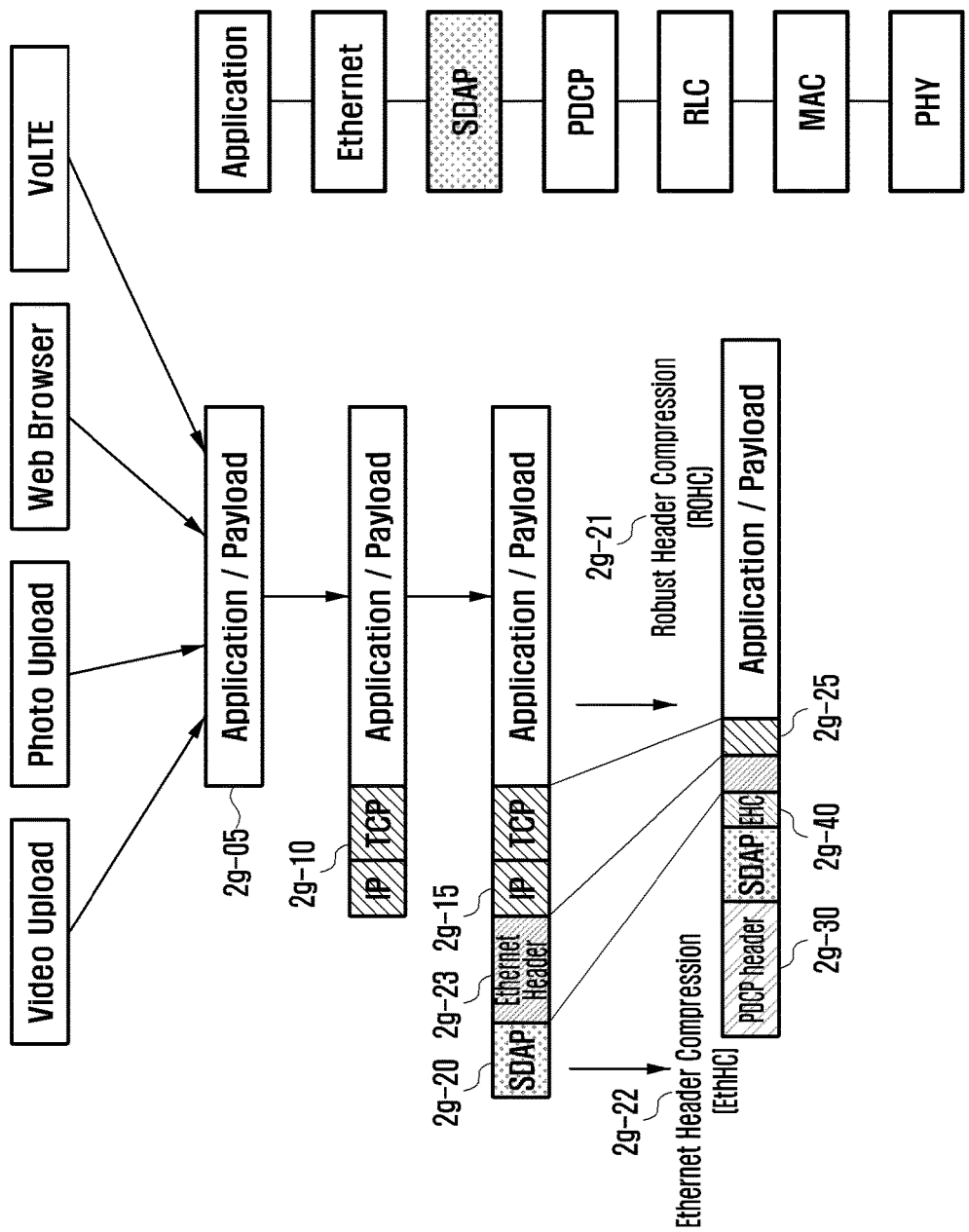
FIG. 2G illustrates an Ethernet header compression (EthHC) method proposed if an SDAP header or a layer device is configured according to an embodiment of the disclosure.

FIG. 2G illustrates an Ethernet header compression (EthHC) method proposed if an SDAP header or a layer device is configured according to an embodiment of the disclosure.

Referring to FIG. 2G, higher layer data 2g-05 may be generated as data corresponding to services, such as video transmission, photo transmission, web search, and VoLTE. Data generated by an application layer device may be processed through TCP/IP or UDP corresponding to a network data transport layer, or may be processed through the Ethernet protocol and an SDAP layer device, may configure respective headers 2g-10, 2g-15, and 2g-20 (a higher layer header, an Ethernet header, or an SDAP header) and may be transferred to a PDCP layer. If the PDCP layer receives data (PDCP SDU) from a higher layer, the PDCP layer may perform the following procedure.

If the header compression (ROHC) or Ethernet header compression procedure is configured to be used in the PDCP layer through RRC messages, such as 2e-10, 2e-40, or 2e-75 in FIG. 2E, a TCP/IP header is compressed via ROHC as shown in 2g-21, and the PDCP layer device may perform the Ethernet header compression procedure for a Ethernet header 2g-23, except for the SDAP header, as shown in 2g-22. Further, a separate Ethernet header compression (EHC) 2g-40 header, which includes a field for indicating whether to compress the Ethernet header or a field for indicating which fields of the Ethernet header are compressed (omitted) or not compressed (non-omitted), is configured and the EHC header may be configured before the compressed header. If integrity verification is configured, a PDCP PDU may be configured by performing integrity protection for an SDAP header, a PDCP header, an EHC header, compressed headers, and data, performing a ciphering procedure for compressed headers, data, and the EHC header except for the SDAP header, or compressed headers and data except for the SDAP header and the EHC header, and configuring a PDCP header 2g-30. The PDCP layer device may include a header compressor/decompressor, may determine whether to perform header compression for each data as configured through the RRC message, and may use the header compressor/decompressor. The transmission terminal may compress the Ethernet header or a higher layer header (e.g., TCP/IP header) using the header compressor in the transmission PDCP layer device, and the reception terminal may decompress the Ethernet header or the higher layer header (e.g., TCP/IP header) using the header decompressor in the reception PDCP layer device.

The procedure of FIG. 2G described above may be applied to the case where a UE performs downlink data header compression as well as uplink header compression. In addition, a description of uplink data may be equally applied to downlink data.

The method for performing Ethernet header compression on the Ethernet header proposed by the disclosure is a method for reducing the header size by omitting fields indicating static information and indicating only changed information. Therefore, at first, information may be transmitted by including the full header information and configuration information for compression (for example, a traffic (or service)-specific identifier (type) for the Ethernet protocol, a traffic (or service)-specific serial number, information related to a compression rate, etc.). In addition, fields (for example, a transmission address field or a reception address field (MAC address), a preamble field, the start of frame delimiter (SFD), or frame checksum (FCS), or an Ethernet type field, etc.) corresponding to unchanged information in comparison with full information transmitted at first may be omitted or not be transmitted, and the header may be configured to include only fields corresponding to changed information so as to reduce the size of the header. Alternatively, compressible fields and non-compressible fields are distinguished, and if the values of the compressible fields are not changed in comparison with the field values of the full header transmitted at first, only compressible fields are compressed (or omitted) and transmitted, and non-compressible fields are always transmitted without being compressed (or omitted). In addition, if even one field among the compressible fields has a value having been changed compared to a field value of the previously transmitted full header, it may be characterized in that the full header is transmitted again. In addition, each time the full header is received, the reception PDCP layer device may always transmit feedback indicating that the full header is received well to a transmission PDCP layer device.

Figure 2H:
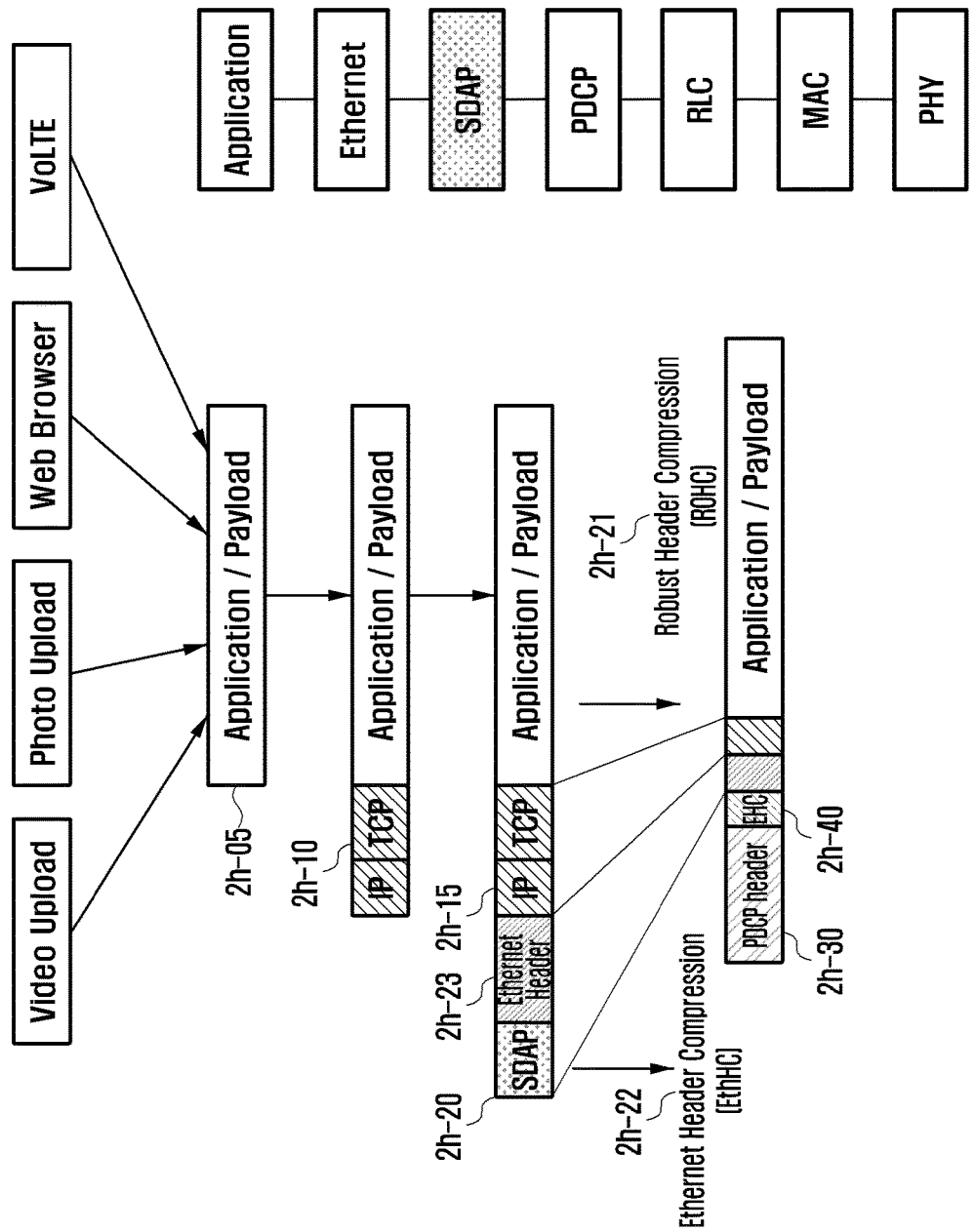
FIG. 2H illustrates another Ethernet header compression (EthHC) method proposed if an SDAP header or a layer device is configured according to an embodiment of the disclosure.

FIG. 2H illustrates another Ethernet header compression (EthHC) method proposed if an SDAP header or a layer device is configured according to an embodiment of the disclosure.

Referring to FIG. 2H, higher layer data 2h-05 may be generated as data corresponding to services, such as video transmission, photo transmission, web search, and VoLTE. Data generated by an application layer device may be processed through TCP/IP or UDP corresponding to a network data transport layer, or may be processed through the Ethernet protocol and an SDAP layer device, may configure respective headers 2h-10, 2h-15, and 2h-20 (a higher layer header, an Ethernet header, or an SDAP header) and may be transferred to a PDCP layer. If the PDCP layer receives data (PDCP SDU) from a higher layer, the PDCP layer may perform the following procedure.

If the header compression (ROHC) or Ethernet header compression procedure is configured to be used in the PDCP layer through RRC messages, such as 2e-10, 2e-40, or 2e-75 in FIG. 2E, a TCP/IP header is compressed via ROHC as shown in 2h-21, and the PDCP layer device may perform the Ethernet header compression procedure for an SDAP header and an Ethernet header 2h-23 as shown in 2h-22. Further, a separate Ethernet header compression (EHC) 2h-40 header, which includes a field for indicating whether to compress the SDAP header and the Ethernet header or a field for indicating which fields of the SDAP header or the Ethernet header are compressed (omitted) or not compressed (non-omitted), is configured and an EHC header may be configured before the compressed header. If integrity verification is configured, a PDCP PDU may be configured by performing integrity protection for the PDCP header, the EHC header, compressed headers (compressed SDAP header, compressed Ethernet header, or compressed TCP/IP header) and data, performing a ciphering procedure for the EHC header, compressed headers (compressed SDAP header, compressed Ethernet header, or compressed TCP/IP header) and data, or data and compressed headers (compressed SDAP header, compressed Ethernet header, or compressed TCP/IP header) except for the EHC header, and configuring a PDCP header 2h-30. The PDCP layer device may include a header compressor/decompressor, may determine whether to perform header compression for each data as configured through the RRC message, and may use the header compressor/decompressor. The transmission terminal may compress the Ethernet header or a higher layer header (e.g., TCP/IP header) using the header compressor in the transmission PDCP layer device, and the reception terminal may decompress the Ethernet header or the higher layer header (e.g., TCP/IP header) using the header decompressor in the reception PDCP layer device.

The procedure of FIG. 2H described above may be applied to the case where a UE performs downlink data header compression as well as uplink header compression. In addition, a description of uplink data may be equally applied to downlink data.

The method for performing Ethernet header compression on the Ethernet header proposed by the disclosure is a method for reducing the header size by omitting fields indicating static information and indicating only changed information. Therefore, at first, information may be transmitted by including the full header information and configuration information for compression (for example, a traffic (or service)-specific identifier (type) for the Ethernet protocol, a traffic (or service)-specific serial number, information related to a compression rate, etc.). In addition, fields (for example, a transmission address field or a reception address field (MAC address), a preamble field, the start of frame delimiter (SFD), or frame checksum (FCS), or an Ethernet type field, etc.) corresponding to unchanged information in comparison with full information transmitted at first may be omitted or not be transmitted, and the header may be configured to include only fields corresponding to changed information so as to reduce the size of the header. Alternatively, compressible fields and non-compressible fields are distinguished, and if the values of the compressible fields are not changed in comparison with the field values of the full header transmitted at first, only compressible fields are compressed (or omitted) and transmitted, and non-compressible fields are always transmitted without being compressed (or omitted). In addition, if even one field among the compressible fields has a value having been changed compared to a field value of the previously transmitted full header, it may be characterized in that the full header is transmitted again. In addition, each time the full header is received, the reception PDCP layer device may always transmit feedback indicating that the full header is received well to a transmission PDCP layer device.

The Ethernet header compression method as described above may be equally applied to the SDAP header as well as the Ethernet header so as to compress the SDAP header. This is because D/C field, QFI field, RQI field, and RDI fields configured in the SDAP header (uplink or downlink) usually have fixed values. In particular, the QFI field has a nearly fixed value, and the RQI field or the RCI field is not used except for the case where a base station indicates that QoS mapping update is required. Accordingly, the SDAP header is compressed together with the Ethernet header by applying a method for compressing the Ethernet header to the SDAP header. If header compression is applied to the SDAP header as described above, the SDAP header may be ciphered, and the same compression method may be provided to the LTE system and the NR system in which the SDAP header can be configured, so as to provide convenience for implementation.

In addition, the header compression algorithm proposed in the disclosure may apply only to PDCP user data (PDCP data PDU) received from a higher layer, and may not apply to PDCP control data (PDCP control PDU) generated by the PDCP layer device.

As proposed in the disclosure above, in the Ethernet header compression protocol 2f-22, the PDCP layer device may identify the Ethernet header in a case of receiving data from a higher layer device, compress the Ethernet header by using a protocol for compressing the Ethernet header, and define and use a new header 2f-40 before the compressed Ethernet header. In the above description, ciphering of the new header 2f-40 is not performed. This is because, if ciphering of the new header 2f-40 is not performed in UE implementation, and if the SDAP header has been configured in a case of transmitting data to a lower layer device after performing data processing, such as integrity protection or ciphering procedure, in the PDCP layer device, the SDAP header, the PDCP header, or the new header may be concatenated together at once, the UE can be easily implemented.

According to another method, ciphering may be performed for the new header 2f-40.

This is because the new header is regarded as data generated by the PDCP layer device and data processing is performed, and thus the data processing procedure can be simplified.

In a case of applying the header compression method proposed in the disclosure, in order to decompress the compressed Ethernet header at the reception terminal side, which fields are not compressed, are omitted, or are transmitted need to be known. Therefore, if a transmitter side compresses the Ethernet header, a new header (for example, an EHC header) may be defined and put in a forepart of the compressed Ethernet header and then transmitted. A new first field is defined in the new EthHC header to indicate which field among the plurality of fields of the Ethernet header is compressed, is omitted or is not transmitted (e.g., a context identifier). According to another method, the new field may indicate whether a particular field has been compressed (or omitted or not transmitted) or uncompressed (or included or transmitted) using each bit in a bitmap format. In addition, since the first field may indicate which field in the Ethernet header has been compressed (or omitted) or not (or included), the reception terminal side may calculate the size of the compressed Ethernet header having been received using the first field. That is, the size of the compressed Ethernet header can be known by subtracting the size of the omitted header field from the size of the original Ethernet header.

In addition, the first field may include a mapping for indicating whether to perform compression (or omit) for all fields of the Ethernet header. However, it is possible to reduce the overhead of the new EthHC header by allowing only the compressible (or omittable) fields among the fields of the Ethernet header to have a mapping indicating whether to compress (or omit).

In addition, a 1-bit indicator may be defined in the new EHC header to indicate whether the Ethernet header (or SDAP header) is compressed or no compression is applied. The 1-bit indicator may be defined and used in a PDCP header.

In addition, the EHC header may indicate the size or length of the Ethernet header compressed into a second field in order to accurately indicate the size of the compressed Ethernet header (for example, for convenience of implementation). In addition, if the Ethernet header includes multiple size types, the second field may indicate the size type of the Ethernet header. Alternatively, a new third field indicating whether Ethernet header compression is performed or not may be defined in the EHC header.

According to another method, an identifier indicating multiple Ethernet header compression methods may be defined and used in the EHC header, respectively. The identifier may also indicate an Ethernet header type or a QoS flow identifier. Because multiple higher layer headers having different header structures (for example, various types of Ethernet headers) are configured by different fields, a method for compressing and not compressing fields needs to be changed according to the field types. Therefore, for example, a first identifier indicating a header type or content may indicate to apply a first Ethernet header compression method, and a second identifier may indicate to apply a second Ethernet header compression method. Therefore, if a plurality of data streams or QoS flows are mapped to one PDCP layer device, different header compression methods can be applied by applying the new identifier, and the reception terminal can distinguish the compression methods and perform different decompression methods.

In the disclosure, the Ethernet header compression method may be applied to not only the Ethernet header but also a general higher layer device header. The header compression method is referred to as an Ethernet header compression method in the disclosure, for convenience.

In addition, the configuration of the Ethernet header fields according to the type of the Ethernet header in the above may be configured for each bearer through the RRC message such that which types of Ethernet header or header fields are configured as described in FIG. 2E. For example, a header compression or decompression method may be employed by configuring information in a type of a higher layer header (for example, an Ethernet header type) that can be configured in a higher layer device of each bearer and configuring identifiers mapped to each header type. That is, an identifier or indicator indicating the type of Ethernet header may be defined and used in the new header. In addition, a reception terminal of the new header may include a checksum field in which whether successful decompression of the Ethernet header is performed. Alternatively, a field indicating to initialize a buffer for compression of a transmission PDCP layer device and a buffer for decompression of the reception PDCP layer device may be defined and used. Fields defined in the new header may be defined and used in a PDCP header or an SDAP header.

In addition, if the reception PDCP layer device successfully receives data, the new EHC header may define and use a field indicating a feedback request. That is, instead of always transmitting feedback each time a reception terminal PDCP layer device receives a full header, feedback transmission may be performed only in a case where the transmission terminal PDCP layer device requests feedback via the indicator, so as to reduce the overhead.

Another Ethernet header compression method may be used based on the new EHC header. For example, if the transmission terminal compresses the Ethernet header, compression is sequentially performed, and during compression, if the values of the header fields are not changed in comparison with those of the fields of the previously transmitted Ethernet header, the Ethernet header is compressed (omitted) and first field is configured according thereto, and if the Ethernet header field value is different from the previously transmitted Ethernet header field value, the Ethernet header is uncompressed (included) and the first field may be configured according thereto, and thus the Ethernet header compression can be completed. The Ethernet header compression described above may be performed in ascending order based on a PDCP serial number or a COUNT value, a preceding Ethernet header may indicate an Ethernet header corresponding to data, which has a value smaller by one than that of a PDCP serial number or COUNT value. Upon receiving the compressed Ethernet header, the reception terminal may check the first field, and if the compressed (omitted) fields in the Ethernet header have the same values as those of fields of the previously received Ethernet header, the reception terminal may reconstruct the compressed (omitted) fields in the Ethernet header according thereto, and may newly update uncompressed (included) fields. The transmission terminal and reception terminal may have separate buffers for compressing the Ethernet header, may update the buffer each time the Ethernet header is compressed, and may update the buffer each time the Ethernet header is decompressed. If the compressed Ethernet header is reconstructed, the reception terminal may remove the new EthHC header and transmit the reconstructed Ethernet header to a higher layer. In addition, the transmission terminal may transmit full Ethernet header information if the Ethernet header is transmitted at first. That is, at first, the reception terminal may transmit the Ethernet header without performing the Ethernet header compression so that the reception terminal may identify the full Ethernet header information.

In the following description of the disclosure, specific embodiments of the Ethernet header compression method are proposed.

Figure 2I:
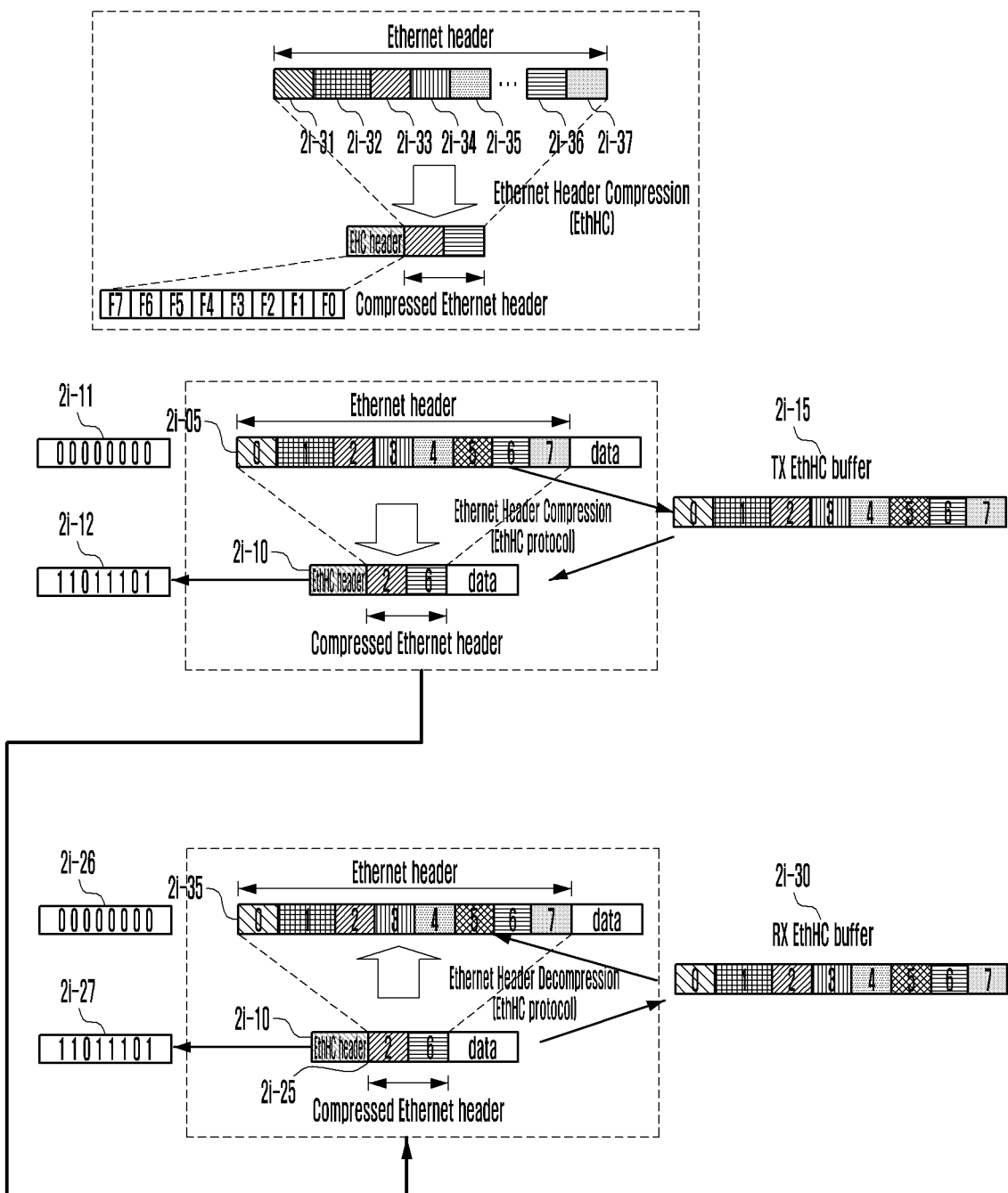
FIG. 2I illustrates a first specific embodiment of an Ethernet header compression method according to an embodiment of the disclosure.

FIG. 2I illustrates a specific (2-1)th embodiment of the Ethernet header compression method according to an embodiment of the disclosure.

A method for compressing an Ethernet header according to the (2-1)th embodiment of the disclosure is a method for omitting fields, which has unchanged field values, among a plurality of header fields $2i$-31, $2i$-32, $2i$-33, $2i$-34, $2i$-35, $2i$-36, $2i$-37 in an Ethernet header, fields having unchanged field values in comparison with previously transmitted Ethernet headers, or fields having Ethernet header field values that do not need to be transmitted, and selectively transmitting necessary fields, valid fields, or fields having changed field values. Accordingly, among the plurality of fields included in the Ethernet header, for example, among a first field $2i$-31, a second field $2i$-32, a third field $2i$-33, a fourth field $2i$-34, a fifth field $2i$-35, a sixth field $2i$-36, or a seventh field $2i$-37, if the first field $2i$-31, the second field $2i$-32, the fourth field $2i$-34, the fifth field $2i$-35, or the seventh field $2i$-37 are omittable or do not need to be transmitted, or the fields values of which are the same as those of the previously transmitted Ethernet header field values, only the third field $2i$-33 and the sixth field $2i$-36 are transmitted.

In addition, the embodiment proposes separate configuration of a new EHC header so as to apply the above method to perform compression and decompression at the reception terminal. In the (2-1)th embodiment of the disclosure, the new EHC header may have bitmap structures 2i-11 and 2i-12. That is, the bitmap structure may include as many bits as the number of fields of the header structure to which compression is applied, and may indicate, as a value of 0 or 1, whether a header field corresponding to each bit is compressed or not compressed. According to another method, the bitmap structure may include as many bits as the number of compressible fields of the header structure to which compression is applied, and may indicate, as a value of 0 or 1, whether a header field corresponding to each bit is compressed or not compressed.

For example, as shown in FIG. 2I, if the PDCP layer device of the transmission terminal receives an Ethernet frame 2i-05 from a higher layer device and if the Ethernet header compression procedure is configured, and the PDCP layer device may store respective field values of the Ethernet header of the firstly received Ethernet frame in a buffer 2i-15 for transmission Ethernet compression. The PDCP layer device may transmit the full header of the first Ethernet frame as it is without Ethernet header compression. Upon receiving, from the reception PDCP layer device, feedback indicating that the full header is normally received, application of the Ethernet compression procedure may be started. In the above description, a plurality of full headers may be transmitted. For example, a plurality of full headers and data (first data, second data and subsequent data) may be transmitted until feedback indicating normal reception of the full header is received from the reception PDCP layer device.

In the above description, if the Ethernet compression procedure is started, and if the next Ethernet frame is received, each field value of the Ethernet header is compared with the field values stored in a transmission buffer for the Ethernet compression. If the Ethernet header has a field having the same value with the field values stored in the transmission buffer, the corresponding field is omitted, and a bit corresponding to or mapped to the omitted field may be configured to be 1 (or 0) and may indicate that the field is omitted. If each field value of the Ethernet header of the second Ethernet frame is compared with the field values stored in the transmission buffer for the Ethernet compression, and if the Ethernet header has a field having a different value with the field values stored in the transmission buffer, the corresponding field is not omitted, a bit corresponding to or mapped to the field that is not omitted may be configured to be 1 (or 0), and may indicate that the field is not omitted.

If integrity protection is configured, integrity protection may be performed, a ciphering procedure may be performed, the new header 2i-10 may be configured, a PDCP header may be configured, and the new header and the PDCP header are concatenated and transferred to a lower layer device.

The new header 2i-10 may allow each bit to indicate which field of the Ethernet header is present (uncompressed) or missing (compressed), such as a bitmap.

In the new header 2i-10, a new field (for example, a 1-bit indicator) may be defined to indicate whether the Ethernet header compression procedure is performed or not. The 1-bit indicator may directly indicate a case where the Ethernet header compression has not been performed, so as to enable the reception terminal not to perform processing of a new header and an uncompressed higher layer header. The 1-bit indicator may be defined to be located at the very front of a new EHC header that is always present if the Ethernet header compression algorithm is configured, so that the reception terminal may directly check whether or not the compression is performed. In addition, the 1-bit indicator indicating whether the Ethernet header compression procedure is performed or not may be defined and used in the SDAP header or PDCP header. If the 1-bit indicator is defined in the SDAP header or PDCP header, and in a case where the Ethernet header compression procedure is not performed, the overhead can be reduced because the new header 2i-10 for Ethernet header compression can be omitted. In addition, a case where all bit values are configured to be 0 (or 1) in the bitmap field may be defined and used as a special value indicating an uncompressed full header (indicated by reference numeral 2i-26), or may indicate to initialize a buffer used for compression of a transmission PDCP layer device and a buffer used for decompression of a reception PDCP layer device.

In FIG. 2I, the PDCP layer device or the SDAP layer device of the reception terminal may receive the compressed Ethernet frame 2i-25 from a lower layer device and, if the Ethernet header compression procedure is configured, may check respective field values of the Ethernet header of the Ethernet frame having the firstly received uncompressed full header and store the field values in a reception buffer 2i-30 for Ethernet decompression in the reception terminal. If a full header (e.g., SDAP header or Ethernet header) is successfully received, feedback indicating successful reception of the full header is transmitted to the transmission PDCP layer device to enable application of Ethernet header compression to be started. The first Ethernet frame may be transmitted to a higher layer device without decompression of the Ethernet header. Then, upon receiving the next Ethernet frame, the next Ethernet frame is deciphered, and in a case where the new EHC header is checked to see whether the header is compressed or uncompressed, if the new EHC header is uncompressed, integrity verification is performed, the EHC header is removed, and data is transmitted to a higher layer. If the new EHC header indicates that the Ethernet header (or SDAP header) is compressed, the field value of the new header 2i-10 for Ethernet compression is checked to determine which fields are omitted (compressed) and which fields are not omitted (uncompressed). Further, the reception terminal may reconstruct values of fields, which are indicated to be omitted (compressed) in the above description, to field values stored in the reception buffer 2i-30 for Ethernet decompression so as to reconstruct (decompress) the Ethernet header before compression thereof. Since values for the fields indicated as non-omitted (uncompressed) is a new or changed value, the reception terminal may store the new or changed values as field values according to the field in the reception buffer for decompression. If deciphering is performed and integrity protection is configured, integrity verification is performed. If there is no error, an Ethernet frame may be configured together with the reconstructed Ethernet header and transmitted to the higher layer device.

In the above description, if the field values of the Ethernet header are changed while the transmission PDCP layer device applies the Ethernet header compression method, the transmission PDCP layer device indicates to the new EHC header that the Ethernet header is not compressed and transmits a full header to initialize a buffer of the reception terminal and configures the buffer to have values of the full header again. Upon receiving the uncompressed full header, the reception PDCP layer device may transmit feedback indicating successful reception of the uncompressed full header to the transmission PDCP layer device. In the disclosure, each time the reception PDCP layer device receives the uncompressed full higher layer header, the reception PDCP layer device may always transmit feedback indicating successful reception of the uncompressed full higher layer header to the transmission PDCP layer device. In addition, in the disclosure, upon receiving an uncompressed full higher layer header, the reception PDCP layer device always transmits feedback indicating successful reception of the uncompressed full higher layer header to the transmission PDCP layer device, but does not transmit the feedback in the case of receiving an uncompressed higher layer header. The reception PDCP layer device performs different operations according to whether or not higher layer compression of the received data is performed.

The separate new EHC header may have a fixed size (e.g., 1 byte or 2 bytes).

In the above embodiment, a length field of the Ethernet header may also be compressed and decompressed by applying the method described above. According to another method, the length field of the Ethernet header may be transmitted always without being compressed.

According to another method, the length field of the Ethernet header may be transmitted always without being compressed. The reception PDCP layer device may calculate the length of the Ethernet frame by decompressing the remaining fields except the length field and then adding a length of the length field (since the length of the length field is a fixed value) thereto, and then the PDCP layer device may reconstruct the length value and add the reconstructed length value to the length field of the Ethernet frame. Accordingly, an indication of the length field may be omitted in the new EHC header, the transmission PDCP layer device may always omit (compress) the length field even if the length field value is different for each data and perform transmission, and the reception PDCP layer device may calculate the length field value according to the above described method, so as to reconstruct the length field value of the Ethernet header.

In addition, in a case where an Ethernet header compression method and ROHC (for example, a TCP/IP header or UDP header compression method) are configured together for a bearer, if the length field of the Ethernet header may be transmitted always without being compressed, the reception PDCP layer device may first apply the ROHC decompression method to the received data (for example, PDCP PDU or PDCP SDU), and then applies the Ethernet header decompression method thereto. This is because, in a case where the reception terminal (for example, the reception PDCP layer device) reconstructs the length field of the Ethernet header, if the length field is reconstructed to the length of data to which header compression is applied via ROHC, the length field in the higher layer device (for example, the Ethernet layer device) may be incorrectly reconstructed so that data may be truncated or an error may occur. Therefore, if the Ethernet header compression method and the ROHC header compression method are configured together, the reception PDCP layer device may first decompress the higher layer header by applying the ROHC header decompression method, and may decompress the Ethernet header by applying the Ethernet decompression method. In addition, upon reconstructing the length field value of the Ethernet header in the Ethernet header decompression procedure, the reception PDCP layer device may use a method for deriving and calculating the length field value by considering the size of the length field (for example, performing decompression of the remaining fields except for the length field), the length of the length field (because the length of the length field is known as a fixed value), the size of the decompressed Ethernet header, or the length of data (e.g., higher layer data or Ethernet frame) to which ROHC header decompression is applied, and then reconstructing the length value (for example, the length of data reconstructed by applying the ROHC header decompression) and adding the reconstructed length value to the length field of the Ethernet header. Therefore, the indication of the length field may be omitted in the new EHC header, and even if the length field value is different for each data, the transmission PDCP layer device may always perform transmission in a state of omitting (compressing) the length field, and the reception PDCP layer device may calculate the length field value according to the above method so as to always reconstruct the length field value of the Ethernet header.

In addition, the new EHC header may define and use a field indicating a feedback request if the reception PDCP layer device successfully receives data. That is, instead of always transmitting feedback each time the reception PDCP layer device receives the full header, feedback transmission may occur only if the transmission PDCP layer device requests the feedback via the indicator, so as to reduce overhead.

In the new EHC header, an identifier indicating a plurality of Ethernet header compression methods, together with a bitmap field, may be defined and used. The identifier may also indicate an Ethernet header type or a QoS flow identifier. Because multiple higher layer headers having different header structures (for example, various types of Ethernet headers) are configured by different fields, a method for field compression or not needs to be changed according to the field types, and the bitmap fields corresponding to the fields of the higher layer header type needs to be applied accordingly. Therefore, for example, a first identifier indicating a header type or content may indicate to apply a first bitmap field or bitmap mapping, and a second identifier may indicate to apply a second bitmap field or bitmap mapping. Therefore, if a plurality of data streams or QoS flows are mapped to one PDCP layer device, different header compression methods can be applied by applying the new identifier, and the reception terminal can distinguish the compression methods and perform different decompression methods. In this case, in order to apply different header compression and decompression methods to data streams having different higher layer header structures, the higher layer header field values are independently stored, for each higher layer header structure, in the buffer of the transmission PDCP layer device or the buffer of the reception PDCP layer device.

Figure 2J:
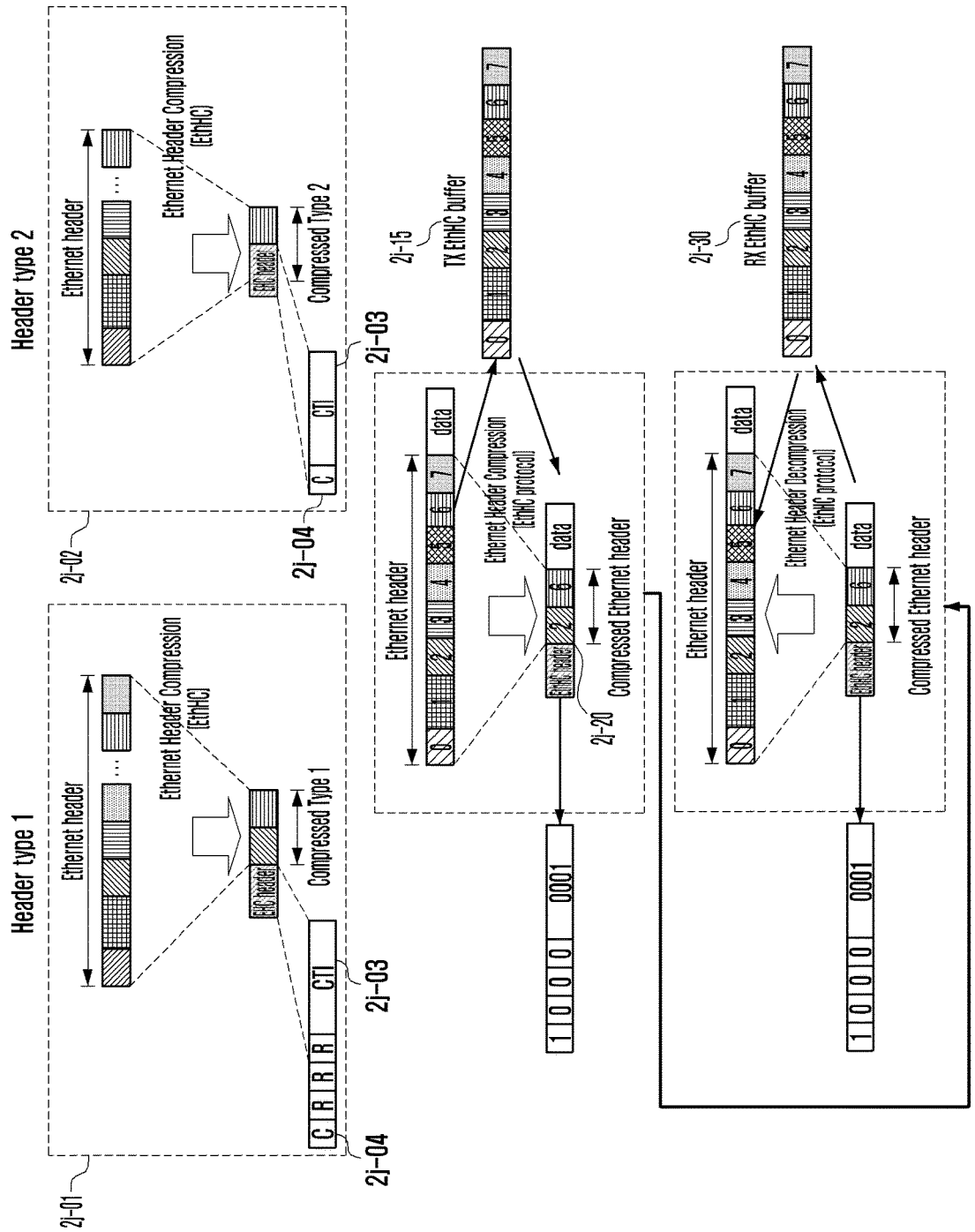
FIG. 2J illustrates a second specific embodiment of an Ethernet header compression method according to an embodiment of the disclosure.

FIG. 2J illustrates a specific (2-2)th embodiment of an Ethernet header compression method proposed by the disclosure.

In the (2-2)th embodiment of the disclosure, if a plurality of data streams or QoS flows are mapped to one bearer or one PDCP layer device, a method for applying header compression and decompression methods according to different data streams having header structures of different higher layer devices or QoS flows is applied.

The (2-2)th embodiment may be characterized by applying a fixed unique header compression and decompression method for each header structure (for example, an Ethernet header structure or an SDAP header structure) of different higher layer devices. For example, the embodiment may define fields that can be compressed (or is omittable) and fields that cannot be compressed (or is not omittable) in a first higher layer header structure 2j-01. Further, the embodiment may define fields that can be compressed (or is omittable) and fields that cannot be compressed (or is not omittable) in a second higher layer header structure 2*j*-02. In addition, the new EHC header may configure an identifier (compressed type identifier (CTI) field) 2*j*-03 indicating the different higher layer header structures and indicate to the reception PDCP layer device a method by which a higher layer device header structure is compressed.

For example, the transmission PDCP layer device may store, in the transmission buffer 2*j*-15, the higher layer header field values of data having the first higher layer header structure, received from the higher layer, transmit data including the full header, compression of which is not performed upon first transmission, and may apply the header compression method if feedback indicating successful reception of the full header information is received from the reception PDCP layer device. That is, if all of the field values of the compressible fields among the higher layer header field values of the next received data are the same as the field values stored in the transmission buffer, all of the compressible fields may be compressed and uncompressible fields are configured as they are. In addition, an identifier indicating the first higher layer header structure and an indicator (compression field (C field)) 2*j*-04 indicating that compression has been performed may be configured and transmitted to the new EHC header.

If the new EHC header of the received data indicates that the higher layer header is not compressed, the reception PDCP layer device considers a new EHC header of the received data as a full higher layer header (if the field values of one or more fields among the compressible fields are changed, the transmission PDCP layer device may transmit the full higher layer header without performing compression on the higher layer header so as to indicate the field values stored in the buffer of the reception PDCP layer device to be updated), and may update the field values stored in a buffer 2*j*-30 of the reception PDCP layer device with the field values of the received field values of the full higher layer header and transmit feedback indicting successful reception to the transmission PDCP layer device.

If the new EHC header of the received data indicates that the higher layer header is compressed, the reception PDCP layer device checks an identifier indicating the type of the higher layer header included in the new EHC header, and may reconstruct fields defined to be compressible in the higher layer header structure indicated by the identifier, based on field values stored in the reception buffer. For example, an identifier indicating the type of the higher layer header may indicate a first higher layer header structure (fields that can be compressed and decompressed in the first higher layer header structure), and may indicate a second higher layer header structure (fields that can be compressed and decompressed in the second higher layer header structure).

In the (2-2)th embodiment of the disclosure, each time the uncompressed full header is received, the reception PDCP layer device may always transmit feedback indicating successful reception of the full header to the transmission PDCP layer device. In the disclosure, each time the reception PDCP layer device receives the uncompressed full higher layer header, the reception PDCP layer device may always transmit feedback indicating successful reception of the uncompressed full higher layer header to the transmission PDCP layer device. However, upon receiving an uncompressed full higher layer header, the reception PDCP layer device always transmits feedback indicating successful reception of the uncompressed full higher layer to the transmission PDCP layer device, but does not transmit the feedback in the case of receiving an uncompressed higher layer header. The reception PDCP layer device performs different operations according to whether or not higher layer compression of the received data is performed.

In addition, in the (2-2)th embodiment, in order to apply different header compression and decompression methods to data streams having different higher layer header structures, the higher layer header field values are independently stored, for each higher layer header structure, in the buffer of the transmission PDCP layer device or the buffer of the reception PDCP layer device.

In the new EHC header, an identifier indicating each of a plurality of Ethernet header compression methods and an indicator field indicating whether compression is performed may be defined and used. The identifier may also indicate an Ethernet header type (type) or a QoS flow identifier. This is because a plurality of higher layer headers (for example, various types of Ethernet headers) having different header structures are configured of different fields, and a method for compressing or not compressing a certain field is differently applied according thereto. Thus, for example, a first identifier indicating a header type or content may indicate to apply a first Ethernet header compression method, and a second identifier may indicate to apply a second Ethernet header compression method. Therefore, if a plurality of data streams or QoS flows are mapped to one PDCP layer device, different header compression methods may be applied by applying the new identifier, and the reception terminal may distinguish the header compression methods and perform different decompression methods.

Upon receiving, from the reception PDCP layer device, feedback indicating that the full header is normally received, the transmission PDCP device may start to apply the Ethernet compression procedure. In the above description, a plurality of full headers may be transmitted. For example, a plurality of full headers and data (first data, second data and subsequent data) may be transmitted until feedback indicating successful reception of the full header is received from the reception PDCP layer device.

In the new header 2*g*-10, a new field (for example, a 1-bit indicator) may be defined to indicate whether the Ethernet header compression procedure is performed or not. The 1-bit indicator may directly indicate a case where the Ethernet header compression has not been performed, so as to enable the reception terminal not to perform processing of a new header and an uncompressed higher layer header. The 1-bit indicator may be defined to be located at the very front of a new EHC header that is always present if the Ethernet header compression algorithm is configured, so that the reception terminal may directly check whether or not the compression is performed. In addition, the 1-bit indicator indicating whether the Ethernet header compression procedure is performed or not may be defined and used in the SDAP header or PDCP header. If the 1-bit indicator is defined in the SDAP header or PDCP header, in a case where the Ethernet header compression procedure is not performed, the overhead can be reduced because a new header 2*g*-10 for Ethernet header compression can be omitted. In addition, the case where the bitmap field is configured to have all zeros (or one) values may be defined and used as a special value indicating an uncompressed full header, or may also indicate to initialize a buffer for compression of a transmission PDCP layer device and a buffer for decompression of a reception PDCP layer device.

In FIG. 2G, the PDCP layer device or the SDAP layer device in the reception terminal receives a compressed Ethernet frame 2*g*-25 from a lower layer device, and if the Ethernet header compression procedure is configured, the PDCP layer device or the SDAP layer device may identify respective field values of the Ethernet header of the Ethernet frame having the first received uncompressed full header and store the field values in a buffer for decompression of received Ethernet. Further, if a full header (e.g., SDAP header or Ethernet header) is successfully received, the PDCP layer device or the SDAP layer device in the reception terminal may transmit feedback relating thereto to the transmission PDCP layer device to start application of Ethernet header compression. The PDCP layer device or the SDAP layer device in the reception terminal may transmit the first Ethernet frame to a higher layer device without decompression of the Ethernet header. Then, if the next Ethernet frame is received, the next Ethernet frame is deciphered and the new EHC header is checked to see whether the header is compressed or uncompressed. If the new EHC header is not compressed, integrity verification thereof may be performed, the EHC header may be removed, and data may be transmitted to a higher layer. If the new EHC header indicates that the Ethernet header (or SDAP header) is compressed, the field value of the new header 2g-10 for Ethernet compression is checked to determine which fields are omitted (compressed) and which fields are not omitted (uncompressed). Further, the reception terminal may reconstruct values of fields, which are indicated to be omitted (compressed) in the above description, to field values stored in the reception buffer for decompression so as to reconstruct (decompress) the Ethernet header before compression thereof. Since values for the fields indicated as non-omitted (uncompressed) are new or changed values, the reception terminal may store the new or changed values as field values according to the field in the reception buffer for decompression. In addition, deciphering is performed and integrity protection is configured, integrity verification is performed. If there is no error, an Ethernet frame may be configured together with the reconstructed Ethernet header and transmitted to the higher layer device.

In the above description, if the field values of the Ethernet header are changed while the transmission PDCP layer device applies the Ethernet header compression method, the transmission PDCP layer device indicates to the new EHC header that the field values are not compressed and transmits a full header to initialize a buffer of the reception terminal and configure the buffer to have values of the full header again. Then, upon receiving the uncompressed full header, the reception PDCP layer device may transmit feedback indicating successful reception of the uncompressed full header to the transmission PDCP layer device. In the disclosure, each time the reception PDCP layer device receives the uncompressed full header, the reception PDCP layer device may always transmit feedback indicating successful reception of the uncompressed full higher layer header to the transmission PDCP layer device. Further, in the disclosure, upon receiving the uncompressed full higher layer header, the reception PDCP layer device may always transmit feedback indicating successful reception of the uncompressed full header to the transmission PDCP layer device. However, upon receiving an uncompressed higher layer header, the reception PDCP layer device may not transmit the feedback, and may perform different operations according to whether or not the received data is compressed at a higher layer.

The separate new EHC header may have a fixed size (e.g., 1 byte or 2 bytes).

In the above embodiment, the length field of the Ethernet header may also be compressed and decompressed by applying the method described above.

Alternatively, the length field of the Ethernet header may be transmitted without always performing compression thereof.

According to another method, the length field of the Ethernet header may be transmitted always without being compressed. After decompressing the remaining fields except the length field by the reception PDCP layer device, the PDCP layer device may calculate the length of the Ethernet frame by adding the length of the length field (because the length of the length field is known as a fixed value) thereto, and then reconstruct the length value and add the reconstructed length value to the length field of the Ethernet header. Therefore, the indication of the length field may be omitted in the new EHC header, the transmission PDCP layer device may always omit (compress) the length field even if the length field value is different for each data and perform transmission, and the reception PDCP layer device may calculate the length field value according to the description in the above, and may always reconstruct the length field value of the Ethernet header.

Further, in a case where an Ethernet header compression method and ROHC (for example, a TCP/IP header or UDP header compression method) are configured together for a bearer, the length field of the Ethernet header is transmitted always without being compressed, and the reception PDCP layer device may first apply the ROHC decompression method to the received data (for example, PDCP PDU or PDCP SDU), and then applies the Ethernet header decompression method thereto. This is because, in a case where the reception terminal (for example, the reception PDCP layer device) reconstructs the length field of the Ethernet header, if the length field is reconstructed to the length of data to which header compression is applied via ROHC, the length field in the higher layer device (for example, the Ethernet layer device) may be incorrectly reconstructed so that data may be truncated or an error may occur. Therefore, if the Ethernet header compression method and the ROHC header compression method are configured together, the reception PDCP layer device may first decompress the higher layer header by applying the ROHC header decompression method, and may decompress the Ethernet header by applying the Ethernet decompression method. In addition, upon reconstructing the length field value of the Ethernet header in the Ethernet header decompression procedure, the reception PDCP layer device may use a method for deriving and calculating the length field value by considering the size of the length field (for example, decompressing the remaining fields except for the length field), considering the length of the length field (because the length of the length field is known as a fixed value) or the size of the decompressed Ethernet header or the length of data (e.g., higher layer data or Ethernet frame) to which ROHC header decompression is applied, and then reconstructing the length value (for example, the length of data reconstructed by applying the ROHC header decompression) and adding the reconstructed length value to the length field of the Ethernet header. Therefore, the indication of the length field may be omitted in the new EHC header, and even if the length field value is different for each data, the transmission PDCP layer device may always perform transmission in a state of omitting (compressing) the length field, and the reception PDCP layer device may calculate the length field value according to the method described above so as to always reconstruct the length field value of the Ethernet header.

In addition, the new EHC header may define and use a field indicating a feedback request if the reception PDCP layer device successfully receives data. That is, instead of always transmitting feedback each time the reception PDCP layer device receives the full header, feedback transmission may occur only if the transmission PDCP layer device requests the feedback via the indicator, so as to reduce overhead.

Specific (2-3)th embodiment of the Ethernet header compression method proposed by the disclosure are as follows.

In the (2-3)th embodiment of the disclosure, the header compression and decompression method proposed in the (2-2)th embodiment may be applied in the same manner. However, if the base station maps only one data stream or QoS flow to one bearer or one PDCP layer device through an RRC message, it is not necessary to distinguish data streams or QoS flows having header structures of different higher layer devices. That is, the new EHC header does not need identifiers indicating different higher layer header structures or different higher layer compression methods. This is because one higher layer header structure or header compression method may be configured in one PDCP layer device.

Therefore, in the (2-3)th embodiment of the disclosure, only a field indicating whether a higher layer header is compressed or uncompressed is defined and configured in the new EHC header or the PDCP header and the method proposed in the (2-2)th embodiment is applied as it is, so that the transmission PDCP layer device may perform compression for a higher layer device header and the reception PDCP layer device may perform decompression therefor.

The disclosure proposes a specific structure of feedback that can be used in the embodiments of the compression method for the higher layer header (Ethernet header) described above.

Figure 2K:
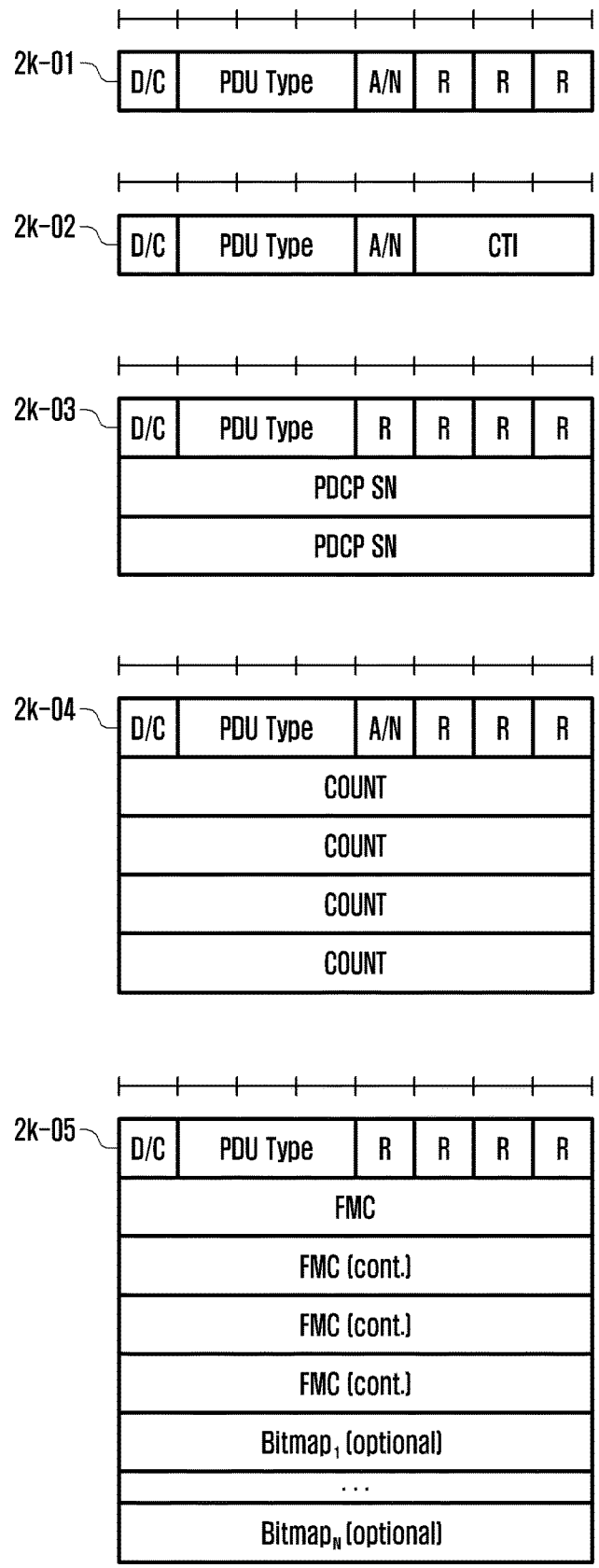
FIG. 2K illustrates embodiments of a feedback structure that can be used in a higher layer header compression method according to an embodiment of the disclosure.

FIG. 2K illustrates embodiments of a feedback structure that can be used in a higher layer header compression method according to an embodiment of the disclosure.

Referring to FIG. 2K, the embodiment proposes new PDCP control data (PDCP control PDU), which is defined by determining a new PDU type field value via a first feedback structure 2k-01. The new PDCP control data is triggered and configured each time the higher layer header of the received data is not compressed and a full higher layer header is received (or if a transmission PDCP layer device indicates feedback) in a case where a higher layer compression and decompression method (or protocol) is configured in a reception PDCP layer device, and transmitted to the transmission PDCP layer device. The new PDCP control data may define an indicator and indicate, through the indicator, that a full higher layer header transmitted without compression by the transmission PDCP layer device is successfully received or has failed to be received. According to another method, the new PDCP control data itself may indicate that the full higher layer header transmitted without compression by the transmission PDCP layer device has successfully been received. Through the above feedback, the transmission PDCP layer device may determine a time point of application of the compression method of the higher layer device.

The new PDCP control data may also be used to provide feedback to the transmission terminal Ethernet compression protocol if Ethernet decompression has failed (e.g., if a checksum error occurs). That is, the newly defined PDCP control data may indicate that Ethernet decompression has failed (or the checksum error has occurred), and may indicate that initialization of a transmission buffer for transmission terminal Ethernet header compression needs to be performed.

In FIG. 2K, the embodiment proposes new PDCP control data (PDCP control PDU), which is defined by determining a new PDU type field value via a second feedback structure 2k-02. The new PDCP control data is triggered and configured each time the higher layer header of the received data is not compressed and a full higher layer header is received (or if a transmission PDCP layer device indicates feedback) in a case where a higher layer compression and decompression method (or protocol) is configured in a reception PDCP layer device, and transmitted to the transmission PDCP layer device. The new PDCP control data may define an indicator and indicate, through the indicator, that a full higher layer header transmitted without compression by the transmission PDCP layer device is successfully received or has failed to be received. According to another method, the new PDCP control data itself may indicate that the full higher layer header transmitted without compression by the transmission PDCP layer device has successfully been received.

In addition, by defining and indicating a new field (CTI) indicating the type of the higher layer header or the type of the higher layer header compression method, with respect to a higher layer header or a higher layer header compression method, the new PDCP control data may define an indicator and indicate, through the indicator, that a full higher layer header transmitted without compression by the transmission PDCP layer device is successfully received or has failed to be received. According to another method, with respect to the higher layer header or higher layer header compression method indicated by the new CTI field, the new PDCP control data itself may indicate that the full higher layer header transmitted without compression by the transmission PDCP layer device has successfully been received.

Through the above feedback, the transmission PDCP layer device may determine a time point of application of the compression method of the higher layer device.

In addition, the new PDCP control data may also be used to provide feedback to the transmission terminal Ethernet compression protocol if Ethernet decompression has failed (e.g., if a checksum error occurs). That is, the newly defined PDCP control data may indicate that Ethernet decompression has failed (or the checksum error has occurred) with respect to a certain higher layer header or higher layer header compression method, and may indicate that initialization of a transmission buffer for transmission terminal Ethernet header compression needs to be performed.

In FIG. 2K, the embodiment proposes new PDCP control data (PDCP control PDU), which is defined by determining a new PDU type field value via a third feedback structure 2k-03. The new PDCP control data is triggered and configured each time the higher layer header of the received data is not compressed and a full higher layer header is received (or if a transmission PDCP layer device indicates feedback) in a case where a higher layer compression and decompression method (or protocol) is configured in a reception PDCP layer device, and transmitted to the transmission PDCP layer device. The new PDCP control data may define an indicator and indicate, through the indicator, that a full higher layer header transmitted without compression by the transmission PDCP layer device is successfully received or has failed to be received. According to another method, the new PDCP control data itself may indicate that the full higher layer header transmitted without compression by the transmission PDCP layer device has successfully been received.

In addition, a new field (PDCP SN) indicating a PDCP serial number is defined and indicated, and with respect to a certain PDCP serial number, the new PDCP control data may define an indicator and indicate, through the indicator, that a full higher layer header transmitted without compression by the transmission PDCP layer device is successfully received or has failed to be received. According to another method, with respect to data indicated by the new PDCP serial number field, the new PDCP control data itself may indicate that the full higher layer header transmitted without compression by the transmission PDCP layer device has successfully been received.

Through the above feedback, the transmission PDCP layer device may determine a time point of application of the compression method of the higher layer device.

In addition, the new PDCP control data may also be used to provide feedback to the transmission terminal Ethernet compression protocol if Ethernet decompression has failed (e.g., if a checksum error occurs). That is, the newly defined PDCP control data may indicate that Ethernet decompression has failed (or the checksum error has occurred) with respect to a certain PDCP serial number, and may indicate that initialization of a transmission buffer for transmission terminal Ethernet header compression needs to be performed.

In FIG. 2K, the embodiment proposes new PDCP control data (PDCP control PDU), which is defined by determining a new PDU type field value via a fourth feedback structure 2k-04. The new PDCP control data is triggered and configured each time the higher layer header of the received data is not compressed and a full higher layer header is received (or if a transmission PDCP layer device indicates feedback) in a case where a higher layer compression and decompression method (or protocol) is configured in a reception PDCP layer device, and transmitted to the transmission PDCP layer device. The new PDCP control data may define an indicator and indicate, through the indicator, that a full higher layer header transmitted without compression by the transmission PDCP layer device is successfully received or has failed to be received. According to another method, the new PDCP control data itself may indicate that the full higher layer header transmitted without compression by the transmission PDCP layer device has successfully been received.

In addition, a new field (PDCP SN) indicating a COUNT value is defined and indicated, and with respect to a certain COUNT value, the new PDCP control data may define an indicator and indicate, through the indicator, that a full higher layer header transmitted without compression by the transmission PDCP layer device is successfully received or has failed to be received. According to another method, with respect to data indicated by the new COUNT value field, the new PDCP control data itself may indicate that the full higher layer header transmitted without compression by the transmission PDCP layer device has successfully been received.

Through the above feedback, the transmission PDCP layer device may determine a time point of application of the compression method of the higher layer device.

In addition, the new PDCP control data may also be used to provide feedback to the transmission terminal Ethernet compression protocol if Ethernet decompression has failed (e.g., if a checksum error occurs). That is, the newly defined PDCP control data may indicate that Ethernet decompression has failed (or the checksum error has occurred) with respect to data of a certain COUNT value, and may indicate that initialization of a transmission buffer for transmission terminal Ethernet header compression needs to be performed.

In FIG. 2K, the embodiment proposes an aspect in which a PDCP status report among PDCP control data (PDCP control PDU) is used as a feedback, via a fifth feedback structure 2k-05. The PDCP status report is triggered and configured each time the higher layer header of the received data is not compressed and a full higher layer header is received (or if a transmission PDCP layer device indicates feedback) in a case where a higher layer compression and decompression method (or protocol) is configured in a reception PDCP layer device, and transmitted to the transmission PDCP layer device. The PDCP status report may define an indicator and indicate, through the indicator, that a full higher layer header transmitted without compression by the transmission PDCP layer device is successfully received or has failed to be received.

In addition, via the PDCP status report, the new PDCP control data itself may indicate that the full higher layer header transmitted without compression by the transmission PDCP layer device, with respect to a certain COUNT value, has successfully been received, an FMC field indicates a first COUNT value which is not transmitted yet from the reception PDCP layer device to a higher layer, and subsequent bitmap fields may indicate whether the value of "0" or '1" has been successfully received, by using one bit mapped to each of COUNT values greater than the first COUNT value.

In addition, the PDCP status report may also be used to provide feedback to the transmission terminal Ethernet compression protocol if Ethernet decompression failure occurs (e.g., if a checksum error occurs). That is, the newly defined PDCP control data may indicate that Ethernet decompression has failed (or the checksum error has occurred) with respect to data of a certain COUNT value, and may indicate that initialization of a transmission buffer for transmission terminal Ethernet header compression needs to be performed. That is, the FMC field indicates the first COUNT value that the reception PDCP layer device has not yet transmitted to the higher layer, and subsequent bitmap fields may indicate COUNT values greater than the first COUNT value, using one bit.

The disclosure proposes a sixth feedback structure by which a new field is defined in a new EHC header or a PDCP header of data transmitted to a transmission PDCP layer device by a reception PDCP layer device and used as a feedback. The new field of the PDCP header or the EHC header is configured each time the higher layer header of the received data is not compressed and a full higher layer header is received (or if a transmission PDCP layer device indicates feedback) in a case where a higher layer compression and decompression method (or protocol) is configured in a reception PDCP layer device, and transmitted to the transmission PDCP layer device. The new field may indicate that a full higher layer header transmitted without compression by the transmission PDCP layer device is successfully received or has failed to be received.

In a case where a reception terminal (for example, a reception PDCP layer device) indicates to the transmission terminal that a header decompression has failed or indicates that the reception terminal has not successfully received data (e.g., an Ethernet frame) having a full header (e.g., a full Ethernet header), using the first feedback structure, the second feedback structure, the third feedback structure, the fourth feedback structure, the fifth feedback structure, or the sixth feedback structure proposed in the disclosure, the transmission terminal (e.g., the transmission PDCP layer device) may transmit data including the full header to the reception terminal.

In the disclosure, a full header transmitted by the transmission terminal (for example, the transmission PDCP layer device) may indicate a header including uncompressed Ethernet header fields and values corresponding to the fields, and configuration information for compressing an Ethernet header, for example, an identifier for Ethernet header compression or mapping information for field compression between a field and an identifier (or an indicator) may be indicated.

In the disclosure, as a method for enabling a transmission terminal (for example, a transmission PDCP layer device) to start an Ethernet header compression procedure faster, the transmission PDCP layer device transmits a plurality of data having a full header to the reception terminal, and even without receiving feedback described in the above from the reception terminal (e.g., the reception PDCP layer device), the transmission PDCP layer device may apply and start the Ethernet header compression procedure to the next data and perform transmission. If an RLC layer device connected to the transmission PDCP layer device operates in an AM mode, data having the full header will not be lost, and even if the RLC layer device operates in an UM mode, packet duplication transmission technology is applied thereto and thus increases reliability. In the above description, if the transmission terminal transmits a plurality of data having a full header to the reception terminal, the number of data to be transmitted may be configured through an RRC message or may be appropriately configured in an implementation.

The disclosure proposes the operation of the transmission PDCP layer device and the operation of the reception PDCP layer device if the higher layer compression and decompression method (the Ethernet header compression method) or ROHC (the higher layer compression and decompression method such as TCP/IP or UDP) proposed by the disclosure is configured.

The operation of the transmission PDCP layer device of a UE or base station proposed by the disclosure is as follows.

The transmission PDCP layer device uses a first COUNT variable that maintains a COUNT value to be assigned to the next transmitted data upon processing data, and the first COUNT variable may be referred to as TX_NEXT.

The operation of the transmission PDCP layer device proposed by the disclosure is as follows.

The transmission PDCP layer device activates a PDCP data discard timer upon receiving data (e.g., PDCP SDU) from a higher layer and discards the data if the timer expires.

The transmission PDCP layer device allocates a COUNT value corresponding to TX_NEXT, with respect to data received from the higher layer. The TX_NEXT may be configured to be 0 as an initial value, and the TX_NEXT maintains a COUNT value for data to be transmitted next time (PDCP SDU).

If the header compression protocol (ROHC) is configured for the transmission PDCP layer device, header compression for the data may be performed.

If a higher layer header compression protocol (Ethernet header compression method, EthHC) is configured for the transmission PDCP layer device, If the data received from the higher layer is data received first after the Ethernet header compression method is configured, Alternatively, if even one of the field values of the compressible fields among the fields of the Ethernet header of the data received from the higher layer is different from the field values stored in the buffer of the transmission PDCP layer device (or different from the previously transmitted Ethernet header field values), Alternatively, if feedback indicating successful reception of data having the previously transmitted uncompressed full higher layer header (Ethernet header) is not received from the reception PDCP layer device, The transmission PDCP layer device does not perform the Ethernet header compression until feedback indicating successful reception of the uncompressed full higher layer header (Ethernet header) is received from the reception PDCP layer device.

If feedback indicating successful reception of data having the previously transmitted uncompressed full higher layer header (Ethernet header) is received from the reception PDCP layer device.

The transmission PDCP layer device may perform compression by applying the Ethernet header compression method to the data received from the higher layer.

If integrity protection is configured for the transmission PDCP layer device, a PDCP header may be generated, and integrity protection for the PDCP header and the data may be performed using a security key and a COUNT value of TX_NEXT assigned to the data.

A ciphering procedure for the data may be performed using the security key and the COUNT value of TX_NEXT assigned to the data. The COUNT value of the TX_NEXT variable configures, as PDCP serial numbers, as many lower LSBs as the length of the PDCP serial number.

In addition, the COUNT value of the TX_NEXT variable may be increased by 1, and the data processed above may be concatenated with the PDCP header and transmitted to a lower layer.

The operation of the reception PDCP layer device of a UE or a base station proposed by the disclosure is as follows.

The reception PDCP layer device may use the PDCP serial number length (for example, 12 bits or 18 bits) configured by a base station through RRC, may check the PDCP serial number of the received data (for example, PDCP PDU), and may drive a receiving window. In the above description, the reception window may be configured to be the size of half of the PDCP serial number space (for example, $2^{(PDCP\ SN\ length-1)}$), and may be used to distinguish valid data. That is, data received outside the reception window may be determined to be invalid data and discarded. The reason why the data arrives outside the reception window is that the data arrives very lately due to retransmission of the RLC layer device or HARQ retransmission of the MAC layer device in a lower layer device. In addition, the reception PDCP layer device may drive a PDCP reordering timer (t-Reordering) together with the receiving window.

The PDCP reordering timer is triggered if a PDCP serial number gap occurs based on the PDCP serial number in the reception PDCP layer device, and if data corresponding to the PDCP serial number gap does not arrive until the PDCP reordering timer expires, the data is transmitted to the higher layer device in an ascending order of PDCP serial number or COUNT value, and the receiving window is moved. Therefore, if data corresponding to the PDCP serial number gap arrives after the PDCP reordering timer expires, the data is not data in the reception window and thus is discarded.

The detailed procedure of the reception PDCP layer device briefly described in the above is as follows.

The reception PDCP layer device operation of a UE or a base station proposed by the disclosure is as follows.

The reception PDCP layer device may maintain and manage three COUNT variables upon processing the received data. The reception PDCP layer device may use a second COUNT variable that maintains a COUNT value of data (e.g., PDCP SDU) expected to be received next, upon processing the received data, and the second COUNT variable may be referred to as RX_NEXT. Further, the reception PDCP layer device uses a third COUNT variable that maintains a COUNT value of first data (for example, PDCP SDU) that is not transmitted to a higher layer, upon processing the received data, and the third COUNT The variable may be referred to as RX_DELIV. In addition, upon processing the received data, the reception PDCP layer device uses a fourth COUNT variable that maintains a COUNT value of data (e.g., PDCP SDU) by which a PDCP reordering timer (t-Reordering) is triggered, and the fourth COUNT variable may be referred to as RX_REORD. In addition, upon processing the received data, the reception PDCP layer device uses a fifth COUNT variable that maintains a COUNT value of the currently received data (e.g., PDCP SDU) and the fifth COUNT variable is referred to as RCVD_COUNT. In the above description, the PDCP reordering timer uses a timer value or interval, configured through an RRC message, in the higher layer (RRC layer) as shown in FIG. 2E, the timer is used for detection of the lost PDCP PDU, and only one timer may run at a time.

In addition, a UE may define and use the following variables in the operation of the reception PDCP layer device.

HFN: HFN indicates a Hyper Frame Number (HFN) part of a window state variable.
SN: SN indicates a sequence number (SN) part of the window state variable.
RCVD_SN: RCVD_SN indicates a PDCP serial number included in the header of the received PDCP PDU
RCVD_HFN: RCVD_HFN indicates HFN value of the received PDCP PDU, calculated by the reception PDCP layer device.

The operation of the reception PDCP layer device of a UE or a base station proposed by the disclosure is as follows.

If the PDCP PDU is received from the lower layer, the reception PDCP layer device may determine the COUNT value of the received PDCP PDU as follows.
  If the received RCVD_SN is RCVD_SN<=SN (RX_DELIV)−Window_Size,
  Update to RCVD_HFN=HFN (RX_DELIV)+1.
  Otherwise, if RCVD_SN is RCVD_SN>SN (RX_DELIV)+Window_Size,
  Update to RCVD_HFN=HFN (RX_DELIV)−1.
  If not,
  Update to RCVD_HFN=HFN (RX_DELIV).
  RCVD_COUNT is determined to be RCVD_COUNT= [RCVD_HFN, RCVD_SN].

After determining the COUNT value of the received PDCP PDU, the reception PDCP layer device may update the window state variables and process the PDCP PDU as follows.
  Decode the PDCP PDU using the RCVD_COUNT value and perform integrity verification.
  If integrity verification fails,
  Provide an indication of integrity verification failure to a higher layer and discard the received PDCP Data PDU (data part of PDCP PDU).
  If a PDCP PDU, which is in the state where RCVD_COUNT<RX_DELIV or has a value of RCVD_COUNT, has been previously received (the case of expired, out-of-date, out-of-window packets, or the case of duplicate packets)
  Discard the received PDCP Data PDU (data part of PDCP PDU).

If the received PDCP PDU is not discarded, the reception PDCP layer device operates as follows.
  The PDCP SDU processed above may be stored in the reception buffer.
  If RCVD_COUNT>=RX_NEXT
  Update RX_NEXT to RCVD_COUNT+1.
  If an out of order delivery indicator (outOfOrderDelivery) is configured (if out of order delivery operation is indicated),
  The PDCP SDU may be transmitted to a higher layer.
  If RCVD_COUNT is equal to RX_DELIV,
  If the header decompression procedure has not previously been applied (even if the Ethernet header compression protocol or ROHC is configured) (that is, data processing of the higher layer header has not been performed),
    If the Ethernet header compression protocol is configured and the Ethernet header is compressed (if an indicator of a new EHC header is checked and the indicator indicates that the Ethernet header is compressed),
      Decompression of the Ethernet header of the data may be performed.
    Otherwise, if the Ethernet header compression protocol is configured and the Ethernet header is not compressed (if an indicator of a new EHC header is checked and the indicator indicates that the Ethernet header is compressed),
      The Ethernet header of the data is regarded as an uncompressed header and decompression thereof is not performed.
      Since the uncompressed Ethernet header has been successfully received, feedback may be triggered to indicate the successful reception to the transmission PDCP layer device and the feedback may be transmitted to the transmission PDC layer device.
    Otherwise, if the Ethernet header compression protocol is not configured and ROHC is configured
      Decompression of the higher layer header (TCP/IP or UDP header, etc.) of the data may be performed.
  The data described above may be transmitted to a higher layer in the order of COUNT value.
    Beginning with COUNT=RX_DELIV value, all consecutive PDCP SDUs may be transmitted to a higher layer.
  Update the RX_DELIV value to the COUNT value of the first PDCP SDU, which has a COUNT value greater than or equal to the current RX_DELIV value and is not transmitted to the higher layer.
  If the t-Reordering timer is running and the RX_DELIV value is greater than or equal to RX_REORD,
  Stop and reset the t-Reordering timer.
  If the t-Reordering timer is not running (including a stopped case under the above conditions) and RX_DELIV is smaller than RX_NEXT,
  Update the RX_REORD value to RX_NEXT.
  Start the t-Reordering timer.

If the PDCP reordering timer (t-Reordering) has expired, the reception PDCP layer device operates as follows.
  If the header decompression procedure has not been applied before (even if Ethernet header compression protocol or ROHC is configured) (i.e., data processing of the higher layer header is not yet performed)
    If the Ethernet header compression protocol is configured, and the Ethernet header is compressed (if an indicator of a new EHC header is checked and the indicator indicates that the Ethernet header is compressed), Decompression of the Ethernet header of the data may be performed.

Otherwise, if the Ethernet header compression protocol is configured and the Ethernet header is not compressed (if an indicator of a new EHC header is checked and the indicator indicates that the Ethernet header is compressed), The Ethernet header of the data is regarded as an uncompressed header and decompression thereof is not performed.

Since the uncompressed Ethernet header has been successfully received, feedback may be triggered to indicate the successful reception thereof to the transmission PDCP layer device and the feedback may be transmitted to the transmission PDC layer device.

Otherwise, if the Ethernet header compression protocol is not configured and ROHC is configured Decompression of the higher layer header (TCP/IP or UDP header, etc.) of the data may be performed.

The data described above is transmitted to the higher layer in the order of COUNT value.

All PDCP SDUs having COUNT values less than the RX_REORD value may be transmitted.

Beginning with the value COUNT=RX_REORD, all consecutive PDCP SDUs may be transmitted to the higher layer.

Update the RX_DELIV value to the COUNT value of the first PDCP SDU, which has a COUNT value greater than or equal to the current RX_REORD value and is not transmitted to the higher layer.

If the RX_DELIV value is smaller than the value of RX_NEXT,

Update the RX_REORD value to the RX_NEXT value.

Start the t-Reordering timer.

In the following, the disclosure proposes as aspect in which a PDCP layer device performs ciphering and deciphering if an SDAP layer device or an SDAP header is configured, an Ethernet header compression protocol (or method) is configured, and an ROHC protocol is configured.

Figure 2L:
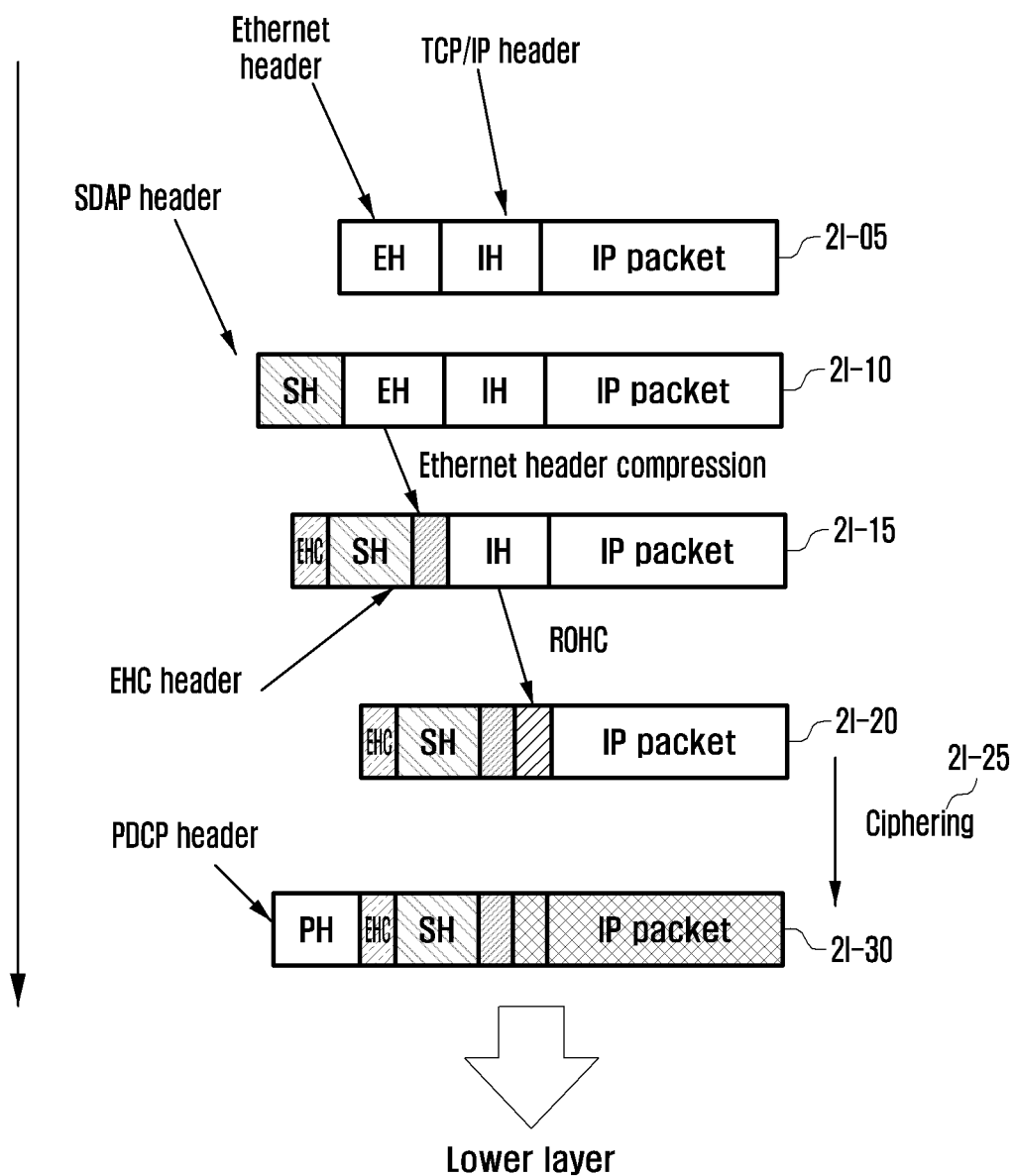
FIG. 2L illustrates a (2-1)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

FIG. 2L illustrates a (2-1)th embodiment in which a PDCP layer device efficiently performs ciphering and deciphering if an SDAP layer device or an SDAP header is configured, an Ethernet header compression protocol (or method) is configured, and an ROHC protocol is configured according to an embodiment of the disclosure.

In the (2-1)th embodiment, upon receiving the Ethernet frame from the higher layer (2*l*-05), the transmission SDAP layer device may configure an SDAP header and transmit the SDAP header to the lower transmission PDCP layer device (indicated by reference numeral 2*l*-10). Further, the transmission PDCP layer device may perform an Ethernet header compression procedure for the Ethernet header of a higher layer device, except for the SDAP header, and may generate a separate new EHC header. The header compression may be performed for the higher layer device header, such as TCP/IP or UDP of the higher layer device, using the ROHC protocol (indicated by reference numerals 2*l*-15 and 2*l*-20).

For the convenience of implementation, compression of the Ethernet header, which is located at the front, may start first and then ROHC compression may be performed.

According to another method, since a separate compression method is applied to different higher layer headers, parallel processing may be performed on the Ethernet header compression procedure and the ROHC header compression procedure in order to accelerate data processing of a UE.

According to another method, since the ROHC protocol is an algorithm that is already implemented, and is already implemented as part of the PDCP data processing procedure, ROHC compression may be first performed and Ethernet header compression may be performed later.

Since the EHC header is separately generated by the PDCP layer device, the transmission PDCP layer device may configure the EHC header before the SDAP header received from the higher layer.

In the (2-1)th embodiment in which efficient ciphering is performed, since a UE is configured to cipher only the ROHC compression header and data which are already compressed, an EHC header, an SDAP header, and a compressed Ethernet header, which are newly generated for convenience of implementation, may not be ciphered (indicated by reference numerals 2*l*-25 and 2*l*-30). In addition, in UE implementation, the implementation complexity may be reduced by configuring all together the PDCP header, EHC header, the SDAP header, and the compressed Ethernet header at the very front of the ciphered data at the last time after completing the ciphering procedure.

In addition, the ciphering procedure is completed and a PDCP header is generated, and the generated PDCP header is configured before the new EHC header and transmitted to a lower layer.

In the (2-1)th embodiment in which the efficient ciphering is performed, upon receiving data from a lower layer device, the reception PDCP layer device may process the non-ciphered EHC header, the SDAP header, and the compressed Ethernet header, perform the Ethernet decompression, perform deciphering of the remaining ROHC compression header and data, and perform the ROHC decompression procedure thereof.

For the convenience of implementation, decompression for the Ethernet header located at the front may be started and ROHC decompression may be performed.

According to another method, since a separate decompression method is applied to different higher layer headers, the Ethernet header decompression procedure and the ROHC header decompression procedure may be performed in parallel in order to accelerate data processing of a UE.

According to another method, since the ROHC protocol is an algorithm that is already implemented, and is already implemented as part of the PDCP data processing procedure, ROHC decompression may be first performed and Ethernet header decompression may be performed later. In addition, if the reception PDCP layer device attempts to reconstruct the length field value by calculating and deriving the Ethernet frame size with respect to the length field of the Ethernet header field, it is necessary to perform ROHC decompression first so as to accurately calculate the total Ethernet frame size. Therefore, the ROHC decompression procedure needs to be performed first, and followed by the Ethernet decompression procedure.

Figure 2M:
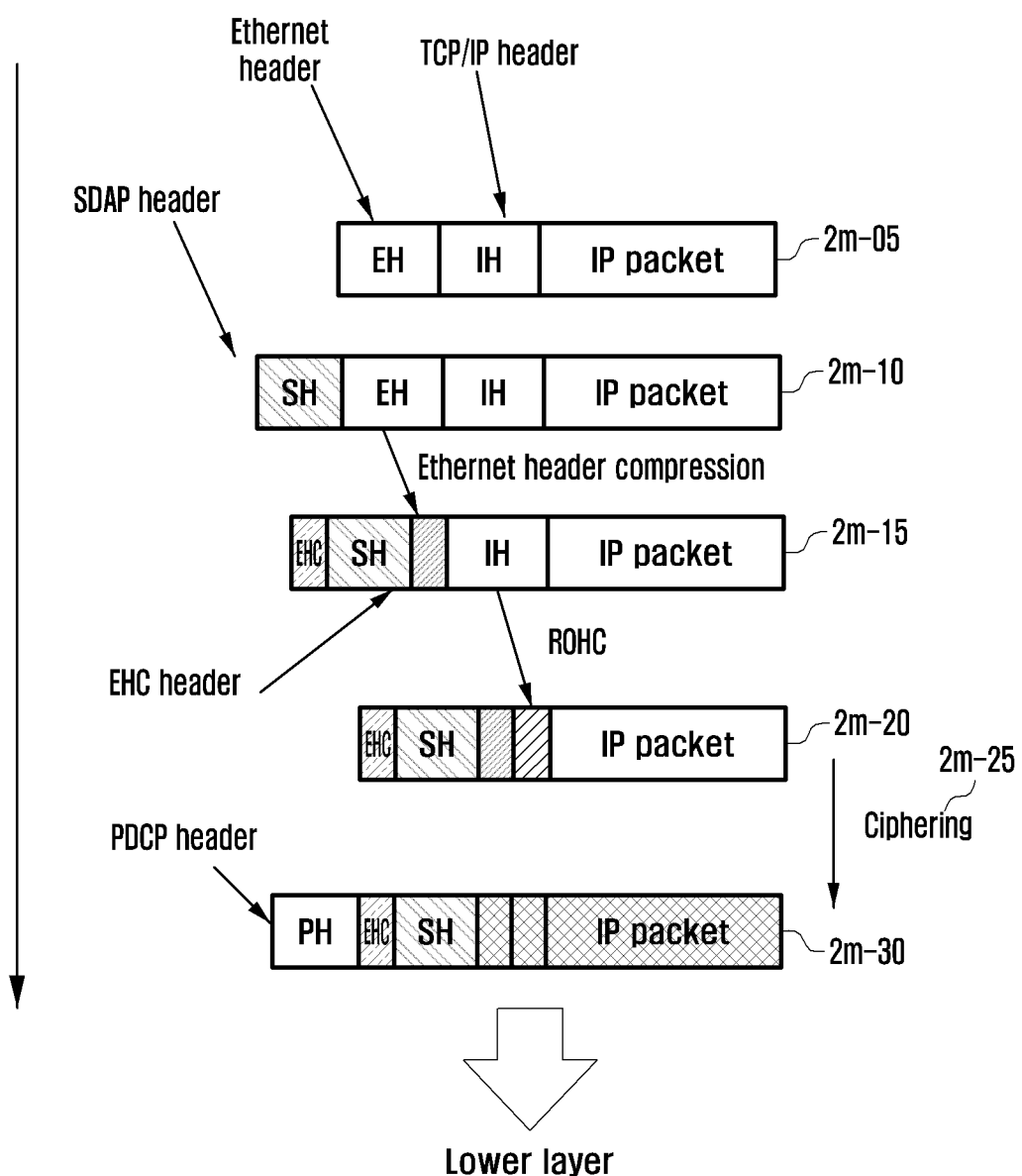
FIG. 2M illustrates a (2-2)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

FIG. 2M illustrates a (2-2)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

In the (2-2)th embodiment, upon receiving the Ethernet frame from a higher layer (indicated by reference numeral 2*m*-05), the transmission SDAP layer device may configure the SDAP header and transmit the SDAP header to a lower transmission PDCP layer device (indicated by reference numeral 2m-10). In addition, the transmission PDCP layer device may perform an Ethernet header compression procedure for the Ethernet header of a higher layer device, except for the SDAP header, and may generate a separate new EHC header. The header compression for a higher layer device header, such as TCP/IP or UDP of the higher layer device, may be performed using the ROHC protocol (indicated by reference numerals 2m-15 and 2m-20).

For the convenience of implementation, compression of the Ethernet header, which is located at the front, may start first and then ROHC compression may be performed.

According to another method, since a separate compression method is applied to different higher layer headers, parallel processing may be performed on the Ethernet header compression procedure and the ROHC header compression procedure in order to accelerate data processing of a UE.

According to another method, since the ROHC protocol is an algorithm that is already implemented, and is already implemented as part of the PDCP data processing procedure, ROHC compression may be first performed and Ethernet header compression may be performed later.

Since the EHC header is separately generated by the PDCP layer device, the transmission PDCP layer device may configure the EHC header before the SDAP header received from the higher layer.

In the (2-2)th embodiment in which efficient ciphering is performed, in order to enhance security, a UE may perform ciphering of the compressed Ethernet header, the compressed ROHC compression header, and data, and may not perform ciphering of a newly generated EHC header and an SDAP header (indicated by reference numerals 2m-25 and 2m-30). In addition, in UE implementation, by configuring all together the PDCP header, the EHC header, and the SDAP header at the very front of the ciphered data at the last time after completing the ciphering procedure, the implementation complexity may be reduced.

In addition, the ciphering procedure is completed and a PDCP header is generated, and the generated PDCP header is configured before the new EHC header and transmitted to a lower layer.

In the (2-2)th embodiment in which the efficient ciphering is performed, upon receiving data from a lower layer device, the reception PDCP layer device may process the non-ciphered EHC header and the SDAP header, may perform deciphering of the remaining compressed Ethernet header, the ROHC compression header, and data, and may perform the Ethernet decompression and the ROHC decompression procedure thereof.

For the convenience of implementation, decompression of the Ethernet header located at the front may start first and the ROHC decompression may be performed later.

According to another method, since a separate decompression method is applied to different higher layer headers, the Ethernet header decompression procedure and the ROHC header decompression procedure may be performed in parallel in order to accelerate data processing of a UE.

According to another method, since the ROHC protocol is an algorithm that is already implemented, and is already implemented as part of the PDCP data processing procedure, ROHC decompression may be first performed and Ethernet header decompression may be performed later. In addition, if the reception PDCP layer device attempts to reconstruct the length field value by calculating and deriving the Ethernet frame size with respect to the length field of the Ethernet header field, it is necessary to perform ROHC decompression first so as to accurately calculate the total Ethernet frame size. Therefore, the ROHC decompression procedure needs to be performed first, and followed by the Ethernet decompression procedure.

In addition, in a case where an Ethernet header compression method and ROHC (for example, a TCP/IP header or UDP header compression method) are configured together for a bearer, the length field of the Ethernet header is transmitted always without being compressed, the reception PDCP layer device may first apply the ROHC decompression method to the received data (for example, PDCP PDU or PDCP SDU), and then applies the Ethernet header decompression method thereto. If the length field is reconstructed to the length of data to which header compression is applied via ROHC in a case where the reception terminal (for example, the reception PDCP layer device) reconstructs the length field of the Ethernet header, the length field in the higher layer device (for example, the Ethernet layer device) may be incorrectly reconstructed and data may be truncated or an error may occur. Therefore, if the Ethernet header compression method and the ROHC header compression method are configured together, the reception PDCP layer device may first decompress the higher layer header by applying the ROHC header decompression method, and may decompress the Ethernet header by applying the Ethernet decompression method. In addition, upon reconstructing the length field value of the Ethernet header in the Ethernet header decompression procedure, the reception PDCP layer device may use a method for deriving and calculating the length field value by considering the size of the length field (for example, decompressing the remaining fields except for the length field), considering the length of the length field (because the length of the length field is known as a fixed value) or the size of the decompressed Ethernet header or the length of data (e.g., higher layer data or Ethernet frame) to which ROHC header decompression is applied, and then reconstructing the length value (for example, the length of data reconstructed by applying the ROHC header decompression) and adding the reconstructed length value to the length field of the Ethernet header. Therefore, the indication of the length field may be omitted in the new EHC header, and even if the length field value is different for each data, the transmission PDCP layer device may always performs transmission in a state of omitting (compressing) the length field, and the reception PDCP layer device may calculate the length field value according to the method described above so as to always reconstruct the length field value of the Ethernet header.

Figure 2N:
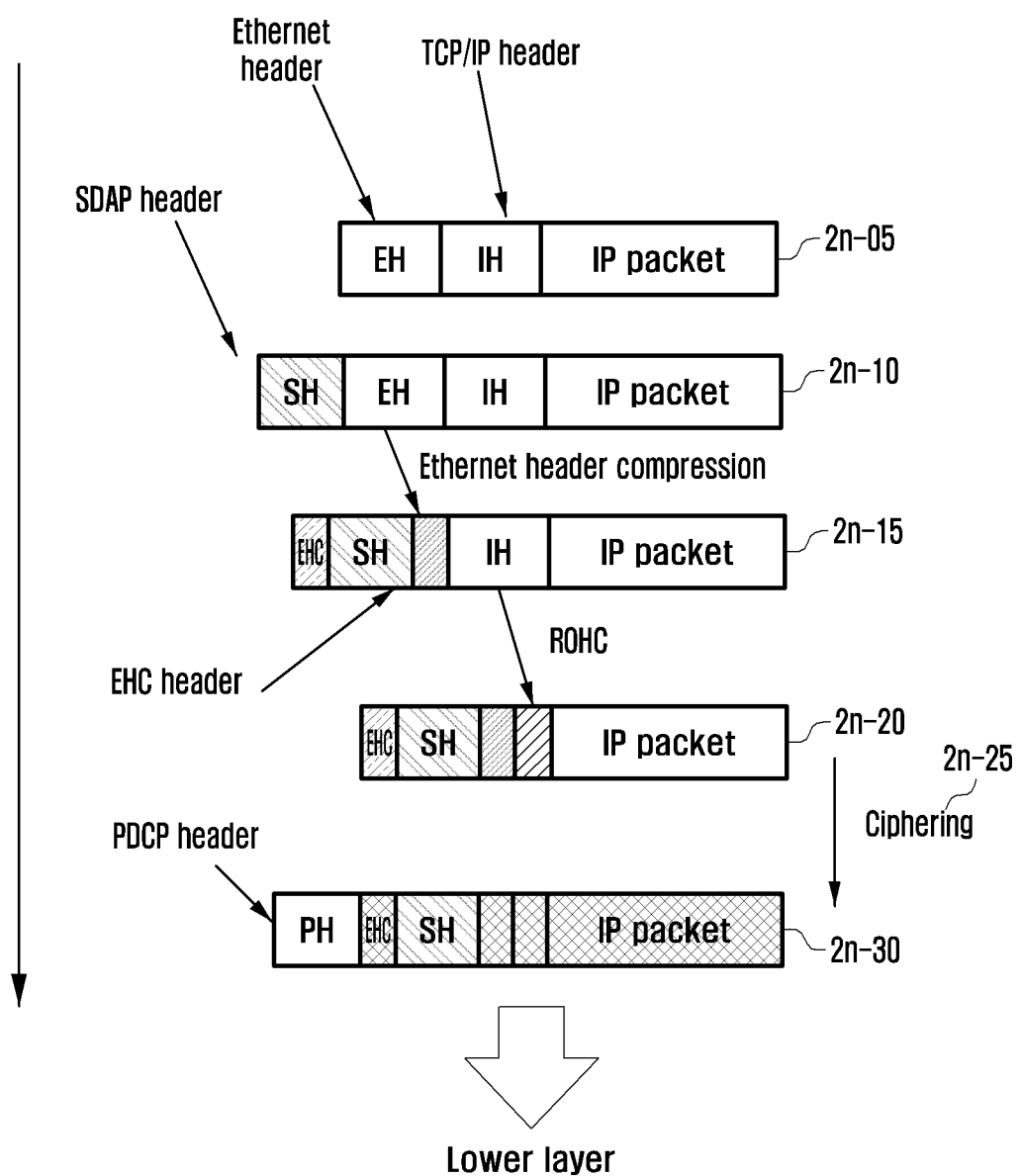
FIG. 2N illustrates a (2-3)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.
Figure 20:
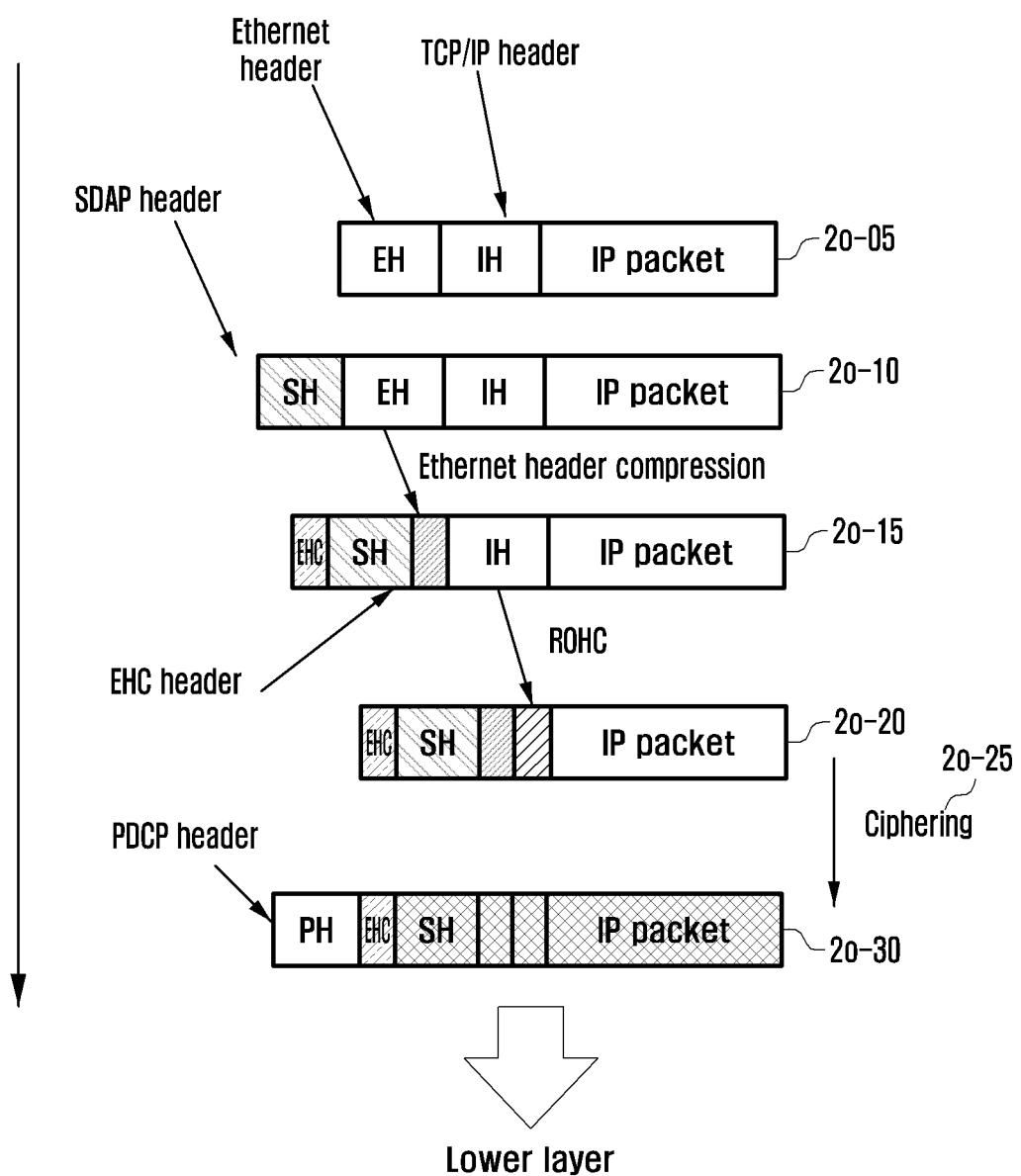

FIG. 2N illustrates a (2-3)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

In the (2-3)th embodiment, upon receiving the Ethernet frame from a higher layer (indicated by reference numeral 2n-05), the transmission SDAP layer device may configure the SDAP header and transmit the SDAP header to a lower transmission PDCP layer device (indicated by reference numeral 2n-10). The transmission PDCP layer device may perform an Ethernet header compression procedure for the Ethernet header of a higher layer device, except for the SDAP header, and may generate a separate new EHC header. The header compression for a higher layer device header, such as TCP/IP or UDP of the higher layer device, is performed using the ROHC protocol (indicated by reference numerals 2n-15 and 2n-20).

For the convenience of implementation, compression of the Ethernet header, which is located at the front, may start first and then ROHC compression may be performed.

According to another method, since a separate compression method is applied to different higher layer headers, parallel processing may be performed on the Ethernet header compression procedure and the ROHC header compression procedure in order to accelerate data processing of a UE.

According to another method, since the ROHC protocol is an algorithm that is already implemented, and is already implemented as part of the PDCP data processing procedure, ROHC compression may be first performed and Ethernet header compression may be performed later.

Since the EHC header is separately generated by the PDCP layer device, the transmission PDCP layer device may configure the EHC header before the SDAP header received from the higher layer.

In the (2-3)th embodiment in which efficient ciphering is performed, in order to enhance security and in order to enhance the security between the transmission PDCP layer device and the reception PDCP layer device by applying the principle of capable of performing ciphering of the data processed by the PDCP layer device, a UE may perform ciphering of a newly generated EHC header, a compressed Ethernet header, a compressed ROHC compressed header, and data, and may not perform ciphering of an SDAP header (indicated by reference numerals 2n-25 and 2n-30).

In addition, the ciphering procedure is completed and a PDCP header is generated, and the generated PDCP header is configured before the new EHC header and transmitted to a lower layer.

In the (2-3)th embodiment in which the efficient ciphering is performed, upon receiving data from a lower layer device, the reception PDCP layer device may process the non-ciphered SDAP header, may perform deciphering of the remaining EHC headers, the compressed Ethernet header, the ROHC compression header, and data, and may perform the Ethernet decompression and the ROHC decompression procedure thereof.

For the convenience of implementation, decompression of the Ethernet header located at the front may start first and then the ROHC decompression may be performed.

According to another method, since a separate decompression method is applied to different higher layer headers, the Ethernet header decompression procedure and the ROHC header decompression procedure may be performed in parallel in order to accelerate data processing of a UE.

According to another method, since the ROHC protocol is an algorithm that is already implemented, and is already implemented as part of the PDCP data processing procedure, ROHC decompression may be first performed and Ethernet header decompression may be performed later. In addition, if the reception PDCP layer device attempts to reconstruct the length field value by calculating and deriving the Ethernet frame size with respect to the length field of the Ethernet header field, it is necessary to perform ROHC decompression first so as to accurately calculate the total Ethernet frame size. Therefore, the ROHC decompression procedure needs to be performed first, and followed by the Ethernet decompression procedure.

FIG. 2O illustrates a (2-4)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

In the (2-4)th embodiment, upon receiving the Ethernet frame from a higher layer (indicated by reference numeral 2o-05), the transmission SDAP layer device may configure the SDAP header and transmit the SDAP header to a lower transmission PDCP layer device (indicated by reference numeral 2o-10). In addition, the transmission PDCP layer device may perform an Ethernet header compression procedure for the Ethernet header of a higher layer device, except for the SDAP header, and may generate a separate new EHC header. The header compression for a higher layer device header, such as TCP/IP or UDP of the higher layer device, may be performed using the ROHC protocol (indicated by reference numerals 2o-15 and 2o-20).

For the convenience of implementation, compression of the Ethernet header, which is located at the front, may start first and then ROHC compression may be performed.

According to another method, since a separate compression method is applied to different higher layer headers, parallel processing may be performed on the Ethernet header compression procedure and the ROHC header compression procedure in order to accelerate data processing of a UE.

According to another method, since the ROHC protocol is an algorithm that is already implemented, and is already implemented as part of the PDCP data processing procedure, ROHC compression may be first performed and Ethernet header compression may be performed later.

Since the EHC header is separately generated by the PDCP layer device, the transmission PDCP layer device may configure the EHC header before the SDAP header received from the higher layer.

In the (2-4)th embodiment in which efficient ciphering is performed, in order to enhance security, a UE may perform ciphering of the SDAP header, the compressed Ethernet header, the compressed ROHC compressed header, and data, and may not perform ciphering of a newly generated EHC header (indicated by reference numerals 2o-25 and 2o-30). In addition, in UE implementation, by configuring all together the PDCP header and the EHC header at the very front of the ciphered data at the last time after completing the ciphering procedure, the implementation complexity may be reduced.

In addition, the ciphering procedure is completed and a PDCP header is generated, and the generated PDCP header is configured before the new EHC header and transmitted to a lower layer.

In the (2-4)th embodiment in which the efficient ciphering is performed, upon receiving data from a lower layer device, the reception PDCP layer device may process a non-ciphered EHC header, may perform deciphering of the remaining SDAP header, the compressed Ethernet header, the ROHC compression header, and data, and may perform the Ethernet decompression and the ROHC decompression procedure thereof.

For the convenience of implementation, decompression of the Ethernet header located at the front may start first and then the ROHC decompression may be performed.

According to another method, since a separate decompression method is applied to different higher layer headers, the Ethernet header decompression procedure and the ROHC header decompression procedure may be performed in parallel in order to accelerate data processing of a UE.

According to another method, since the ROHC protocol is an algorithm that is already implemented, and is already implemented as part of the PDCP data processing procedure, ROHC decompression may be first performed and Ethernet header decompression may be performed later. In addition, if the reception PDCP layer device attempts to reconstruct the length field value by calculating and deriving the Ethernet frame size with respect to the length field of the Ethernet header field, it is necessary to perform ROHC decompression first so as to accurately calculate the total Ethernet frame size. Therefore, the ROHC decompression procedure needs to be performed first, and followed by the Ethernet decompression procedure.

Figure 2P:
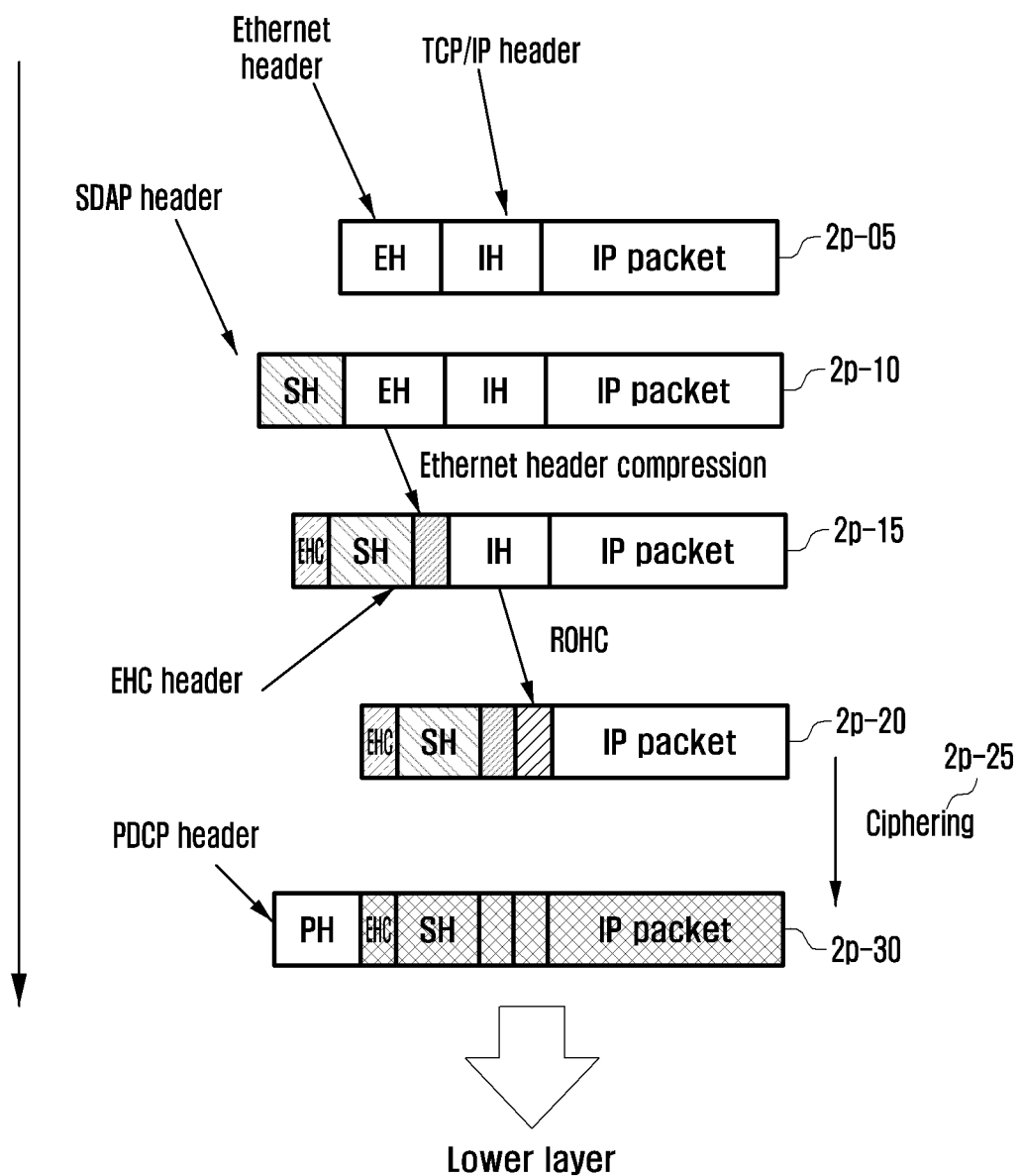
FIG. 2P illustrates a (2-5)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

FIG. 2P illustrates a (2-5)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

In the (2-5)th embodiment, upon receiving the Ethernet frame from a higher layer (indicated by reference numeral 2p-05), the transmission SDAP layer device may configure an SDAP header and transmit the SDAP header to a lower transmission PDCP layer device (indicated by reference numeral 2p-10). The transmission PDCP layer device may perform an Ethernet header compression procedure for the Ethernet header of a higher layer device, except for the SDAP header, and generate a separate new EHC header. The header compression for a higher layer device header, such as TCP/IP or UDP of the higher layer device, may be performed using the ROHC protocol (indicated by reference numerals 2p-15 and 2p-20).

For the convenience of implementation, compression of the Ethernet header, which is located at the front, may start first and then ROHC compression may be performed.

According to another method, since a separate compression method is applied to different higher layer headers, parallel processing may be performed on the Ethernet header compression procedure and the ROHC header compression procedure in order to accelerate data processing of a UE.

According to another method, since the ROHC protocol is an algorithm that is already implemented, and is already implemented as part of the PDCP data processing procedure, ROHC compression may be first performed and Ethernet header compression may be performed later.

Since the EHC header is separately generated by the PDCP layer device, the transmission PDCP layer device may configure the EHC header before the SDAP header received from the higher layer.

In the (2-5)th embodiment in which efficient ciphering is performed, in order to enhance security, a UE may perform ciphering of the newly generated EHC header, the SDAP header, the compressed Ethernet header, the compressed ROHC compressed header, and data (indicated by reference numerals 2p-25 and 2p-30).

In addition, the ciphering procedure is completed and a PDCP header is generated, and the generated PDCP header is configured before the new EHC header and transmitted to a lower layer.

In the (2-5)th embodiment in which the efficient ciphering is performed, upon receiving data from a lower layer device, the reception PDCP layer device may process a non-ciphered PDCP header, may perform deciphering of the remaining EHC headers, the SDAP header, the compressed Ethernet header, the ROHC compression header, and data, and may perform the Ethernet decompression and the ROHC decompression procedure thereof.

For the convenience of implementation, decompression of the Ethernet header located at the front may start first and then the ROHC decompression may be performed.

According to another method, since a separate decompression method is applied to different higher layer headers, the Ethernet header decompression procedure and the ROHC header decompression procedure may be performed in parallel in order to accelerate data processing of a UE.

According to another method, since the ROHC protocol is an algorithm that is already implemented, and is already implemented as part of the PDCP data processing procedure, ROHC decompression may be first performed and Ethernet header decompression may be performed later. In addition, if the reception PDCP layer device attempts to reconstruct the length field value by calculating and deriving the Ethernet frame size with respect to the length field of the Ethernet header field, it is necessary to perform ROHC decompression first so as to accurately calculate the total Ethernet frame size. Therefore, the ROHC decompression procedure needs to be performed first, and followed by the Ethernet decompression procedure.

Figure 2Q:
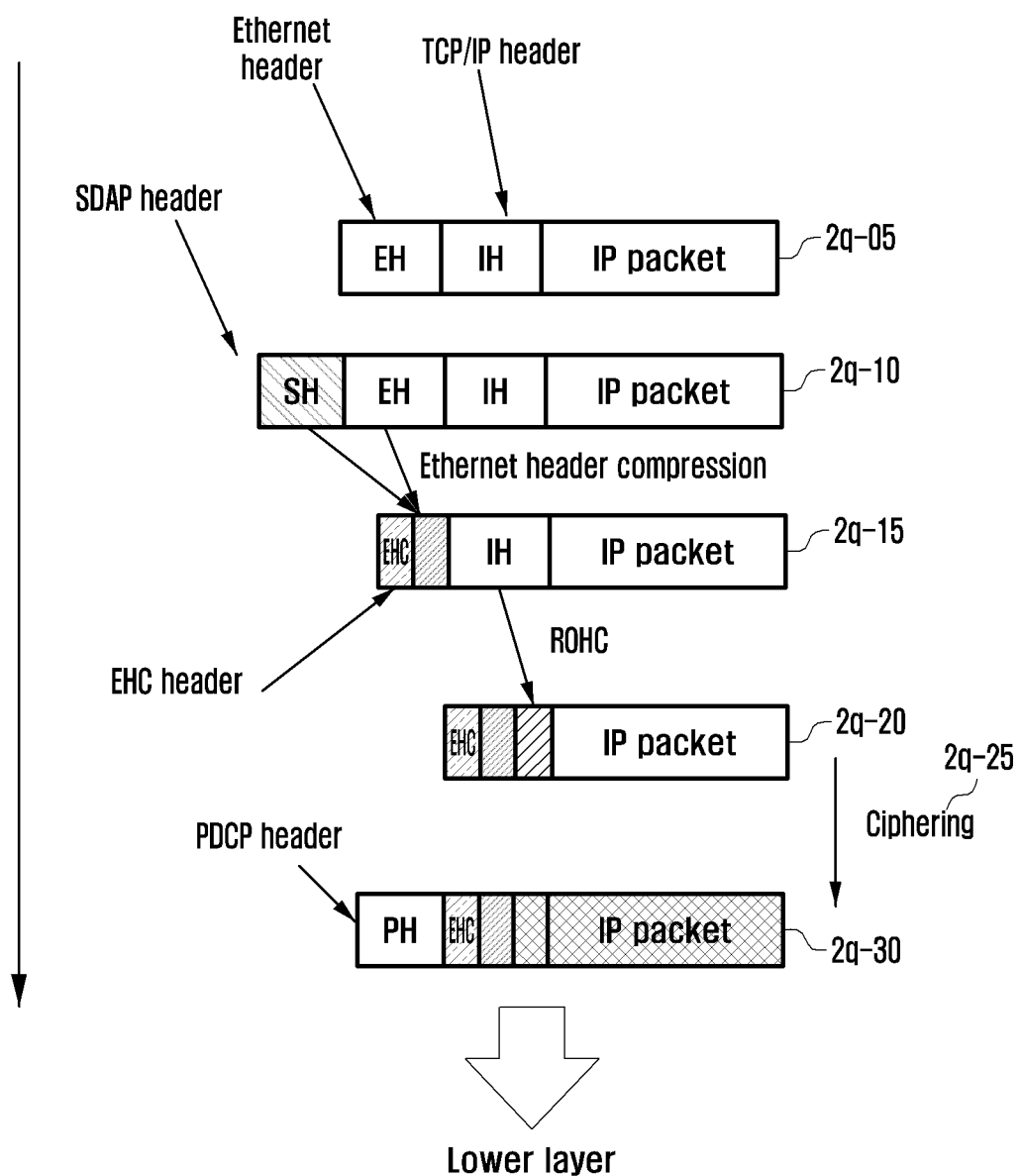
FIG. 2Q illustrates a (2-6)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

FIG. 2Q illustrates a (2-6)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

In the (2-6)th embodiment, upon receiving the Ethernet frame from a higher layer (indicated by reference numeral 2q-05), the transmission SDAP layer device may configure the SDAP header and transmit the SDAP header to a lower transmission PDCP layer device (indicated by reference numeral 2q-10). The transmission PDCP layer device may perform an Ethernet header compression procedure for the Ethernet header of a higher layer device, except for the SDAP header, and may generate a separate new EHC header. The header compression for a higher layer device header, such as TCP/IP or UDP of the higher layer device, may be performed using the ROHC protocol (indicated by reference numerals 2q-15 and 2q-20).

For the convenience of implementation, compression of the Ethernet header, which is located at the front, may start first and then ROHC compression may be performed.

According to another method, since a separate compression method is applied to different higher layer headers, parallel processing may be performed on the Ethernet header compression procedure and the ROHC header compression procedure in order to accelerate data processing of a UE.

According to another method, since the ROHC protocol is an algorithm that is already implemented, and is already implemented as part of the PDCP data processing procedure, ROHC compression may be first performed and Ethernet header compression may be performed later.

Since the EHC header is separately generated by the PDCP layer device, the transmission PDCP layer device may configure the EHC header before the SDAP header received from the higher layer.

In the (2-6)th embodiment in which efficient ciphering is performed, in order to increase a compression rate, a UE may be characterized by applying an Ethernet header compression procedure to the SDAP header as well as the Ethernet header to perform compression. In addition, the ciphering process may not be applied to the EHC header and the compressed SDAP/Ethernet header, and the ciphering process may be performed on the compressed ROHC compression header and data (indicated by reference numerals 2q-25 and 2q-30). In addition, in UE implementation, by configuring all together the PDCP header, the EHC header, and the compressed SDAP/Ethernet header at the very front of the ciphered data at the last time after completing the ciphering procedure, the implementation complexity may be reduced. In addition, since the existing UE is implemented to cipher only the ROHC compression header and data, implementation complexity can be reduced.

In addition, the ciphering procedure is completed and a PDCP header is generated, and the generated PDCP header is configured before the new EHC header and transmitted to a lower layer.

In the (2-6)th embodiment in which the efficient ciphering is performed, upon receiving data from a lower layer device, the reception PDCP layer device may process the non-ciphered EHC header, may decompress the compressed SDAP/Ethernet header, may perform deciphering of the remaining ROHC compression headers and data, and may perform the Ethernet decompression and the ROHC decompression procedure.

For the convenience of implementation, decompression of the Ethernet header located at the front may start first and then the ROHC decompression may be performed.

According to another method, since a separate decompression method is applied to different higher layer headers, the Ethernet header decompression procedure and the ROHC header decompression procedure may be performed in parallel in order to accelerate data processing of a UE.

According to another method, since the ROHC protocol is an algorithm that is already implemented, and is already implemented as part of the PDCP data processing procedure, ROHC decompression may be first performed and Ethernet header decompression may be performed later. In addition, if the reception PDCP layer device attempts to reconstruct the length field value by calculating and deriving the Ethernet frame size with respect to the length field of the Ethernet header field, it is necessary to perform ROHC decompression first so as to accurately calculate the total Ethernet frame size. Therefore, the ROHC decompression procedure needs to be performed first, and followed by the Ethernet decompression procedure.

Figure 2R:
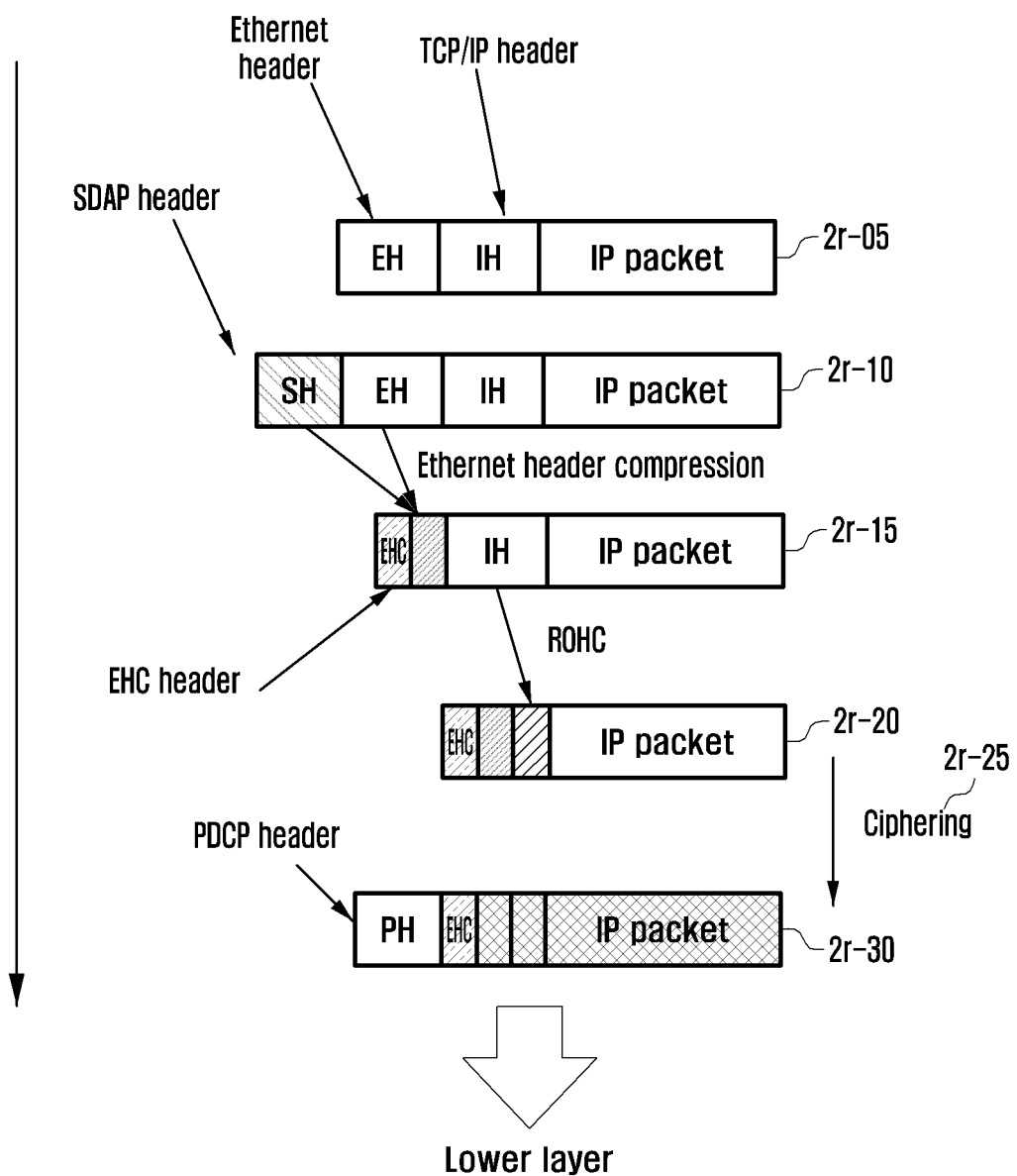
FIG. 2R illustrates a (2-7)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

FIG. 2R illustrates a (2-7)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

In the (2-7)th embodiment, the ciphering method of the (2-6)th embodiment may be applied, and in order to enhance security, the compressed SDAP/Ethernet header may also be ciphered and deciphered.

Figure 2S:
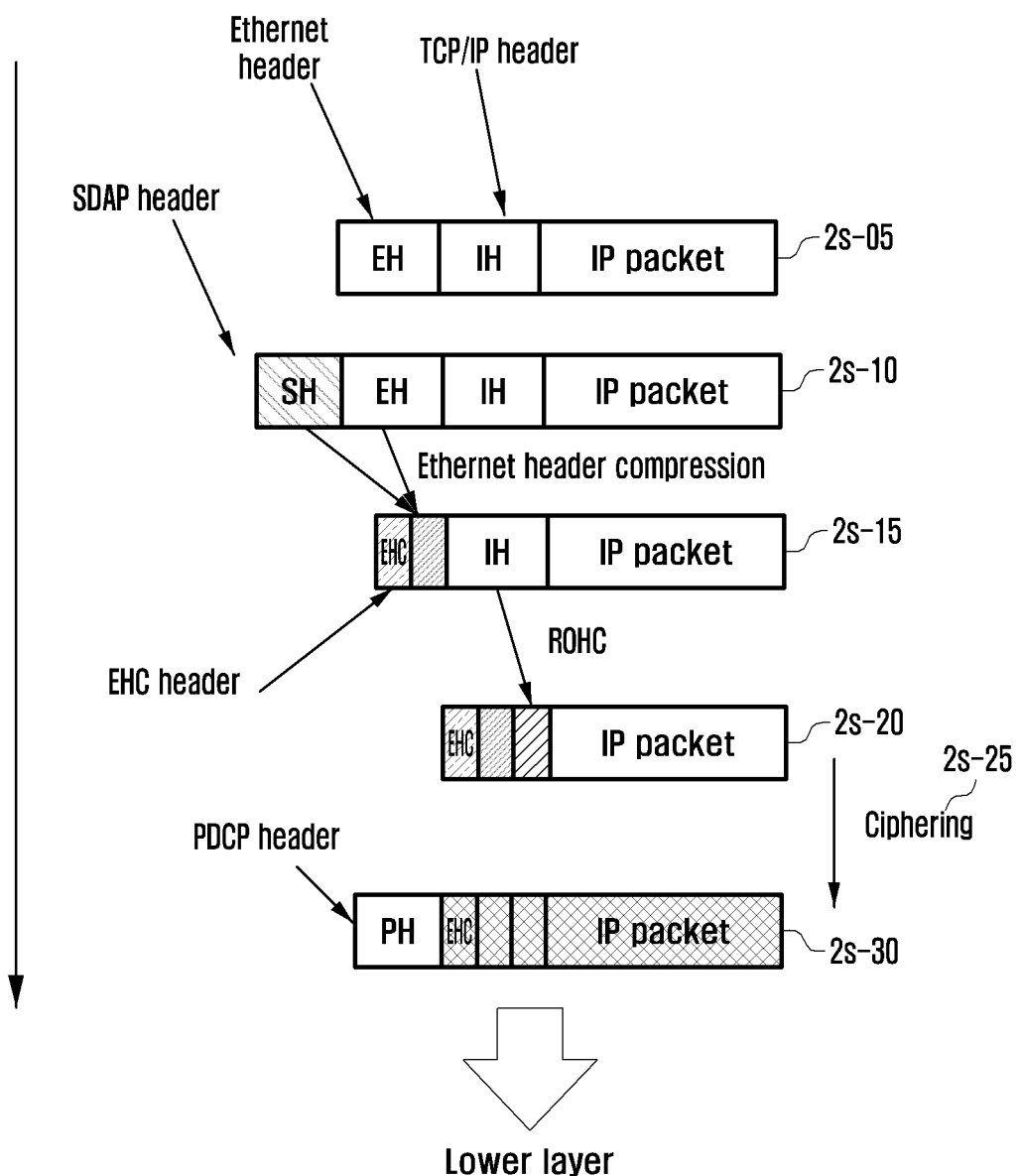
FIG. 2S illustrates a (2-8)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

FIG. 2S illustrates a (2-8)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

In the (2-8)th embodiment, the ciphering method of the (2-6)th embodiment may be applied, and in order to enhance security, the compressed SDAP/Ethernet header and the EHC header may also be ciphered and deciphered.

Figure 2T:
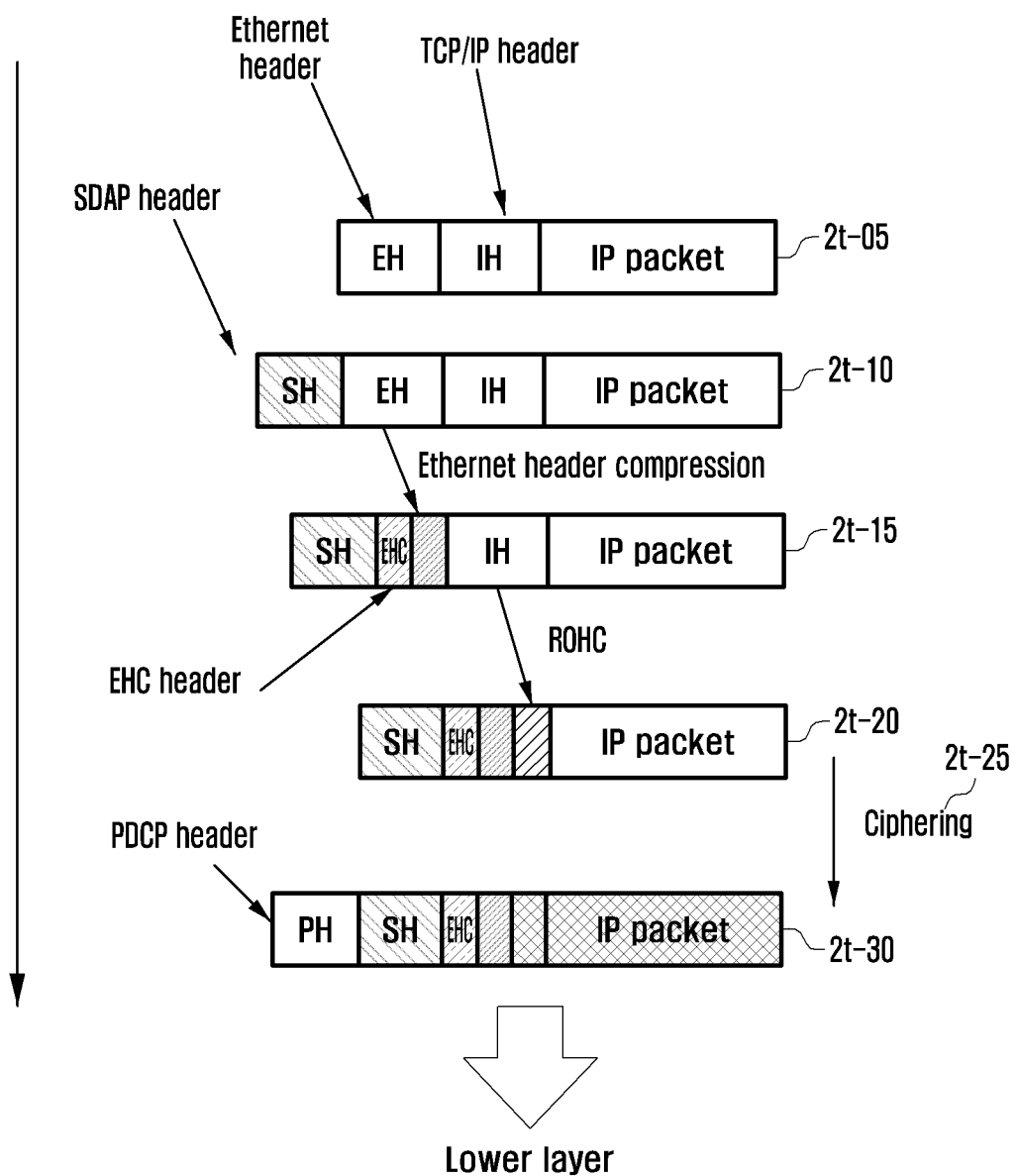
FIG. 2T illustrates a (2-9)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

FIG. 2T illustrates a (2-9)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

In the (2-9)th embodiment, upon receiving the Ethernet frame from a higher layer (indicated by reference numeral 2t-05), the transmission SDAP layer device may configure the SDAP header and transmit the SDAP header to a lower transmission PDCP layer device (indicated by reference numeral 2t-10). The transmission PDCP layer device may perform an Ethernet header compression procedure for the Ethernet header of a higher layer device, except for the SDAP header, and may generate a separate new EHC header. The header compression for a higher layer device header, such as TCP/IP or UDP of the higher layer device, may be performed using the ROHC protocol (indicated by reference numerals 2t-15 and 2t-20).

For the convenience of implementation, compression of the Ethernet header, which is located at the front, may start first and then ROHC compression may be performed.

According to another method, since a separate compression method is applied to different higher layer headers, parallel processing may be performed on the Ethernet header compression procedure and the ROHC header compression procedure in order to accelerate data processing of a UE.

According to another method, since the ROHC protocol is an algorithm that is already implemented, and is already implemented as part of the PDCP data processing procedure, ROHC compression may be first performed and Ethernet header compression may be performed later.

In the disclosure, even if the EHC header is separately generated by the PDCP layer device, since the EHC header is data generated by the Ethernet compression procedure in the PDCP layer device, the transmission PDCP layer device considers the EHC header as part of PDCP data (PDCP SDU) and allows the EHC header to be placed after the SDAP header.

In the (2-9)th embodiment in which efficient ciphering is performed, a UE may perform ciphering of the compressed ROHC compression header and data and may not perform ciphering of the SDAP header, the newly generated EHIC header, and the compressed Ethernet header (indicated by reference numerals 2t-25 and 2t-30). In addition, in UE implementation, by configuring all together the PDCP header, the SDAP header, the EHC header, and the compressed Ethernet header at the very front of the ciphered data at the last time after completing the ciphering procedure, the implementation complexity may be reduced.

In addition, a PDCP header is generated after completing the ciphering procedure, and the generated PDCP header is configured before the new SDAP header and transmitted to a lower layer.

In the (2-9)th embodiment in which the efficient ciphering is performed, upon receiving data from a lower layer device, the reception PDCP layer device may process the non-ciphered SDAP header, the newly generated EHC header, and the compressed Ethernet header, may perform the Ethernet header decompression procedure, may perform deciphering of the remaining ROHC compression headers and data, and may perform the ROHC decompression procedure.

For the convenience of implementation, decompression of the Ethernet header located at the front may start first and then the ROHC decompression may be performed.

According to another method, since a separate decompression method is applied to different higher layer headers, the Ethernet header decompression procedure and the ROHC header decompression procedure may be performed in parallel in order to accelerate data processing of a UE.

According to another method, since the ROHC protocol is an algorithm that is already implemented, and is already implemented as part of the PDCP data processing procedure, ROHC decompression may be first performed and Ethernet header decompression may be performed later. In addition, if the reception PDCP layer device attempts to reconstruct the length field value by calculating and deriving the Ethernet frame size with respect to the length field of the Ethernet header field, it is necessary to perform ROHC decompression first so as to accurately calculate the total Ethernet frame size. Therefore, the ROHC decompression procedure needs to be performed first, and followed by the Ethernet decompression procedure.

Figure 2U:
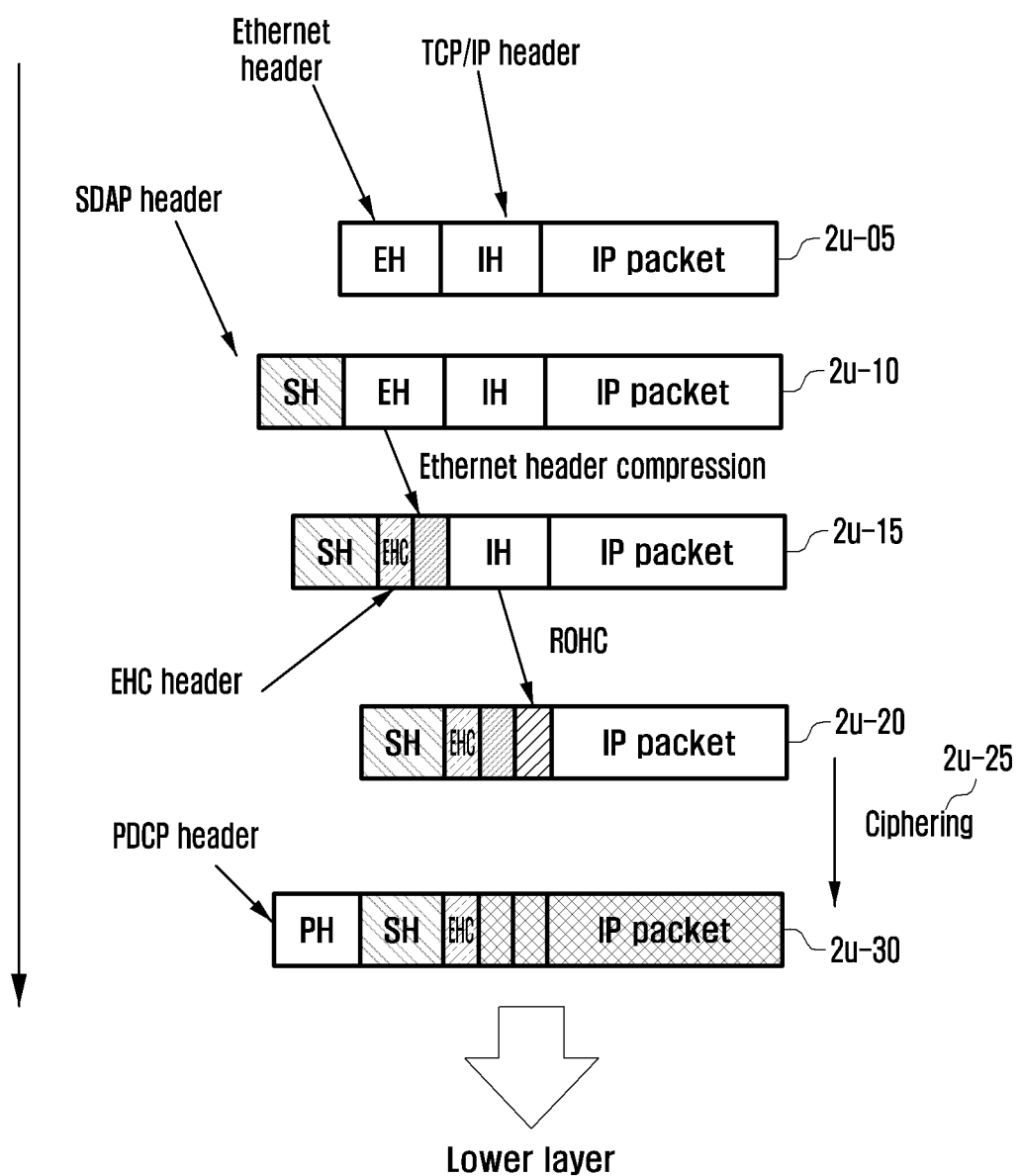
FIG. 2U illustrates a (2-10)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

FIG. 2U illustrates a (2-10)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

In the (2-10)th embodiment, upon receiving the Ethernet frame from a higher layer (indicated by reference numeral $2u$-05), the transmission SDAP layer device may configure an SDAP header and transmit the SDAP header to a lower transmission PDCP layer device (indicated by reference numeral $2u$-10). The transmission PDCP layer device may perform an Ethernet header compression procedure for the Ethernet header of a higher layer device, except for the SDAP header, and may generate a separate new EHC header. The header compression for a higher layer device header, such as TCP/IP or UDP of the higher layer device, may be performed using the ROHC protocol (indicated by reference numerals $2u$-15 and $2u$-20).

For the convenience of implementation, compression of the Ethernet header, which is located at the front, may start first and then ROHC compression may be performed.

According to another method, since a separate compression method is applied to different higher layer headers, parallel processing may be performed on the Ethernet header compression procedure and the ROHC header compression procedure in order to accelerate data processing of a UE.

According to another method, since the ROHC protocol is an algorithm that is already implemented, and is already implemented as part of the PDCP data processing procedure, ROHC compression may be first performed and Ethernet header compression may be performed later.

In the disclosure, even if the EHC header is separately generated by the PDCP layer device, since the EHC header is data generated by the Ethernet compression procedure in the PDCP layer device, the transmission PDCP layer device considers the EHC header as part of PDCP data (PDCP SDU) and allows the EHC header to be placed after the SDAP header.

In the (2-10)th embodiment in which efficient ciphering is performed, in order to enhance security, a UE may perform ciphering of the compressed Ethernet header, the compressed ROHC compression header and data, and may not perform ciphering of the SDAP header and the newly generated EHC header (indicated by reference numerals $2u$-25 and $2u$-30). In addition, in UE implementation, by configuring all together the PDCP header, the SDAP header, and the EHC header at the very front of the ciphered data at the last time after completing the ciphering procedure, the implementation complexity may be reduced.

In addition, a PDCP header may be generated after completing the ciphering procedure, and the generated PDCP header may be configured before the SDAP header and transmitted to a lower layer.

In the (2-10)th embodiment in which the efficient ciphering is performed, upon receiving data from a lower layer device, the reception PDCP layer device may process a non-ciphered SDAP header and the newly generated EHC header, may perform deciphering of the remaining compressed Ethernet header, the ROHC compression header, and data, and may perform the Ethernet decompression and the ROHC decompression procedure.

For the convenience of implementation, decompression of the Ethernet header located at the front may start first and then the ROHC decompression may be performed.

According to another method, since a separate decompression method is applied to different higher layer headers, parallel processing may be performed on the Ethernet header decompression procedure and the ROHC header decompression procedure in order to accelerate data processing of a UE.

According to another method, since the ROHC protocol is an algorithm that is already implemented, and is already implemented as part of the PDCP data processing procedure, ROHC decompression may be first performed and Ethernet header decompression may be performed later. In addition, if the reception PDCP layer device attempts to reconstruct the length field value by calculating and deriving the Ethernet frame size with respect to the length field of the Ethernet header field, it is necessary to perform ROHC decompression first so as to accurately calculate the total Ethernet frame size. Therefore, the ROHC decompression procedure needs to be performed first, and followed by the Ethernet decompression procedure.

Figure 2V:
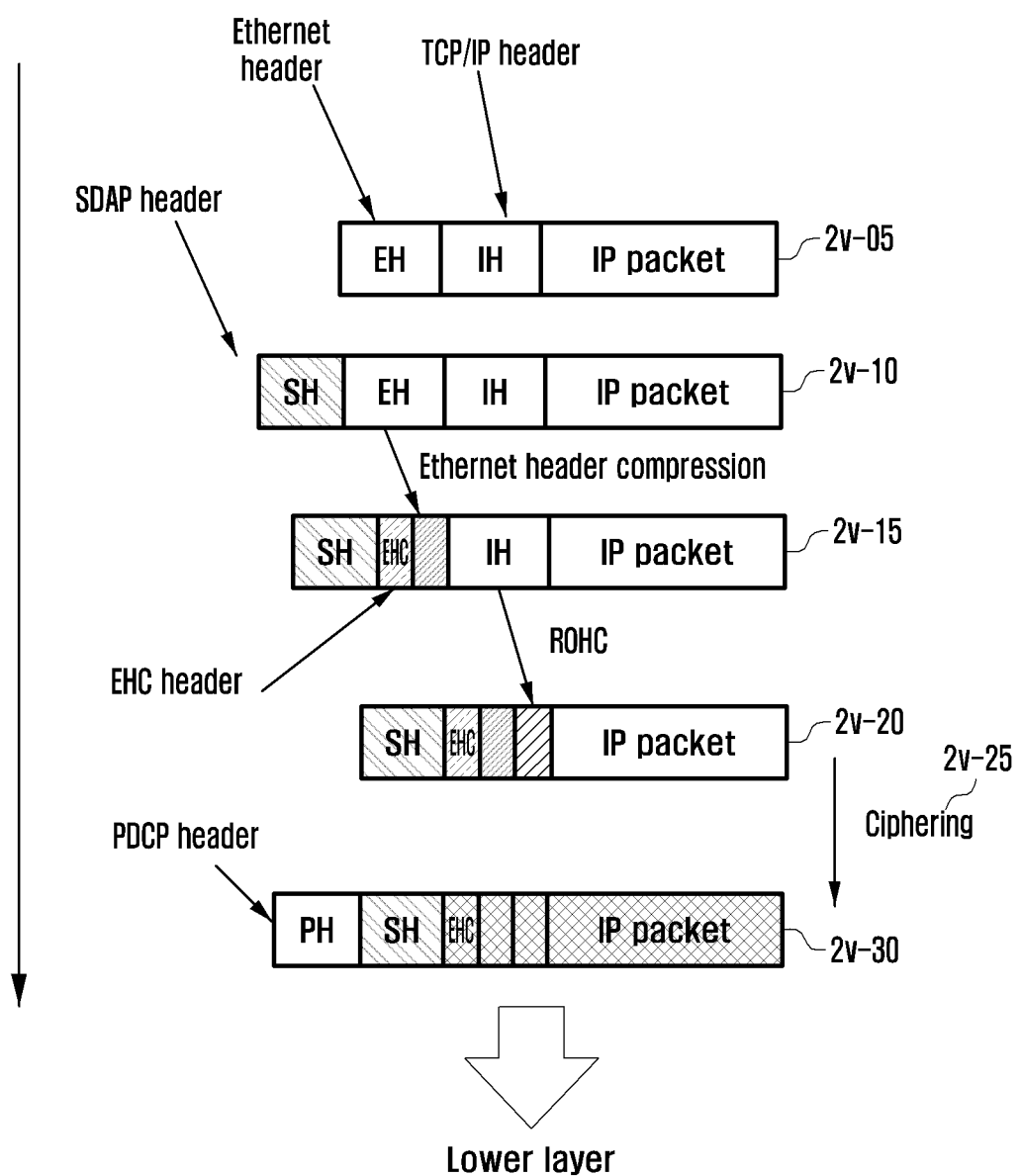
FIG. 2V illustrates a (2-11)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

FIG. 2V illustrates a (2-11)th embodiment in which a PDCP layer device efficiently performs ciphering and deciphering in a case where an SDAP layer device or an SDAP header is configured, an Ethernet header compression protocol (or method) is configured, and an ROHC protocol is configured according to an embodiment of the disclosure.

In the (2-11)th embodiment, upon receiving the Ethernet frame from a higher layer (indicated by reference numeral $2v$-05), the transmission SDAP layer device may configure an SDAP header and transmit the SDAP header to a lower transmission PDCP layer device (indicated by reference numeral $2v$-10). The transmission PDCP layer device may perform an Ethernet header compression procedure for the Ethernet header of a higher layer device, except for the SDAP header, and may generate a separate new EHC header. The header compression for a higher layer device header, such as TCP/IP or UDP of the higher layer device, is performed using the ROHC protocol (indicated by reference numerals $2v$-15 and $2v$-20).

For the convenience of implementation, compression of the Ethernet header, which is located at the front, may start first and then ROHC compression may be performed.

According to another method, since a separate compression method is applied to different higher layer headers, parallel processing may be performed on the Ethernet header compression procedure and the ROHC header compression procedure in order to accelerate data processing of a UE.

According to another method, since the ROHC protocol is an algorithm that is already implemented, and is already implemented as part of the PDCP data processing procedure, ROHC compression may be first performed and Ethernet header compression may be performed later.

In the disclosure, even if the EHC header is separately generated by the PDCP layer device, since the EHC header is data generated by the Ethernet compression procedure in the PDCP layer device, the transmission PDCP layer device considers the EHC header as part of PDCP data (PDCP SDU) and allows the EHC header to be placed after the SDAP header.

In the (2-11)th embodiment in which efficient ciphering is performed, in order to enhance security, a UE may perform ciphering of the newly generated EHC header, the compressed Ethernet header, the compressed ROHC compression header, and data, and may not perform ciphering of only the SDAP header (indicated by reference numerals $2v$-25 and 2v-30). In addition, in UE implementation, by configuring all together the PDCP header and the SDAP header at the very front of the ciphered data at the last time after completing the ciphering procedure, the implementation complexity may be reduced.

In addition, a PDCP header may be generated after completing the ciphering procedure, the generated PDCP header may be configured before the SDAP header and transmitted to a lower layer.

In the (2-11)th embodiment in which the efficient ciphering is performed, upon receiving data from a lower layer device, the reception PDCP layer device may process a non-ciphered SDAP header, may perform deciphering of the remaining newly generated EHC headers, the compressed Ethernet header, the ROHC compression header, and data, and may perform the Ethernet decompression and the ROHC decompression procedure thereof.

For the convenience of implementation, decompression of the Ethernet header located at the front may start first and then the ROHC decompression may be performed.

According to another method, since a separate decompression method is applied to different higher layer headers, parallel processing may be performed on the Ethernet header decompression procedure and the ROHC header decompression procedure in order to accelerate data processing of a UE.

According to another method, since the ROHC protocol is an algorithm that is already implemented, and is already implemented as part of the PDCP data processing procedure, ROHC decompression may be first performed and Ethernet header decompression may be performed later. In addition, if the reception PDCP layer device attempts to reconstruct the length field value by calculating and deriving the Ethernet frame size with respect to the length field of the Ethernet header field, it is necessary to perform ROHC decompression first so as to accurately calculate the total Ethernet frame size. Therefore, the ROHC decompression procedure needs to be performed first, and followed by the Ethernet decompression procedure.

In a case where the SDAP header is not ciphered in the embodiments, if a base station implements a CU-DU split structure and implements only from a DU to the RLC layer device, since the DU may not check QoS of the SDAP header if the SDAP header has been ciphered, the DU may not perform ciphering of the SDAP header in order to easily utilize QoS in scheduling.

In a case where the SDAP layer device or the SDAP header is not configured in the disclosure, the method of the above embodiments from which the SDAP header is excluded may be equally applied to the disclosure.

In addition, in a case where the ROHC protocol is not configured in the disclosure, the method of the embodiments from which the ROHC header compression procedure is excluded may be equally applied to the embodiments.

The embodiments proposed in the disclosure may be not only applied to an Ethernet header simply but also to headers of other higher layer devices that may be configured in a higher layer of the PDCP layer device. Therefore, the disclosure does not propose the Ethernet header compression method limited to the Ethernet header, in which the Ethernet header has been described as one embodiment, but the disclosure proposes a method for compression and decompression of a higher layer header that can be applied to the headers of the higher layer device (other application layer devices) of the PDCP layer device.

In the following description, if the SDAP layer device is configured to be used or the SDAP header is configured to be used through the RRC messages, such as 2e-10, 2e-40, or 2e-75 in FIG. 2E, and if Ethernet header compression (EHC) is configured, the disclosure proposes methods for efficiently processing SDAP control data if the transmission PDCP layer device receives SDAP control data from a higher layer device (for example, the SDAP layer device).

In the disclosure, the SDAP control data may have the same structure as that of the uplink SDAP header. The SDAP control data structure is SDAP control data indicating that a data flow corresponding to the QFI field value has ended or is the last to a field indicating a QoS Flow ID (QFI), and may be referred to as an end marker control data (end marker control PDU).

In the following description, if the SDAP layer device is configured to be used or the SDAP header is configured to be used through the RRC messages, such as 2e-10, 2e-40, or 2e-75 in FIG. 2E, and if Ethernet header compression (EHC) is configured, the disclosure proposes methods for efficiently processing SDAP control data if the transmission PDCP layer device receives the SDAP control data from a higher layer device (for example, the SDAP layer device).

In the disclosure, if the SDAP layer device is configured or the SDAP header is configured through the RRC message, a (2-12)th embodiment in which the Ethernet header compression method is efficiently performed and the SDAP control data is processed is proposed as follows.

In the (2-12)th embodiment, the Ethernet header compression method is not applied to the SDAP control data, and the SDAP control data is not ciphered and also EHC header is not ciphered. Therefore, it is possible to utilize QoS information of the SDAP header without performing deciphering information of SDAP control data by a transmission terminal or reception terminal. In addition, the reception PDCP layer device may check that the SDAP control data is not compressed through a 1-bit indicator of an EHC header because the EHC header is not ciphered, may not apply a deciphering procedure because the SDAP control data is not ciphered, and may quickly process the SDAP control data. For example, in the case of a base station, the QoS information can be used for scheduling, and in UE implementation, a deciphering procedure needs not to be performed each time the SDAP control data is received, integrity protection is performed if the same is configured, and the EHC header and the PDCP header may be generated, concatenated, and transferred to a lower layer, so as to easily perform UE implementation for fast data processing. In the (2-12)th embodiment of the disclosure, the EHC header is placed before the SDAP control data so that the PDCP PDU structure configures data in the order of the PDCP header, the EHC header, and the SDAP control data. Since the EHC header is generated by the PDCP layer device, it may be efficient for the UE implementation that the EHC header is to be placed before the SDAP control data generated by the SDAP layer device, which is a logically higher layer device. Therefore, in the (2-12)th embodiment, the EHC header may be placed before the SDAP control data so that the embodiment has the structure of concatenating the EHC header and the SDAP control data.

Specifically, if the SDAP layer device is configured to be used or the SDAP header is configured to be used through the RRC message, and if the Ethernet header compression (EHC) is configured, the transmission PDCP layer device does not perform the Ethernet header compression procedure for SDAP control data received from a higher layer (SDAP layer device) upon receiving the SDAP control data from the higher layer. Further, the transmission PDCP layer device may calculate the checksum field, and generate an EHC header by configuring whether to apply the EHC header and attach the EHC header before the SDAP control data (indicated by reference numeral 1s-15). If integrity protection is configured, the integrity protection is applied to the PDCP header, the EHC header, and the SDAP control data before the ciphering procedure is performed, and then ciphering of the EHC header and the SDAP control data is not performed. In addition, the PDCP header may be configured at the very front of the data, concatenated, and transferred to a lower layer device.

In the disclosure, if the SDAP layer device is configured or the SDAP header is configured through the RRC message, a (2-13)th embodiment in which the Ethernet header compression method is efficiently performed and the SDAP control data is processed is proposed as follows.

In the (2-13)th embodiment, the Ethernet header compression method is not applied to the SDAP control data, and the SDAP control data is not ciphered and also EHC header is not ciphered. Therefore, it is possible to utilize QoS information of the SDAP header without performing deciphering information of SDAP control data by a transmission terminal or reception terminal. In addition, the reception PDCP layer device may check that the SDAP control data is not compressed through a 1-bit indicator of an EHC header because the EHC header is not ciphered, may not apply a deciphering procedure because the SDAP control data is not ciphered, and may quickly process the SDAP control data. For example, in the case of a base station, the QoS information can be used for scheduling, and in UE implementation, a deciphering procedure needs not to be performed each time the SDAP control data is received, integrity protection is performed if the same is configured, the EHC header and the PDCP header may be generated, concatenated, and transferred to a lower layer, so as to easily perform UE implementation for fast data processing. In the (2-13)th embodiment of the disclosure, the EHC header is placed after the SDAP control data so that the PDCP PDU structure configures data in the order of the PDCP header, the SDAP control data, and the EHC header. Since the EHC procedure is the very first in the processing procedure of the PDCP layer device, the EHC header is generated first, and the SDAP control data received from a higher layer is placed before he EHC header to facilitate UE implementation. Therefore, in the (2-13)th embodiment, the SDAP control data may be placed before the EHC header so that the embodiment has the structure of concatenating the SDAP control data and the EHC header.

Specifically, if the SDAP layer device is configured to be used or the SDAP header is configured to be used through the RRC message, such as 2e-10, 2e-40, or 2e-75 in FIG. 2E, and if Ethernet header compression (EHC) is configured, the transmission PDCP layer device does not perform the Ethernet header compression procedure for SDAP control data received from a higher layer (SDAP layer device) upon receiving the SDAP control data from the higher layer. Further, the transmission PDCP layer device may calculate the checksum field, and generate an EHC header by configuring whether to apply the EHC header and attach the EHC header after the SDAP control data. If integrity protection is configured, the integrity protection is applied to the PDCP header, the SDAP control data, and the EHC header before the ciphering procedure is performed, and then ciphering for the SDAP control data and the EHC header is not performed. In addition, the PDCP header may be configured at the very front of the data, concatenated, and transferred to a lower layer device.

In the disclosure, if the SDAP layer device is configured or the SDAP header is configured through the RRC message, a (2-14)th embodiment in which the Ethernet header compression method is efficiently performed and the SDAP control data is processed is proposed as follows.

In the (2-14)th embodiment, the Ethernet header compression method is not applied to the SDAP control data, and the SDAP control data is not ciphered and EHC header is ciphered. Therefore, it is possible to utilize QoS information of the SDAP header without performing deciphering information of SDAP control data by a transmission terminal or reception terminal. In addition, the reception PDCP layer device may distinguish data due to an attack as a deciphering failure because the EHC header is ciphered, and security can be enhanced. After deciphering the EHC header, the reception PDCP layer device may check that the SDAP control data is not compressed through a 1-bit indicator of an EHC header, may not apply a deciphering procedure because the SDAP control data is not ciphered, and may quickly process the SDAP control data. For example, in the case of a base station, the QoS information can be used for scheduling, and in UE implementation, a deciphering procedure needs not to be performed each time the SDAP control data is received, integrity protection is performed if the same is configured, and a PDCP header is generated by deciphering only the EHC header, concatenated, and transferred to a lower layer, so as to easily perform UE implementation for fast data processing. In the (2-14)th embodiment of the disclosure, the EHC header is placed before the SDAP control data so that the PDCP PDU structure configures data in the order of the PDCP header, the EHC header, and the SDAP control data. Since the EHC header is generated by the PDCP layer device, it may be efficient for the UE implementation that the EHC header is to be placed before the SDAP control data generated by the SDAP layer device, which is a logically higher layer device. Therefore, in the (2-14)th embodiment, the EHC header may be placed before the SDAP control data so that the embodiment has the structure of concatenating the EHC header and the SDAP control data.

Specifically, if the SDAP layer device is configured to be used or the SDAP header is configured to be used through the RRC message, such as 2e-10, 2e-40, or 2e-75 in FIG. 2E, and if Ethernet header compression (EHC) is configured, the transmission PDCP layer device does not perform the Ethernet header compression procedure for SDAP control data received from a higher layer (SDAP layer device) upon receiving the SDAP control data from the higher layer. Further, the transmission PDCP layer device may calculate the checksum field, and generate an EHC header by configuring whether to apply the EHC header and attach the EHC header before the SDAP control data. If integrity protection is configured, the integrity protection is applied to the PDCP header, the SDAP control data, and the EHC header before the ciphering procedure is performed, and then ciphering of the EHC header is performed and ciphering of the SDAP control data is not performed. In addition, the PDCP header may be configured at the very front of the data, concatenated, and transferred to a lower layer device.

In the disclosure, if the SDAP layer device is configured or the SDAP header is configured through the RRC message, a (2-15)th embodiment in which the Ethernet header compression method is efficiently performed and the SDAP control data is processed is proposed as follows.

In the (2-15)th embodiment, the Ethernet header compression method is not applied to the SDAP control data, and the SDAP control data is not ciphered and EHC header is ciphered. Therefore, it is possible to utilize QoS information of the SDAP header without performing deciphering information of SDAP control data by a transmission terminal or reception terminal. In addition, the reception PDCP layer device may distinguish data due to an attack as a deciphering failure because the EHC header is ciphered, and security can be enhanced. After deciphering the EHC header, the reception PDCP layer device may check that the SDAP control data is not compressed through a 1-bit indicator of an EHC header, may not apply a deciphering procedure because the SDAP control data is not ciphered, and may quickly process the SDAP control data. For example, in the case of a base station, the QoS information can be used for scheduling, and in UE implementation, a deciphering procedure needs not to be performed each time the SDAP control data is received, integrity protection is performed if the same is configured, and immediately the EHC header is ciphered and the PDCP header may be generated, concatenated, and transferred to a lower layer, so as to easily perform UE implementation for fast data processing. In the (2-15)th embodiment of the disclosure, the EHC header is placed after the SDAP control data so that the PDCP PDU structure configures data in the order of the PDCP header, the SDAP control data, and the EHC header. Since the EHC procedure is the very first in the processing procedure of the PDCP layer device, the EHC header is generated first, and the SDAP control data received from a higher layer is placed before the EHC header to facilitate UE implementation. Therefore, in the (2-15)th embodiment, the SDAP control data may be placed before the EHC header so that the embodiment has the structure of concatenating the SDAP control data and the EHC header.

Specifically, if the SDAP layer device is configured to be used or the SDAP header is configured to be used through the RRC message, such as 2*e*-10, 2*e*-40, or 2*e*-75 in FIG. 2E, and if Ethernet header compression (EHC) is configured, the transmission PDCP layer device does not perform the Ethernet header compression procedure for SDAP control data received from a higher layer (SDAP layer device) upon receiving the SDAP control data from the higher layer. Further, the transmission PDCP layer device may calculate the checksum field, and generate an EHC header by configuring whether to apply the EHC header and attach the EHC header after the SDAP control data. If integrity protection is configured, the integrity protection is applied to the PDCP header, the SDAP control data, and the EHC header before the ciphering procedure is performed, and then ciphering of the SDAP control data is not performed and ciphering of the EHC header is performed. In addition, the PDCP header may be configured at the very front of the data, concatenated, and transferred to a lower layer device.

In the disclosure, if the SDAP layer device is configured or the SDAP header is configured through the RRC message, a (2-16)th embodiment in which the Ethernet header compression method is efficiently performed and the SDAP control data is processed is proposed as follows.

In the (2-16)th embodiment, the Ethernet header compression method is not applied to the SDAP control data, the SDAP control data is not ciphered, and the SDAP control data may be indicated through a 1-bit indicator of a PDCP header without generating an EHC header, or the 1-bit indicator may indicate that there is no EHC header. Due to the above characteristics, overhead can be reduced. In addition, the transmission PDCP layer device may not need to generate the EHC header unnecessarily, and the reception PDCP layer device may immediately check the 1-bit indicator of the PDCP header because there is no EHC header and perform fast processing of the SDAP control data without applying a deciphering procedure because the SDAP control data is not ciphered. For example, in the case of a base station, the QoS information can be used for scheduling, and in UE implementation, a deciphering procedure needs not to be performed each time the SDAP control data is received, integrity protection is performed if the same is configured, and immediately the EHC header is ciphered and the PDCP header may be generated, concatenated, and transferred to a lower layer, so as to easily perform UE implementation for fast data processing. In addition, the (2-16)th embodiment of the disclosure proposes a procedure in which the SDAP control data is processed without the EHC header, so that the PDCP PDU structure configures data in the order of the PDCP header and the SDAP control data. In addition, in processing the SDAP control data received from a higher layer, the (2-16)th embodiment includes the structure of concatenating the PDCP header before the SDAP control data.

Specifically, if the SDAP layer device is configured to be used or the SDAP header is configured to be used through the RRC message, such as 2*e*-10, 2*e*-40, or 2*e*-75 in FIG. 2E, and if Ethernet header compression (EHC) is configured, the transmission PDCP layer device does not perform the Ethernet header compression procedure for SDAP control data received from a higher layer (SDAP layer device) upon receiving the SDAP control data from the higher layer. Further, the transmission PDCP layer device may not generate an EHC header for the SDAP control data. In addition, if integrity protection is configured, the integrity protection is applied to the PDCP header and the SDAP control data before the ciphering procedure is performed, and then ciphering of the SDAP control data is not performed. In addition, the PDCP header may be configured at the very front of the SDAP control data, concatenated, and transferred to a lower layer device.

The 1-bit indicator of the PDCP header proposed in the (2-16)th embodiment of the disclosure has a function to indicate the presence or the absence of the EHC header, and may be extended and applied to the (2-1)th embodiment, the (2-2)th embodiment, the (2-3)th embodiment, the (2-4)th embodiment, the (2-5)th embodiment, the (2-6)th embodiment, the (2-7) embodiment, the (2-8)th embodiment, the (2-9)th embodiment, the (2-10)th embodiment, or the (2-11)th embodiment, and thus if a user compression procedure is not applied to the SDAP header and data, received from a higher layer, the EHC header is omitted and the 1-bit indicator of the PDCP header may indicate that the EHC header is not attached, so that overhead can be reduced.

In the following description, the disclosure proposes an operation a PDCP layer device of a UE or a base station in which the UE or the base station performs different data processing by distinguishing a case where a transmission or reception PDCP layer device receives an SDAP header and higher layer data from a higher layer device or a lower layer device and a case where the transmission PDCP layer device or the reception PDCP layer device receives SDAP control data.

In FIG. 2E, the SDAP layer device is configured to be used or the SDAP header is configured to be used through the RRC messages, such as 2*e*-10, 2*e*-40, 2*e*-75, and if Ethernet header compression (EHC) is configured, If data (e.g., PDCP SDU) received from a higher layer device (SDAP layer device) includes an SDAP header and higher layer data, or if the data is not SDAP control data, The transmission PDCP layer device may perform the procedures of the (2-1)th embodiment, the (2-2)th embodiment, the (2-3)th embodiment, the (2-4)th embodiment, the (2-5)th embodiment, the (2-6)th embodiment, the (2-7)th embodiment, the (2-8)th embodiment, the (2-9)th embodiment, the (2-10)th embodiment, or the (2-11)th embodiment of the disclosure.

If data (e.g., PDCP SDU) received from a higher layer device (SDAP layer device) does not include the SDAP header and higher layer data, or if the data is SDAP control data, The transmission PDCP layer device may perform the procedures of the (2-12)th embodiment, the (2-13)th embodiment, the (2-14)th embodiment, the (2-15)th embodiment, or the (2-16)th embodiment of the disclosure.

If data (e.g., PDCP PDU) received from a lower layer device (RLC layer device) includes an SDAP header and higher layer data, or if the data is not SDAP control data, The reception PDCP layer device may perform the procedures of the (2-1)th embodiment, the (2-2)th embodiment, the (2-3)th embodiment, the (2-4)th embodiment, the (2-5)th embodiment, the (2-6)th embodiment, the (2-7)th embodiment, the (2-8)th embodiment, the (2-9)th embodiment, the (2-10)th embodiment, or the (2-11)th embodiment of the disclosure.

If data (e.g., PDCP PDU) received from the lower layer device (RLC layer device) does not include an SDAP header and higher layer data, or if the data is SDAP control data, The reception PDCP layer device may perform the procedures of the (2-12)th embodiment, the (2-13)th embodiment, the (2-14)th embodiment, the (2-15)th embodiment, or the (2-16)th embodiment of the disclosure.

As described above, the disclosure proposes an efficient method of processing an SDAP header or SDAP control data if a header or data compression method is configured in a PDCP layer device through the RRC message. In particular, methods for considering whether to perform ciphering or a header position together with a new header generated by the header or data compression method configured in the PDCP layer device have been specifically proposed. Specific embodiments proposed in the disclosure (the (2-1)th embodiment, the (2-2)th embodiment, the (2-3)th embodiment, the (2-4)th embodiment, the (2-5)th embodiment, the (2-6)th embodiment, the (2-7)th embodiment, the (2-8)th embodiment, the (2-9)th embodiment, the (2-10)th embodiment, the (2-11)th embodiment, the (2-12)th embodiment, the (2-13)th embodiment, the (2-14)th embodiment, the (2-15)th embodiment, or the (2-16)th embodiment) may be extended and applied to the case if a new compression method is introduced and configured in the PDCP layer device. If another new header is generated due to the new compression method, embodiments of the disclosure of considering whether to perform ciphering or a header position together with the new header may be extended and applied to the disclosure.

Figure 2W:
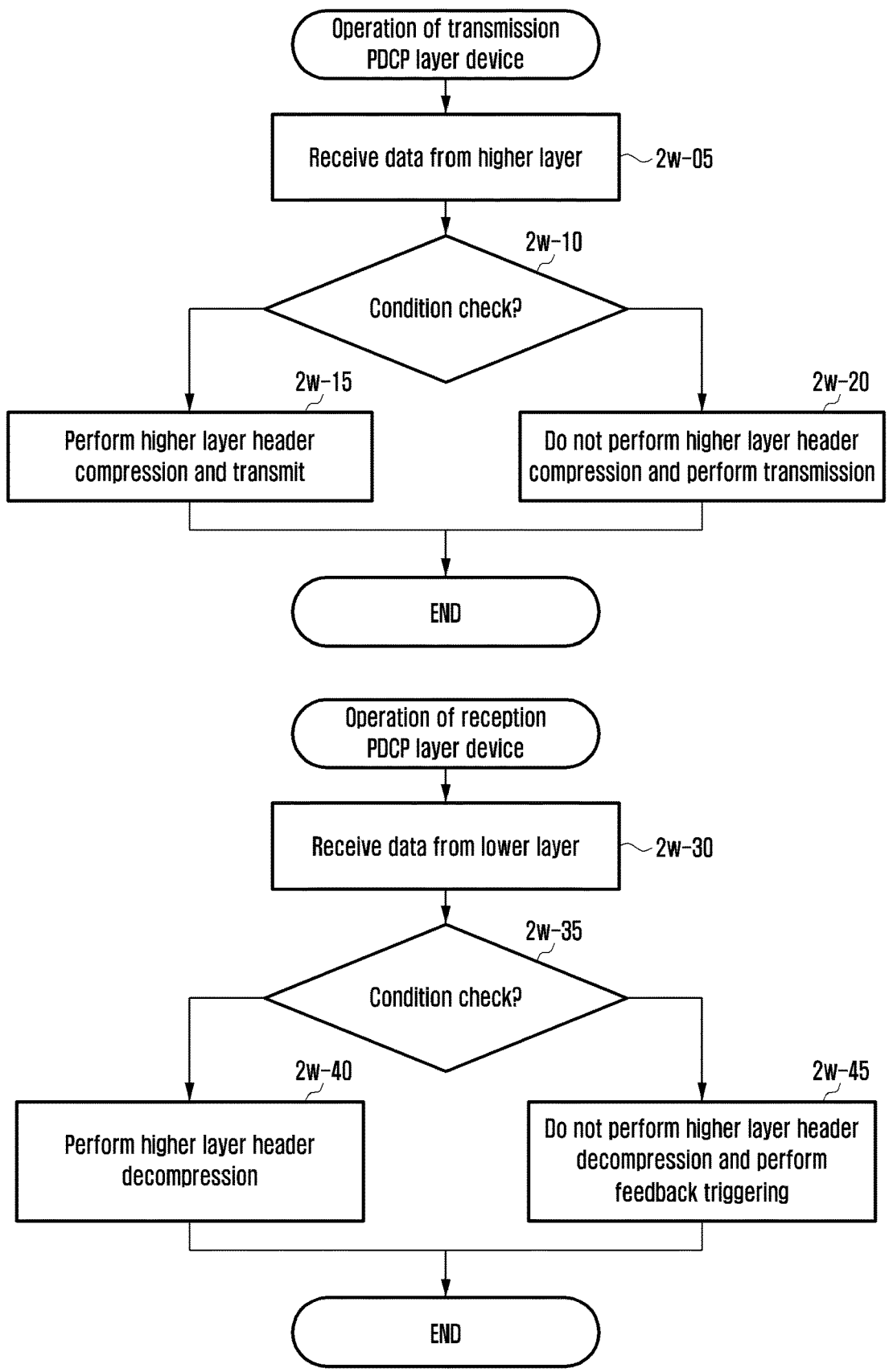
FIG. 2W illustrates an operation of a transmission PDCP layer device or an operation of a reception PDCP layer device of a UE or a base station according to an embodiment of the disclosure.

FIG. 2W illustrates an operation of a transmission PDCP layer device or a reception PDCP layer device of a UE or a base station according to an embodiment of the disclosure.

In the disclosure, in a case where a higher layer header compression protocol (Ethernet header compression method, EthHC) is configured for the transmission PDCP layer device, if the data 2w-05 received from the higher layer is received at first after the Ethernet header compression method is configured; if even one of the field values of the compressible fields among the fields of the Ethernet header of the data received from the higher layer is different from the field values stored in the buffer of the transmission PDCP layer device (or different from the previously transmitted Ethernet header field values); or if feedback indicating successful reception of data having the previously transmitted uncompressed full higher layer header (Ethernet header) is not received from the reception PDCP layer device (indicated by reference numeral 2w-10), the transmission PDCP layer device does not perform the Ethernet header compression until feedback indicating successful reception of the uncompressed full higher layer header (Ethernet header) is received from the reception PDCP layer device (indicated by reference numeral 2w-20). If feedback indicating successful reception of data having the previously transmitted uncompressed full higher layer header (Ethernet header) is received from the reception PDCP layer device (indicated by reference numeral 2w-10), the transmission PDCP layer device may perform compression by applying the Ethernet header compression method to the data received from the higher layer (indicated by reference numeral 2w-15).

In the disclosure, if the Ethernet header compression protocol for the reception PDCP layer device is configured and data is received from a lower layer (indicated by reference numeral 2w-30), and if the Ethernet header is compressed (if an indicator of a new EHC header is checked and the indicator indicates that the Ethernet header is compressed) (indicated by reference numeral 2w-35), the Ethernet header of the data may be decompressed (indicated by reference numeral 2w-40). Otherwise, if the Ethernet header compression protocol is configured and the Ethernet header is not compressed (if an indicator of a new EHC header is checked and the indicator indicates that the Ethernet header is compressed) (indicated by reference numeral 2w-35), the Ethernet header of the data is regarded as an uncompressed header and decompression thereof is not performed. Since the uncompressed Ethernet header has been successfully received, feedback is triggered to indicate the successful reception thereof to the transmission PDCP layer device and the feedback may be transmitted to the transmission PDC layer device (indicated by reference numeral 2w-45).

Figure 2X:
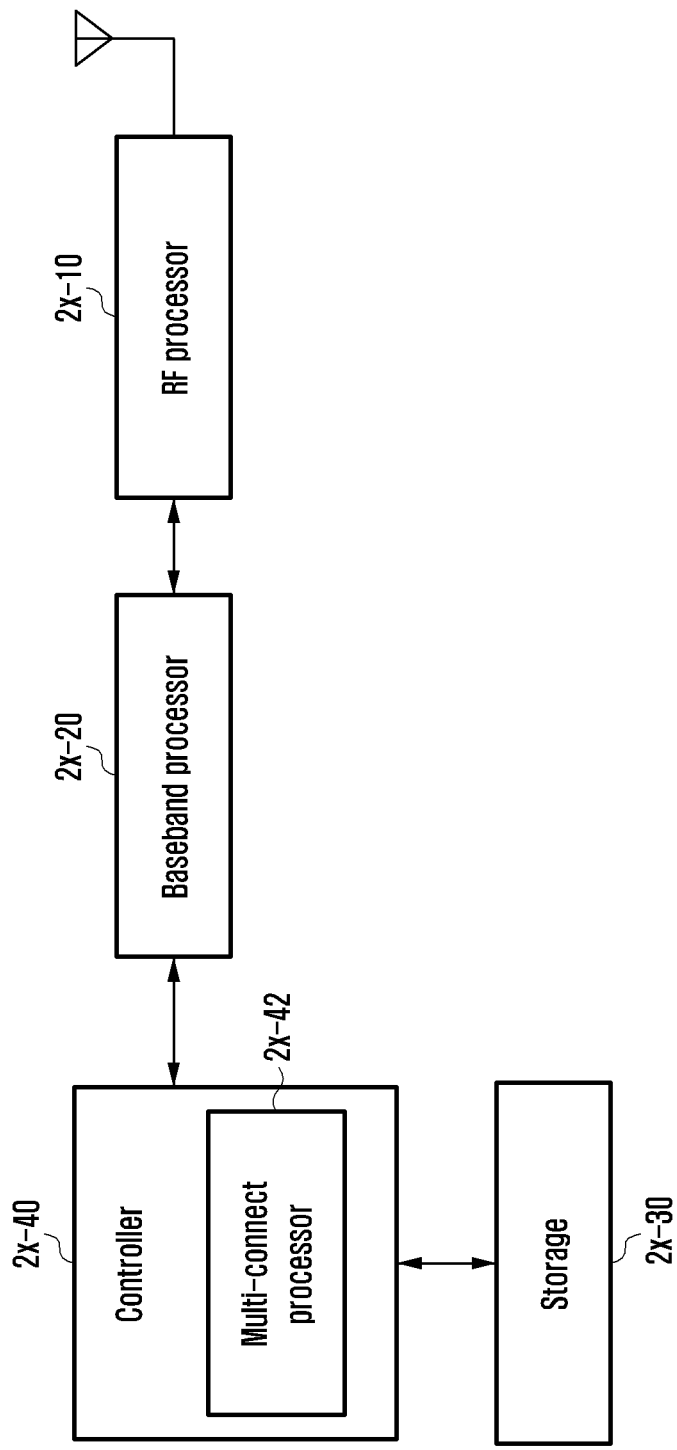
FIG. 2X illustrates a structure of a UE to according to an embodiment of the disclosure.

FIG. 2X illustrates a structure of a UE according to an embodiment of the disclosure.

Referring to FIG. 2X, the UE includes a radio frequency (RF) processor 2x-10, a baseband processor 2x-20, a storage 2x-30, and a controller 2x-40.

The RF processor 2x-10 may perform a function of transmitting or receiving a signal, such as band conversion and amplification of the signal, through a radio channel That is, the RF processor 2x-10 up-converts a baseband signal provided from the baseband processor 2x-20 into an RF band signal and transmits the RF band signal through an antenna, and down-converts the RF band signal, received through the antenna, to a baseband signal. For example, the RF processor 2x-10 may include a transmission filter, a reception filter, an amplifier, a mixer, an oscillator, a digital to analog convertor (DAC), an analog to digital convertor (ADC), and the like. In FIG. 2X, only one antenna is shown, but the UE may include a plurality of antennas. Further, the RF processor 2x-10 may include a plurality of RF chains. Furthermore, the RF processor 2x-10 may perform beamforming. For the beamforming, the RF processor 2x-10 may adjust a phase and a magnitude of each of the signals transmitted or received through a plurality of antennas or antenna elements. In addition, the RF processor may perform a MIMO operation, and may receive multiple layers at the time of performing the MIMO operation. The RF processor 2x-10 may perform reception beam sweeping by appropriately configuring a plurality of antennas or antenna elements under control of the controller, or may adjust a direction and a width of a reception beam so that the reception beam is coordinated with the transmission beam.

The baseband processor 2x-20 may perform a conversion function between a baseband signal and a bit string according to the physical layer standard of a system. For example, upon transmitting data, the baseband processor 2x-20 may generate complex symbols by encoding and modulating a transmission bit string. In addition, upon receiving data, the baseband processor 2x-20 may reconstruct the reception bit string by demodulating and decoding the baseband signal provided from the RF processor 2x-10. For example, according to an orthogonal frequency division multiplexing (OFDM) scheme, upon transmitting data, the baseband processor 2x-20 generates complex symbols by encoding and modulating a transmission bit string, maps the complex symbols onto subcarriers, and then configures OFDM symbols by performing an inverse fast Fourier transform (IFFT) operation and insertion of a cyclic prefix (CP). In addition, upon receiving data, the baseband processor 2x-20 may divide the baseband signal provided from the RF processor 2x-10 in OFDM symbol units, may reconstruct signals, which have been mapped onto the subcarriers through a fast Fourier transform (FFT) operation, and then may reconstruct the reception bit strings by demodulating and decoding the mapped signals.

The baseband processor 2x-20 and the RF processor 2x-10 transmit or receive signals as described above. Accordingly, the baseband processor 2x-20 and the RF processor 2x-10 may be referred to as a transmitter, a receiver, a transceiver, or a communication unit. Furthermore, at least one of the baseband processor 2x-20 and the RF processor 2x-10 may include a plurality of communication modules to support different radio access technologies. In addition, at least one of the baseband processor 2x-20 and the RF processor 2x-10 may include different communication modules to process signals of different frequency bands. For example, the different radio access technologies may include an LTE network, an NR network, and the like. In addition, the different frequency bands may include a super high frequency (SHF) (e.g., 2.5 GHz, 5 GHz) band, and a millimeter wave (e.g., 60 GHz) band.

The storage 2x-30 may store data, such as a basic program, an application program, and configuration information for performing the UE operation. The storage 2x-30 provides stored data at the request of the controller 2x-40.

The controller 2x-40 controls overall operations of the UE. For example, the controller 2x-40 may transmit or receive a signal through the baseband processor 2x-20 and the RF processor 2x-10. In addition, the controller 2x-40 records or reads data in or from the storage 2x-40. To this end, the controller 2x-40 may include at least one processor. For example, the controller 2x-40 may include a communication processor (CP) for performing control for communication and an application processor (AP) for controlling a higher layer such as an application program (not shown). For example, the controller 2x-40 may further include a multi-connect processor 2x-42 for connectivity.

Figure 2Y:
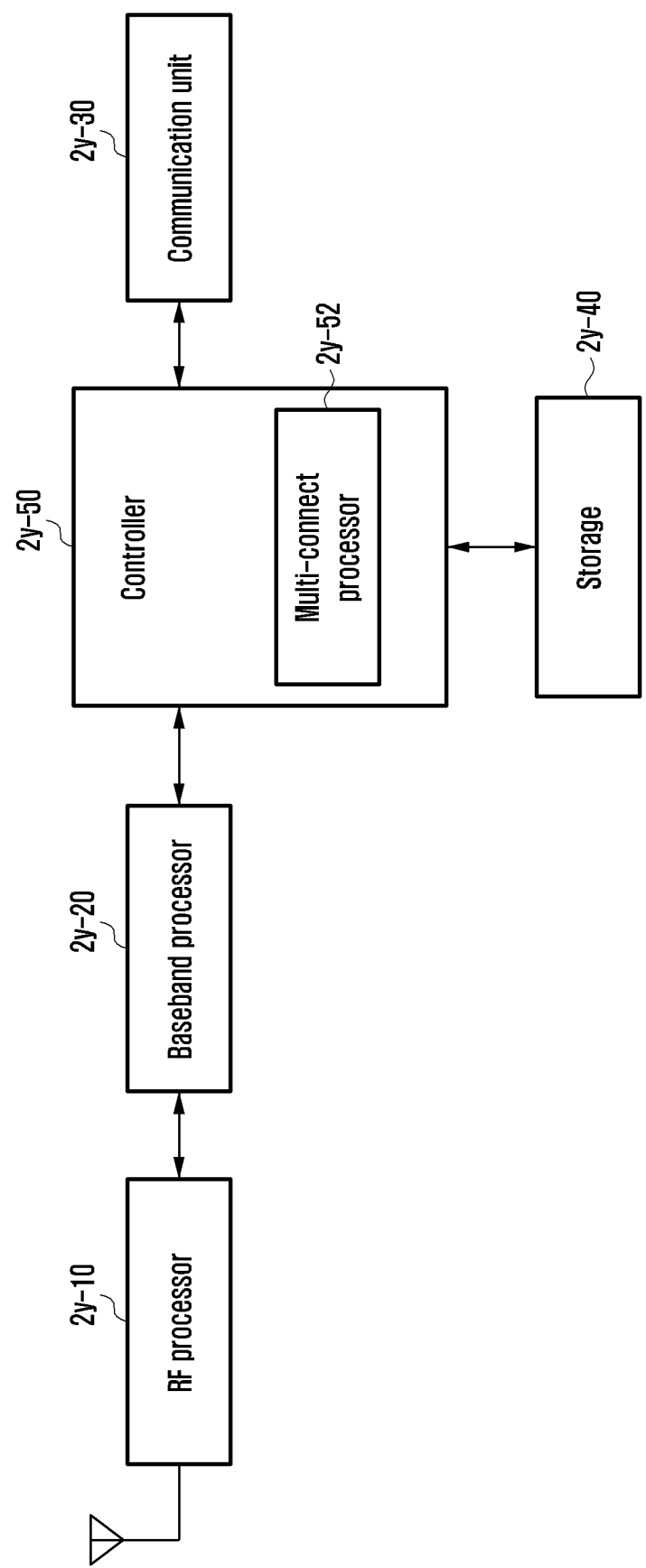
FIG. 2Y illustrates a block configuration of a TRP in a wireless communication system according to an embodiment of the disclosure.

FIG. 2Y illustrates a block configuration of a TRP in a wireless communication system according to an embodiment of the disclosure.

Referring to FIG. 2Y, the base station may include an RF processor 2y-10, a baseband processor 2y-20, a backhaul communication unit 2y-30, a storage 2y-40, and a controller 2y-50.

The RF processor 2y-10 may perform a function of transmitting or receiving a signal, such as band conversion and amplification of the signal, through a radio channel That is, the RF processor 2y-10 up-converts a baseband signal provided from the baseband processor 2y-20 into an RF band signal and transmits the RF band signal through an antenna, and down-converts the RF band signal, received through the antenna, into a baseband signal. For example, the RF processor 2y-10 may include a transmission filter, a reception filter, an amplifier, a mixer, an oscillator, a DAC, an ADC, and the like. In FIG. 2Y, only one antenna is shown, but a first access node may include a plurality of antennas. Further, the RF processor 2y-10 may include a plurality of RF chains. Furthermore, the RF processor 2y-10 may perform beamforming. For the beamforming, the RF processor 2y-10 may adjust a phase and a magnitude of each of the signals transmitted and received through a plurality of antennas or antenna elements. The RF processor may perform a downlink MIMO operation by transmitting one or more layers.

The baseband processor 2y-20 may perform a conversion function between a baseband signal and a bit string according to the physical layer standard of a first radio access technology. For example, upon transmitting data, the baseband processor 2y-20 may generate complex symbols by encoding and modulating a transmission bit stream. In addition, upon receiving data, the baseband processor 2y-20 may reconstruct a reception bit string by demodulating and decoding the baseband signal provided from the RF processor 2y-10. For example, according to the OFDM scheme, upon transmitting data, the baseband processor 2y-20 generates complex symbols by encoding and modulating a transmission bit stream, maps the complex symbols onto subcarriers, and then configures OFDM symbols by performing an IFFT operation and CP insertion. In addition, upon receiving data, the baseband processor 2y-20 may divide the baseband signal provided from the RF processor 2y-10 in OFDM symbol units, may reconstruct the signals, which have been mapped onto the sub-carriers, through a FFT operation, and then may reconstruct the reception bit string by demodulating and decoding the mapped signals. The baseband processor 2y-20 and the RF processor 2y-10 transmit or receive signals as described above. Accordingly, the baseband processor 2y-20 and the RF processor 2y-10 may be referred to as a transmitter, a receiver, a transceiver, a communication unit, or a wireless communication unit.

The communication unit 2y-30 provides an interface for communicating with other nodes in a network.

The storage 2y-40 may store data, such as a basic program, an application program, and configuration information for performing the operation of a main station. In particular, the storage 2y-40 may store information on a bearer allocated to the connected terminal, a measurement result reported from the connected terminal, and the like. In addition, the storage 2y-40 may store information serving as a criterion for determining whether to provide or terminate multiple connections to the terminal. In addition, the storage 2y-40 provides stored data at the request of the controller 2y-50.

The controller 2y-50 controls the overall operations of the main station. For example, the controller 2y-50 may transmit or receive a signal through the baseband processor 2y-20 and the RF processor 2y-10 or through the backhaul communication unit 2y-30. In addition, the controller 2y-50 records or reads data in the storage 2y-40. To this end, the controller 2y-50 may include at least one processor. For example, the controller 2y-50 may further include a multi-connect processor 2y-52 for connectivity.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    identifying whether a service data adaptation protocol (SDAP) header is configured and whether an Ethernet header compression (EHC) is configured; and
    performing EHC for data in a packet data convergence protocol (PDCP) layer, in case that the EHC is configured,
    wherein an EHC header is located after the SDAP header, and
    wherein a PDCP header and the SDAP header are not ciphered.

2. The method of claim 1, wherein the EHC header, which is generated in the PDCP layer, is ciphered.

3. The method of claim 1, wherein the EHC header is not generated for an SDAP control protocol data unit (PDU).

4. The method of claim 1, wherein in case that both the EHC and a robust header compression (ROHC) are configured, an ROHC header is located after the EHC header.

5. A method performed by a base station in a wireless communication system, the method comprising:
    identifying whether a service data adaptation protocol (SDAP) header is configured and whether an Ethernet header compression (EHC) is configured; and
    performing EHC for data in a packet data convergence protocol (PDCP) layer, in case that the EHC is configured,
    wherein an EHC header is located after the SDAP header, and
    wherein a PDCP header and the SDAP header are not ciphered.

6. The method of claim 5, wherein the EHC header, which is generated in the PDCP layer, is ciphered.

7. The method of claim 5, wherein the EHC header is not generated for an SDAP control protocol data unit (PDU).

8. The method of claim 5, wherein in case that both the EHC and a robust header compression (ROHC) are configured, an ROHC header is located after the EHC header.

9. A terminal comprising:
    a transceiver capable of transmitting or receiving at least one signal; and
    a controller coupled to the transceiver,
    wherein the controller is configured to:
        identify whether a service data adaptation protocol (SDAP) header is configured and whether an Ethernet header compression (EHC) is configured, and
        perform EHC for data in a packet data convergence protocol (PDCP) layer, in case that the EHC is configured,
    wherein an EHC header is located after the SDAP header, and
    wherein a PDCP header and the SDAP header are not ciphered.

10. The terminal of claim 9, wherein the EHC header, which is generated in the PDCP layer, is ciphered.

11. The terminal of claim 9, wherein the EHC header is not generated for an SDAP control protocol data unit (PDU).

12. The terminal of claim 9, wherein in case that both the EHC and a robust header compression (ROHC) are configured, an ROHC header is located after the EHC header.

13. A base station comprising:
    a transceiver capable of transmitting or receiving at least one signal; and
    a controller coupled to the transceiver,
    wherein the controller is configured to:
        identify whether a service data adaptation protocol (SDAP) header is configured and whether an Ethernet header compression (EHC) is configured, and
        perform Ethernet header compression for data in a packet data convergence protocol (PDCP) layer, in case that the EHC is configured,
    wherein an EHC header is located after the SDAP header, and
    wherein a PDCP header and the SDAP header are not ciphered.

14. The base station of claim 13, wherein the EHC header, which is generated in the PDCP layer, is ciphered.

15. The base station of claim 13,
    wherein the EHC header is not generated for an SDAP control protocol data unit (PDU), and
    wherein in case that both the EHC and a robust header compression (ROHC) are configured, an ROHC header is located after the EHC header.

* * * * *